(12) United States Patent
Alcoutlabi et al.

(10) Patent No.: US 10,319,994 B2
(45) Date of Patent: Jun. 11, 2019

(54) METHOD AND USE OF CERAMIC/CARBON COMPOSITE NANOFIBERS AS AN ANODE FOR LITHIUM-ION AND SODIUM-ION BATTERIES

(71) Applicant: The Board of Regents of The University of Texas System, Austin, TX (US)

(72) Inventors: Mataz Alcoutlabi, Edinburg, TX (US); Victor Anafo Agubra, Edinburg, TX (US)

(73) Assignee: Board of Regents of the University of Texas System, Austin, TX (US)

( * ) Notice: Subject to any disclaimer, the term of this patent is extended or adjusted under 35 U.S.C. 154(b) by 191 days.

(21) Appl. No.: 15/237,892

(22) Filed: Aug. 16, 2016

(65) Prior Publication Data

US 2017/0352870 A1    Dec. 7, 2017

Related U.S. Application Data

(60) Provisional application No. 62/344,006, filed on Jun. 1, 2016.

(51) Int. Cl.
| | |
|---|---|
| *H01M 4/133* | (2010.01) |
| *H01M 4/36* | (2006.01) |
| *H01M 4/587* | (2010.01) |
| *H01M 4/62* | (2006.01) |
| *H01M 10/052* | (2010.01) |
| *H01M 4/38* | (2006.01) |
| *C01B 32/05* | (2017.01) |

(52) U.S. Cl.
CPC .......... *H01M 4/364* (2013.01); *C01B 32/05* (2017.08); *H01M 4/387* (2013.01); *H01M 4/587* (2013.01); *H01M 4/625* (2013.01); *H01M 10/052* (2013.01)

(58) Field of Classification Search
CPC ................................. H01B 1/02; H01B 1/04
See application file for complete search history.

(56) References Cited

U.S. PATENT DOCUMENTS

2013/0126794 A1* 5/2013 Lee ...................... D01D 5/0007
                                                            252/506

OTHER PUBLICATIONS

Jiang, H., Y. Ge, K. Fu, Y. Lu, C. Chen, J. Zhu, M. Dirican, and X. Zhang, Centrifugally-spun tin-containing carbon nanofibers as anode material for lithium-ion batteries. Journal of Materials Science, 2015. 50(3): p. 1094-1102.

Li, X., Y. Zhang, T. Li, Q. Zhong, H. Li, and J. Huang, Carbon encapsulated ultrasmall SnO2 nanoparticles anchoring on graphene/TiO2 nanoscrolls for lithium storage. Electrochimica Acta, 2014. 147(0): p. 40-46.

Ji, L.W., Z. Lin, M. Alcoutlabi, and X.W. Zhang, Recent developments in nanostructured anode materials for rechargeable lithium-ion batteries. Energy & Environmental Science, 2011. 4(8): p. 2682-2699.

(Continued)

*Primary Examiner* — William D Young
(74) *Attorney, Agent, or Firm* — Meyertons, Hood, Kivlin, Kowert & Goetzel, P.C.; Mark R. DeLuca

(57) ABSTRACT

Tin-containing carbon fibers may be produced by centrifugal spinning of a precursor composition that includes a base polymer and a tin-containing compound. The produced fibers are heated at a temperature sufficient to convert at least a portion of the base polymer in the collected fibers into carbon fibers comprising tin.

18 Claims, 39 Drawing Sheets

(56) References Cited

OTHER PUBLICATIONS

Cui, C., X. Liu, N. Wu, and Y. Sun, Facile synthesis of core/shell-structured Sn/onion-like carbon nanocapsules as high-performance anode material for lithium-ion batteries. Materials Letters, 2015. 143: p. 35-37.

Zhong Y., X. Li, Y. Zhang, R. Li, M. Cai, and X. Sun, Nanostructued core-shell Sn nanowires @ CNTs with controllable thickness of CNT shells for lithium ion battery. Applied Surface Science, 2015. 332: p. 192-197.

Dabirian, F., S.A.H. Ravandi, A.R. Pishevar, and R.A. Abuzade, A comparative study of jet formation and nanofiber alignment in electrospinning and electrocentrifugal spinning systems. Journal of Electrostatics, 2011. 69(6): p. 540-546.

Tran, T., K. McCormac, J. Li, Z. Bi, and J. Wu, Electrospun SnO2 and TiO2 Composite Nanofibers for Lithium Ion Batteries. Electrochimica Acta, 2014. 117(0): p. 68-75.

Shen, Z., Y. Hu, Y. Chen, X. Zhang, K. Wang, and R. Chen, Tin nanoparticle-loaded porous carbon nanofiber composite anodes for high current lithium-ion batteries. Journal of Power Sources, 2015. 278: p. 660-667.

Xia, X., X. Wang, H. Zhou, X. Niu, L. Xue, X. Zhang, and Q. Wei, The effects of electrospinning parameters on coaxial Sn/C nanofibers: Morphology and lithium storage performance. Electrochimica Acta, 2014. 121(0): p. 345-351.

\* cited by examiner

METHOD AND USE OF CERAMIC/CARBON COMPOSITE NANOFIBERS AS AN ANODE FOR LITHIUM-ION AND SODIUM-ION BATTERIES

PRIORITY CLAIM

This application claims priority to U.S. Provisional Application Ser. No. 62/344,006 entitled "METHOD AND USE OF CERAMIC/CARBON COMPOSITE NANOFIBERS AS AN ANODE FOR LITHIUM-ION AND SODIUM-ION BATTERIES" filed Jun. 1, 2016, which is incorporated herein by reference in its entirety.

STATEMENT REGARDING FEDERALLY SPONSORED RESEARCH OR DEVELOPMENT

This invention was made with government support under DMR-1523577 awarded by National Science Foundation—Partnerships for Research and Education in Materials. The government has certain rights in the invention.

BACKGROUND OF THE INVENTION

1. Field of the Invention

The present invention generally relates to the field of composite nanofiber electrodes. More specifically, the invention relates to metal/carbon (M/C) composite nanofibers with high discharge capacity and good cycle life for use as anodes in lithium-ion and sodium-ion batteries (LIBs and SIBs).

2. Description of the Relevant Art

The use of nanostructured materials for energy storage devices has been the trend in recent years. Nanostructured fibers made from metals, metal oxides, metal sulfides, ceramics, and composites have been developed for use in various energy storage devices. The popularity of these nanostructured fibrous materials stem from their many attributes such as controllable fiber diameter, high surface area-to-volume ratio, low density, and high pore volume. These properties make the nanofiber (NFs) structure advantageous, compared to their powder, crystal, nanowire, and thin film counterparts, when used as electrode materials in LIBs and SIBs. These nano fibrous metal/metal oxides and ceramic composite electrodes deliver a comparable electrochemical performance including a stable cycle performance, enhanced capacity, improved rate capability and superior low temperature performance. The improved properties/performances of composite nanofibers are often attributed to the nonwoven structure that gives the nanofibers its high labyrinth-like porous structure, high surface and interfacial areas resulting in a short-diffusion distance of Li-ion (or Na-ion) during charge/discharge cycles. These physical characteristics lead to the creation of more reactive sites while the porous structure provides the buffering effect to accommodate the large volume changes often associated with the alloying/de-alloying of lithium/sodium with these metal/metal oxide and ceramic composite compounds.

Tin (Sn)-based derivatives such as tin oxides, tin sulfides, and stannates have become attractive anode materials for LIBs and SIBs. In LIBs, the popularity of these Sn-based lithium alloys stem from their properties that include; the ability to inhibit solvent co-intercalation and significant improvement in electrochemical performance over the commercial graphite anode. In addition, these Sn-based/carbon composite nanofibers are easy to process and exhibit a lower potential hysteresis compared to other transition metal oxides. The crystal structure of Sn has the ability to host a higher amount of lithium ions, i.e. about four (4) atoms (i.e. $Li_xSn$, $0<X\leq4.4$) compared to carbonaceous anodes (i.e. $Li_xC_6$, $0<X\leq1$) thereby giving Sn-based/C composite nanofibers a higher lithium storage capacity. Typically, the Sn-based/C composite nanofiber anodes show a reversible capacity between 800 $mAhg^{-1}$ and 600 $mAhg^{-1}$ even at a higher current density of 200 $mAg^{-1}$ to 1 $Ahg^{-1}$. The electrochemical performance has been found to depend largely on the carbonization temperature which tends to have a direct impact on the fiber morphology, structure, and the pore distribution.

Ternary composites of Sn/C nanofibers containing other metals and their oxides have been investigated and shown to further improve the conductivity, the cyclability and rate performance of the composite anode. Tin-based ternary composites such as $SnO_2/ZnO$ heterogeneous nanofibers, nitrogen doped CNFs with Sn quantum dots, $SnS_2/SnO_2$ composites, Co—Sn alloy carbon nanofibers, and $Fe_3O_4/SnO_2$ coaxial nanofibers have been reported to enhance the electrochemical performance when used as anodes in LIBs and SIBs. The N-doped Sn/CNFs for instance, provide fast and versatile electrolyte transport and acts as efficient electron transport pathways and stable mechanical support to keep the structural integrity of the electrodes during charge/discharge cycles and preventing pulverization of the composite electrode, while the cobalt in Sn/C composite nanofibers reduces the volume expansion and enhances the electrical conductivity of the electrode. Tin sulfides have recently attracted interest as promising anode materials for SIBs due to their high theoretical capacity and superior electrochemical performance. $SnS_2$ and SnS can deliver a theoretical capacity of 1136 and 1022 $mAhg^{-1}$, respectively. However, the pristine $SnS_2$ and SnS anodes show poor rate and cycling stability. To enhance and electrochemical performance of these Sn-sulfides, $SnS_2/C$ and $SnS_2/SnO_2/C$ composite nanofibers have been developed in this work as alternative anode materials for LIBs and SIBs.

SUMMARY OF THE INVENTION

In some embodiments, tin and tin sulfide based composite nanofibers and tin/nickel binary composite nanofibers are used as alternative anode electrodes for Lithium-ion batteries (LIBs) and sodium-ion batteries (SIBs). The composite nanofibers were prepared using centrifugal spinning (e.g., Forcespinning®). The centrifugal spinning method has several features such as: capability for dual material feed that allows the continuous material feed; an almost 100% yield and solvent-free processing for melt spinning with melt temperatures up to 350° C.; and requires less solvent or no solvent at all, thereby making it a more cost effective method and better safety of operation compared to other nanofiber making techniques such as electrospinning and melt-blowing. The collected fibrous mats were subjected to different thermal treatments to produce uniform and flexible tin oxide, tin sulfide and tin/nickel composite nanofibers with hairy-like morphology of the dispersed metal particles on the porous fiber strands.

In an embodiment, a method of producing tin-containing carbon fibers, comprises: dispersing a tin-containing compound in a solvent; dissolving a base polymer in the solvent to form a mixture of the base polymer and the tin-containing compound, wherein the base polymer is convertible into carbon fibers when heated; placing the mixture into a body of a fiber producing device, the body comprising one or more openings; rotating the fiber producing device at a speed of at least about 500 rpm, wherein rotation of the fiber producing device causes the polymer in the body to be passed through one or more openings to produce microfibers and/or nanofibers comprising the polymer; collecting at least a portion of the produced microfibers and/or nanofibers; and heating the collected fibers at a temperature sufficient to convert at least a portion of the base polymer in the collected fibers into carbon fibers comprising tin.

In an embodiment, centrifugal spinning is used to create the fibers. During centrifugal spinning, the microfibers and/or nanofibers are created without subjecting the fibers, during their creation, to an externally applied electric field.

The concentration of polymer in the solvent is between about 5% by weight to about 20% by weight. In an embodiment, the base polymer is polyacrylonitrile and the solvent is dimethyl formamide.

In an embodiment, the tin-containing particles are elemental tin particles. Alternatively, the tin-containing particles may be elemental tin particles, tin (II) oxide particles, tin (II) sulfide particles or combinations thereof. In some embodiments, the mixture further comprises nickel-containing particles. The nickel-containing particles may be nickel (II) particles.

After the fibers are formed, the fibers may be heated to a temperature of about 400° C. to about 900° C. to convert the base polymer in the collected fibers into carbon fibers. The fibers may be stabilized, before conversion to carbon fibers, by heating the fibers at a temperature of between about 50° C. to about 200° C. under vacuum to remove water from the fibers; and heating the fibers in air at a temperature of between about 200° C. to about 400° C.

BRIEF DESCRIPTION OF THE DRAWINGS

Advantages of the present invention will become apparent to those skilled in the art with the benefit of the following detailed description of embodiments and upon reference to the accompanying drawings in which.

Figure 1A:
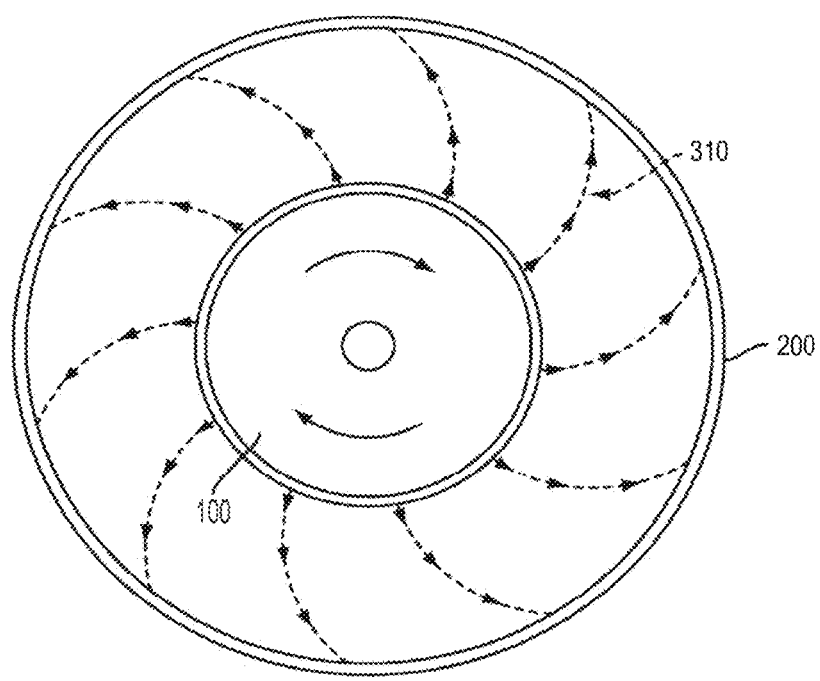
FIG. 1A shows a top view of a fiber producing device and a collection wall.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a method or apparatus that "comprises," "has," "includes" or "contains" one or more steps or elements possesses those one or more steps or elements, but is not limited to possessing only those one or more steps or elements. Likewise, an element of an apparatus that "comprises," "has," "includes" or "contains" one or more features possesses those one or more features, but is not limited to possessing only those one or more features.

As used herein the term "tin-containing" refers to particles or compositions that include tin. For example, tin-containing particles refer to particles such as elemental tin particles, tin oxide particles, or tin organometallic compounds (e.g., tin (II) 2-ethylhexanoate). Tin-containing compositions include compositions that include tin. For example, tin-containing compositions include tin nanoparticles suspended in a suitable solvent (e.g., DMF) or tin organometallic compounds dissolved in a suitable solvent. Similarly, the term nickel-containing refers to particles or compositions that include nickel. The term "tin (II)" refers to tin molecules having tin in the +2 oxidation state. The term "nickel (II)" refers to nickel molecules having nickel in the +2 oxidation state.

In an embodiment, a method of producing tin-containing carbon fibers, includes: dispersing tin-containing particles in a solvent; dissolving a base polymer in the solvent to form a mixture of the base polymer and the tin-containing particles, wherein the base polymer is convertible into carbon fibers when heated; placing the mixture into a body of a fiber producing device, the body comprising one or more openings; rotating the fiber producing device at a speed of at least about 500 rpm, wherein rotation of the fiber producing device causes the polymer in the body to be passed through one or more openings to produce microfibers and/or nanofibers comprising the polymer; collecting at least a portion of the produced microfibers and/or nanofibers; and heating the collected fibers at a temperature sufficient to convert at least a portion of the base polymer in the collected fibers into carbon fibers comprising tin.

In some embodiments, the base polymer is a carbon rich polymer. Particularly useful polymers include polyacrylonitrile ("PAN"), polyvinyl alcohol, cellulose polymers (e.g., viscose rayon and cotton), and pitch. Other polymers which are readily convertible into carbon fibers by heating may be used. In some embodiments, the concentration of polymer in the solvent is between about 5% by weight to about 20% by weight.

Solvents that may be used include any liquids generally recognized as solvents, including, but not limited to: water; alcohols (e.g., methanol, ethanol); ethers, ketones (e.g., acetone), acetates (e.g., ethyl acetate); and aprotic polar solvents (e.g., dimethylformamide, dimethyl sulfoxide).

In an embodiment, dispersing the tin-containing particles in a solvent comprises dispersing tin nanoparticles in the solvent. In some embodiments, in addition to the tin-containing particles, nickel containing particles are also added to the solvent. The addition of nickel allows the formation of binary Sn—Ni carbon fibers. In some embodiments, organometallic particles of tin and, in some instances, nickel are used to form composite carbon fibers.

In an embodiment, the, wherein the fibers are created without subjecting the fibers, during their creation, to an externally applied electric field. In an embodiment, centrifugal spinning may be used to create the fibers. Apparatuses and methods that may be used to create fibers using centrifugal spinning are described in the following U.S. Published Patent Applications: 2009/0280325; 2009/0269429; 2009/0232920; and 2009/0280207, all of which are incorporated herein by reference.

Figure 1B:
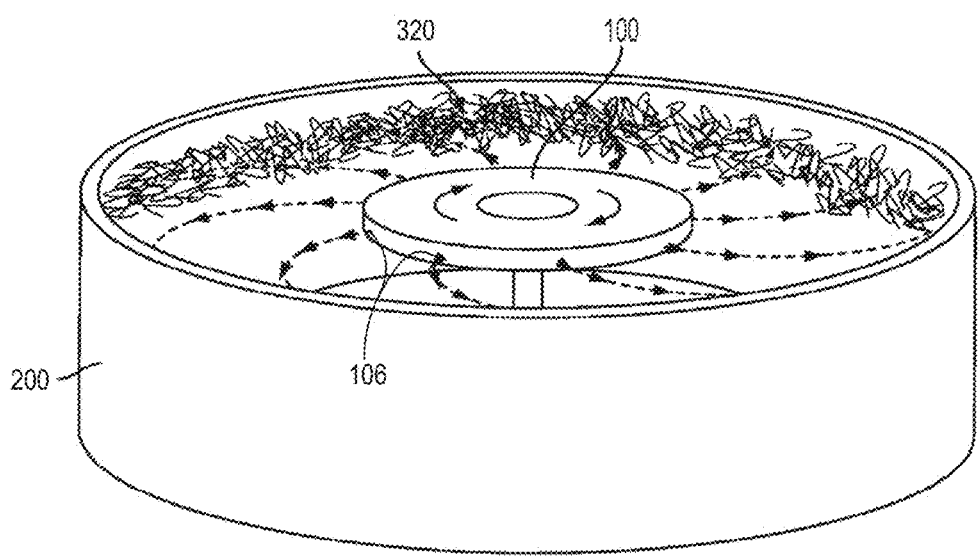
FIG. 1B shows a projection view of a fiber producing device that includes a fiber producing device as depicted in FIG. 1A and a collection wall.

FIG. 1A shows a top view of an exemplary fiber producing system that includes a fiber producing device 100 and a collection wall 200. FIG. 1B shows a projection view of a fiber producing system that includes a fiber producing device 100 and a collection wall 200. As depicted, fiber producing device 100 is spinning clockwise about a spin axis, and material is exiting openings 106 of the fiber producing device as fibers 320 along various pathways 310. The fibers are being collected on the interior of the surrounding collection wall 200.

Figure 2A:
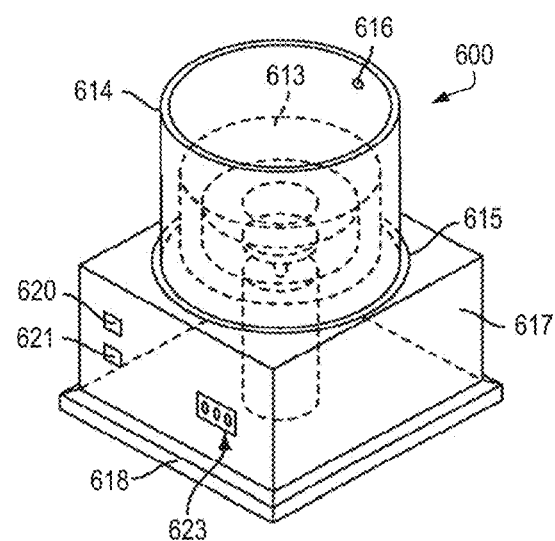
FIG. 2A shows a partially cut-away perspective view of an embodiment of a fiber producing system.
Figure 2B:
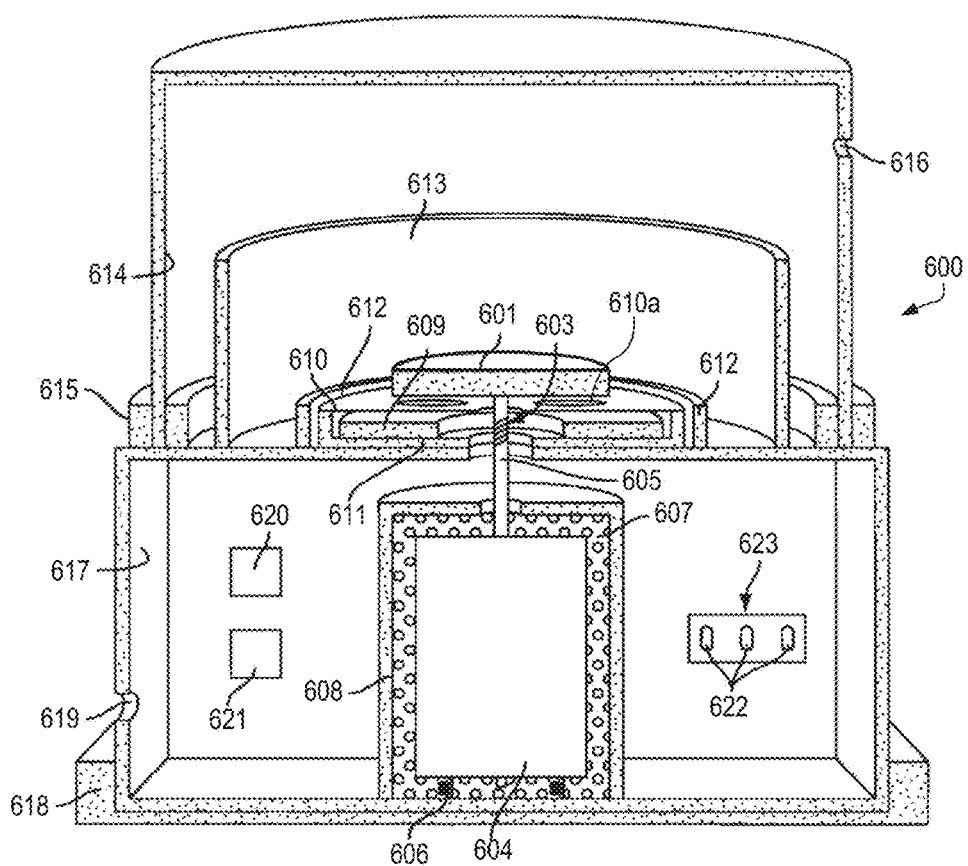
FIG. 2B depicts a cross-sectional view of a fiber producing system.

FIG. 2A shows a partially cut-away perspective view of an embodiment of a fiber producing system 600. FIG. 2B depicts a cross-sectional view of fiber producing system 600. System 600 includes fiber producing device 601, which has peripheral openings and is coupled to a threaded joint 603, such as a universal threaded joint, which, in turn, is coupled to a motor 604 via a shaft 605. Motor 604, such as a variable speed motor, is supported by support springs 606 and is surrounded by vibration insulation 607 (e.g., high-frequency vibration insulation). A motor housing 608 encases the motor 604, support springs 606 and vibration insulation 607. A heating unit 609 is enclosed within enclosure 610 (e.g., a heat reflector wall) that has openings 610a that direct heat (thermal energy) to fiber producing device 601. In the embodiment shown, heating unit 609 is disposed on thermal insulation 611. Surrounding the enclosure 610 is a collection wall 612, which, in turn, is surrounded by an intermediate wall 613. A housing 614 seated upon a seal 615 encases fiber producing device 601, heating enclosure 610, collection wall 612 and intermediate wall 613. An opening 616 in the housing 614 allows for introduction of fluids (e.g., gases such as air, nitrogen, helium, argon, etc.) into the internal environment of the apparatus, or allows fluids to be pumped out of the internal environment of the apparatus. The lower half of the system is encased by a wall 617 which is supported by a base 618. An opening 619 in the wall 617 allows for further control of the conditions of the internal environment of the apparatus. Indicators for power 620 and electronics 621 are positioned on the exterior of the wall 617 as are control switches 622 and a control box 623.

A control system of an apparatus 622 allows a user to change certain parameters (e.g., RPM, temperature, and environment) to influence fiber properties. One parameter may be changed while other parameters are held constant, if desired. One or more control boxes in an apparatus may provide various controls for these parameters, or certain parameters may be controlled via other means (e.g., manual opening of a valve attached to a housing to allow a gas to pass through the housing and into the environment of an apparatus). It should be noted that the control system may be integral to the apparatus (as shown in FIGS. 2A and 2B) or may be separate from the apparatus. For example, a control system may be modular with suitable electrical connections to the apparatus.

Figure 3:
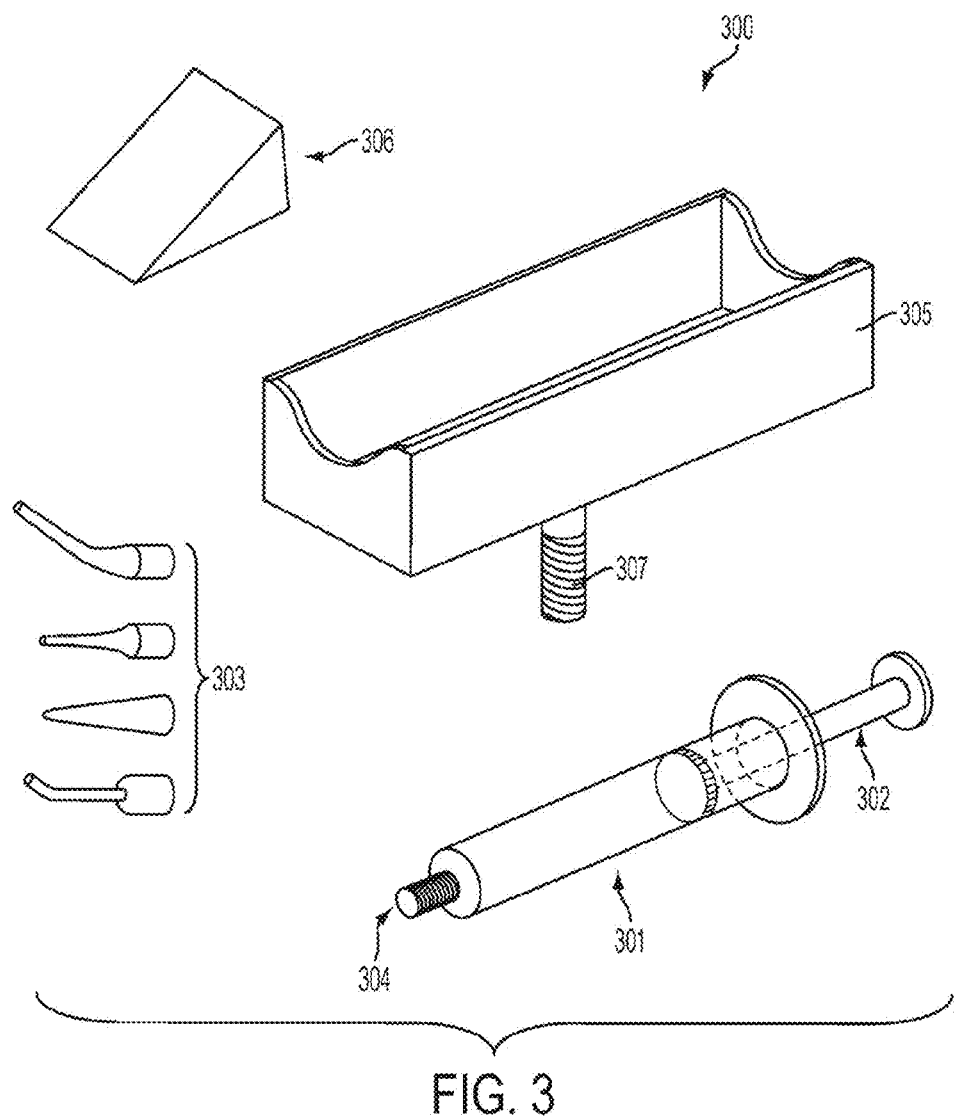
FIG. 3 depicts an embodiment of the present spinnerets that includes a syringe, plunger and various needles as well as a syringe support device.

FIG. 3 shows another embodiment of the present spinnerets. Spinneret 300 comprises a syringe 301 equipped with a plunger 302 and a variety of needles 303 that may optionally be connected to the syringe 301 at the opening 304. The syringe 301 may be placed atop the syringe support device 305. The syringe support device 305 may also serve as a superfine fiber collection device, as discussed herein. The wedge 306 may optionally be positioned between the syringe 301 and the syringe support device 305 in order to alter the angle at which the material is ejected from the syringe 301. A threaded joint 307, such as a universal threaded joint, is shown attached to the syringe support device 305.

Figure 4A:
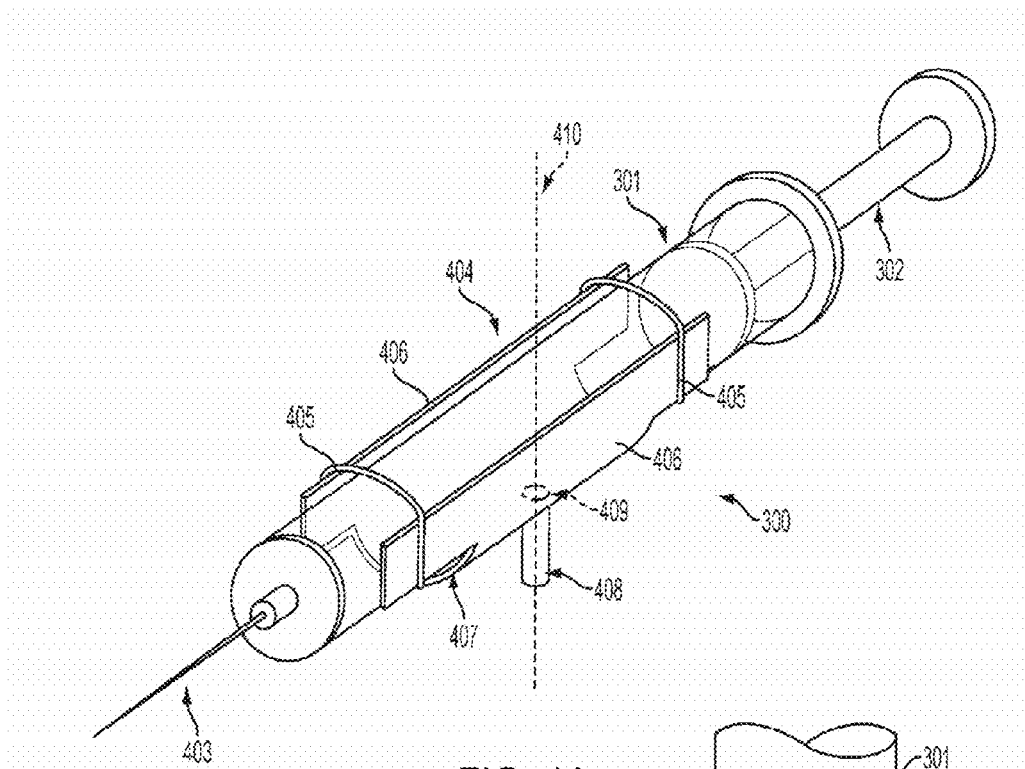
FIGS. 4A-B depict different views of an embodiment of the present spinnerets that includes a syringe secured to a syringe support device, where the syringe is equipped with a needle and a plunger.
Figure 4B:
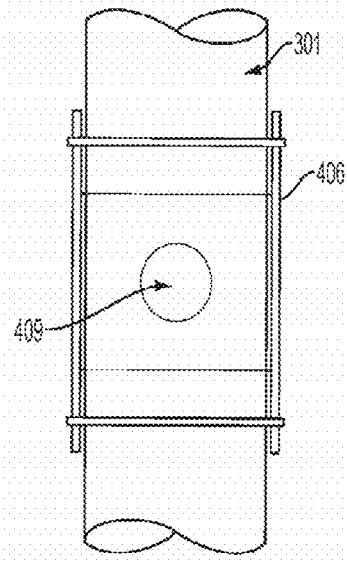

FIG. 4 shows a spinneret, such as spinneret 300, in assembled form. A syringe 301 equipped with a plunger 302 and a needle 403 is secured to a syringe support device 404 using two clamps 405. Typically, 10-500 mL of material are placed in the syringe, but this amount may vary depending on the size of syringe. The syringe support device comprises two walls 406 and a base 407. The walls 406 may be straight or cylindrical (curved). Superfine fibers may collect on the exterior of walls 406 as they exit a spinneret like spinneret 300: thus this syringe support device may also act as a superfine fiber collection device. A threaded joint 408, such as a universal threaded joint, is shown attached to the syringe support device 404 at the hole 409. The spin axis 410 of this spinneret extends centrally and vertically through the hole 409. This spinneret may be used for solution spinning. In certain embodiments, a spinneret of this type is spun for 10-1,000 seconds to form superfine fibers. This spinneret may also be operated in a continuous mode for longer amounts of time.

Figure 5A:
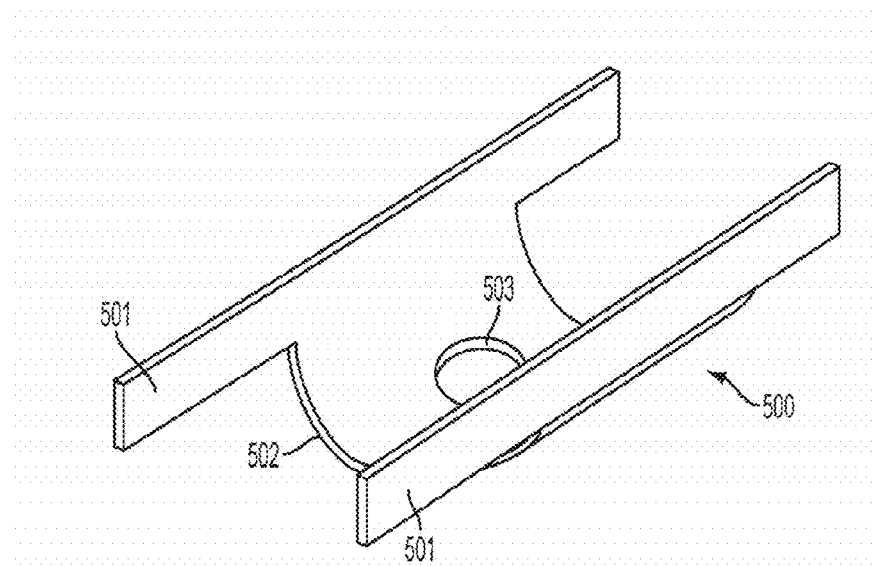
FIGS. 5A-B depict different views of an embodiment of the present syringe support devices.
Figure 5B:
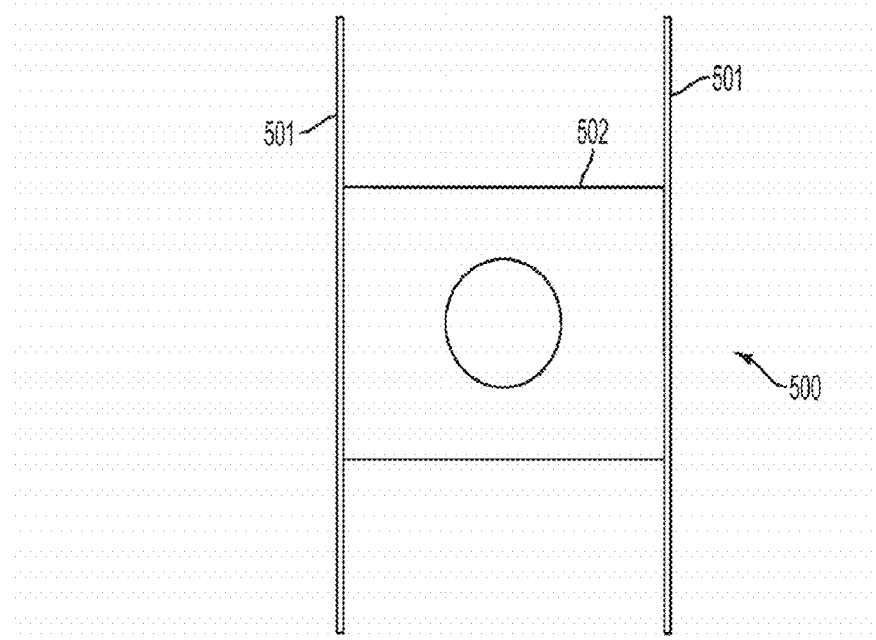

A syringe support device 500 that may also act as a superfine fiber collection device is shown in FIG. 5. The device comprises two walls 501 and a base 502 onto which a syringe may be placed. The walls 501 may be cylindrical (curved). Base 502 includes a hole 503 is configured to attach to a driver, such as through a universal threaded joint. Superfine fibers may collect on the exterior of walls 501 as they exit a spinneret like spinneret 300: thus this syringe support device may also act as a superfine fiber collection device.

Figure 6:
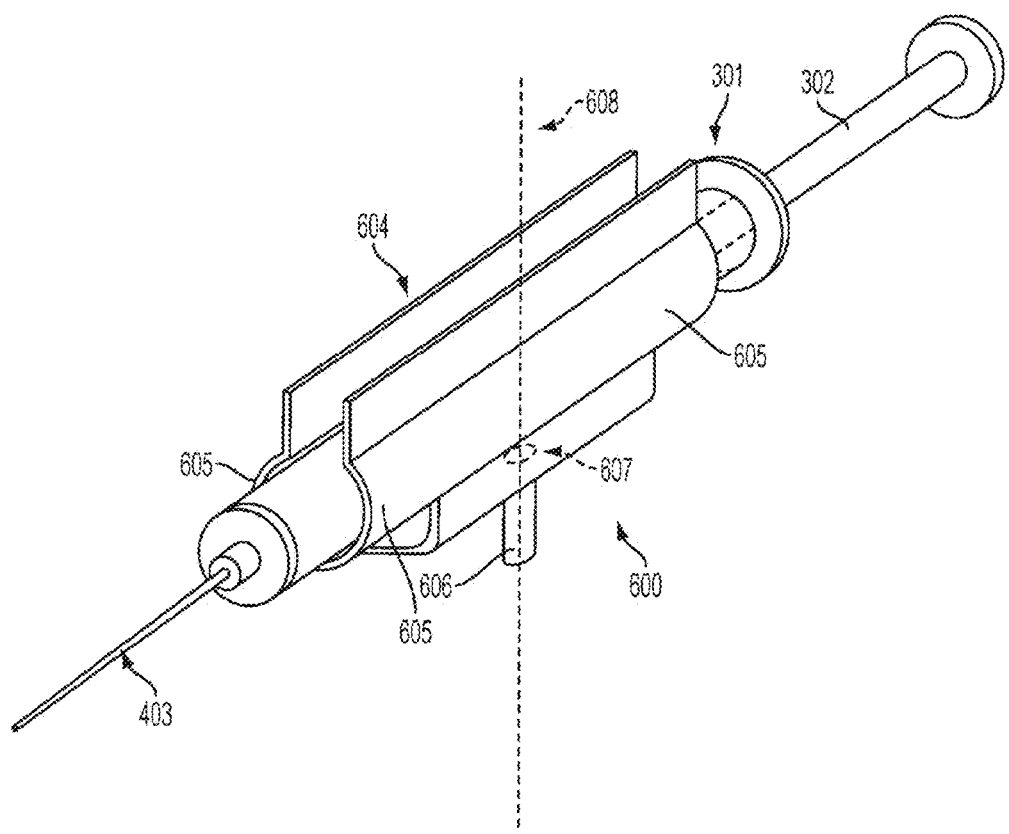
FIG. 6 depicts an embodiment of the present spinnerets that includes a syringe secured to a syringe support device, where the syringe is equipped with a needle and a plunger.

FIG. 6 shows spinneret 600, which comprises a syringe 301 equipped with a plunger 302 and a needle 403. The syringe 301 is held by the syringe support device 604 through tension between opposing cylindrical walls 605. Non-limiting mechanisms for attachment may include a snap fit or an adhesive joint. The syringe support device 604 may also act as a superfine fiber collection device by collecting superfine fibers as they exit spinneret 600, such as on the exterior of walls 605. A threaded joint 606, such as a universal threaded joint, is shown attached to the syringe support device 604 at the hole 607. The spin axis 608 of this spinneret extends centrally and vertically through the hole 607. Spinneret 600 may be used for solution spinning. Typically, 10-500 mL of material are placed in the syringe, but this amount may vary depending on the size of syringe. In certain embodiments, a spinneret of this type is spun for 10-1,000 seconds to form superfine fibers. This spinneret may also be operated in a continuous mode for longer amounts of time.

Figure 7:
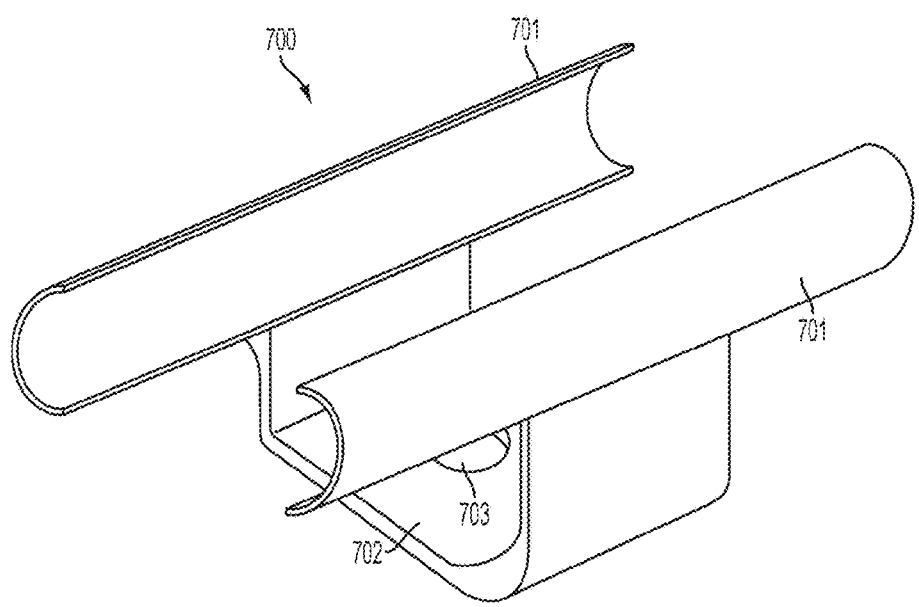
FIG. 7 depicts an embodiment of the present syringe support devices.

FIG. 7 shows a syringe support device 700 that may act as a superfine fiber collection device. Syringe support device 700 includes opposing arcuate (curved) walls 701 configured to contact the cylindrical outer wall of a syringe, and a base 702 that includes a hole 703. Superfine fibers may collect on the exterior of walls 701 as they exit a spinneret like spinneret 300: thus this syringe support device may also act as a superfine fiber collection device.

In certain methods described herein, material spun in a fiber producing device may undergo varying strain rates, where the material is kept as a melt or solution. Since the strain rate alters the mechanical stretching of the fibers created, final fiber dimension and morphology may be significantly altered by the strain rate applied. Strain rates are affected by, for example, the shape, size, type and RPM of a fiber producing device. Altering the viscosity of the material, such as by increasing or decreasing its temperature or adding additives (e.g., thinner), may also impact strain rate. Strain rates may be controlled by a variable speed fiber producing device. Strain rates applied to a material may be varied by, for example, as much as 50-fold (e.g., 500 RPM to 25,000 RPM).

Temperatures of the material, fiber producing device and the environment may be independently controlled using a control system. The temperature value or range of temperatures employed typically depends on the intended application. For example, for many applications, temperatures of the material, fiber producing device and the environment typically range from −4° C. to 400° C. Temperatures may range as low as, for example, −20° C. to as high as, for example, 2500 C. For solution spinning, ambient temperatures of the fiber producing device are typically used.

As the material is ejected from the spinning fiber producing device, thin jets of the material are simultaneously stretched and dried in the surrounding environment. Interactions between the material and the environment at a high strain rate (due to stretching) lead to solidification of the material into polymeric fibers, which may be accompanied by evaporation of solvent. By manipulating the temperature and strain rate, the viscosity of the material may be controlled to manipulate the size and morphology of the polymeric fibers that are created. With appropriate manipulation of the environment and process, it is possible to form polymeric fibers of various configurations, such as continuous, discontinuous, mat, random fibers, unidirectional fibers, woven and unwoven, as well as fiber shapes, such as circular, elliptical and rectangular (e.g., ribbon). Other shapes are also possible. The produced fibers may be single lumen or multi-lumen.

By controlling the process parameters, fibers can be made in micron, sub-micron and nano-sizes, and combinations thereof. In general, the fibers created will have a relatively narrow distribution of fiber diameters. Some variation in diameter and cross-sectional configuration may occur along the length of individual fibers and between fibers.

Generally speaking, a fiber producing device helps control various properties of the fibers, such as the cross-sectional shape and diameter size of the fibers. More particularly, the speed and temperature of a fiber producing device, as well as the cross-sectional shape, diameter size and angle of the outlets in a fiber producing device, all may help control the cross-sectional shape and diameter size of the fibers. Lengths of fibers produced may also be influenced by fiber producing device choice.

The speed at which a fiber producing device is spun may also influence fiber properties. The speed of the fiber producing device may be fixed while the fiber producing device is spinning, or may be adjusted while the fiber producing device is spinning. Those fiber producing devices whose speed may be adjusted may, in certain embodiments, be characterized as "variable speed fiber producing devices." In the methods described herein, the structure that holds the material may be spun at a speed of about 500 RPM to about 25,000 RPM, or any range derivable therein. In certain embodiments, the structure that holds the material is spun at a speed of no more than about 50,000 RPM, about 45,000 RPM, about 40,000 RPM, about 35,000 RPM, about 30,000 RPM, about 25,000 RPM, about 20,000 RPM, about 15,000 RPM, about 10,000 RPM, about 5,000 RPM, or about 1,000 RPM. In certain embodiments, the structure that holds the material is rotated at a rate of about 5,000 RPM to about 25,000 RPM.

In an embodiment, material may be positioned in a reservoir of the fiber producing device. The reservoir may, for example, be defined by a concave cavity of the fiber producing device. In certain embodiments, the fiber producing device includes one or more openings in communication with the concave cavity. The fibers are extruded through the opening while the fiber producing device is rotated about a spin axis. The one or more openings have an opening axis that is not parallel with the spin axis. The fiber producing device may include a body that includes the concave cavity and a lid positioned above the body such that a gap exists between the lid and the body, and the nanofiber is created as a result of the rotated material exiting the concave cavity through the gap.

Certain fiber producing devices have openings through which material is ejected during spinning. Such openings may take on a variety of shapes (e.g., circular, elliptical, rectangular, square, triangular, or the like) and sizes: (e.g., diameter sizes of 0.01-0.80 mm are typical). The angle of the opening may be varied between ±15 degrees. The openings may be threaded. An opening, such as a threaded opening, may hold a needle, where the needle may be of various shapes, lengths and gauge sizes. Threaded holes may also be used to secure a lid over a cavity in the body of a fiber producing device. The lid may be positioned above the body such that a gap exists between the lid and the body, and a fiber is created as a result of the spun material exiting the cavity through the gap. Fiber producing devices may also be configured such that one fiber producing device may replace another within the same apparatus without the need for any adjustment in this regard. A universal threaded joint attached to various fiber producing devices may facilitate this replacement. Fiber producing devices may also be configured to operate in a continuous manner.

Any method described herein may further comprise collecting at least some of the microfibers and/or nanofibers that are created. As used herein "collecting" of fibers refers to fibers coming to rest against a fiber collection device. After the fibers are collected, the fibers may be removed from a fiber collection device by a human or robot. A variety of methods and fiber (e.g., nanofiber) collection devices may be used to collect fibers. For example, regarding nanofibers, a collection wall may be employed that collects at least some of the nanofibers. In certain embodiments, a collection rod collects at least some of the nanofibers. The collection rod may be stationary during collection, or the collection rod may be rotated during collection.

Regarding the fibers that are collected, in certain embodiments, at least some of the fibers that are collected are continuous, discontinuous, mat, woven, unwoven or a mixture of these configurations. In some embodiments, the fibers are not bundled into a cone shape after their creation. In some embodiments, the fibers are not bundled into a cone shape during their creation. In particular embodiments, fibers are not shaped into a particular configuration, such as a cone figuration, using air, such as ambient air, that is blown onto the fibers as they are created and/or after they are created.

Present method may further comprise, for example, introducing a gas through an inlet in a housing, where the housing surrounds at least the fiber producing device. The gas may be, for example, nitrogen, helium, argon, or oxygen. A mixture of gases may be employed, in certain embodiments.

The environment in which the fibers are created may comprise a variety of conditions. For example, any fiber discussed herein may be created in a sterile environment. As used herein, the term "sterile environment" refers to an environment where greater than 99% of living germs and/or microorganisms have been removed. In certain embodiments, "sterile environment" refers to an environment substantially free of living germs and/or microorganisms. The fiber may be created, for example, in a vacuum. For example the pressure inside a fiber producing system may be less than ambient pressure. In some embodiments, the pressure inside a fiber producing system may range from about 1 millimeters (mm) of mercury (Hg) to about 700 mm Hg. In other embodiments, the pressure inside a fiber producing system may be at or about ambient pressure. In other embodiments, the pressure inside a fiber producing system may be greater than ambient pressure. For example the pressure inside a fiber producing system may range from about 800 mm Hg to about 4 atmospheres (atm) of pressure, or any range derivable therein.

In certain embodiments, the fiber is created in an environment of 0-100% humidity, or any range derivable therein. The temperature of the environment in which the fiber is created may vary widely. In certain embodiments, the temperature of the environment in which the fiber is created can be adjusted before operation (e.g., before rotating) using a heat source and/or a cooling source. Moreover, the temperature of the environment in which the fiber is created may be adjusted during operation using a heat source and/or a cooling source. The temperature of the environment may be set at sub-freezing temperatures, such as −20° C., or lower. The temperature of the environment may be as high as, for example, 2500° C.

The fibers that are created may be, for example, one micron or longer in length. For example, created fibers may be of lengths that range from about 1 μm to about 50 cm, from about 100 μm to about 10 cm, or from about 1 mm to about 1 cm. In some embodiments, the fibers may have a narrow length distribution. For example, the length of the fibers may be between about 1 μm to about 9 μm, between about 1 mm to about 9 mm, or between about 1 cm to about 9 cm. In some embodiments, when continuous methods are performed, fibers of up to about 10 meters, up to about 5 meters, or up to about 1 meter in length may be formed.

In certain embodiments, the cross-section of the fiber may be circular, elliptical or rectangular. Other shapes are also possible. The fiber may be a single-lumen lumen fiber or a multi-lumen fiber.

In another embodiment of a method of creating a fiber, the method includes: spinning material to create the fiber; where, as the fiber is being created, the fiber is not subjected to an externally-applied electric field or an externally-applied gas; and the fiber does not fall into a liquid after being created.

Fibers discussed herein are a class of materials that exhibit an aspect ratio of at least 100 or higher. The term "microfiber" refers to fibers that have a minimum diameter in the range of 10 microns to 700 nanometers, or from 5 microns to 800 nanometers, or from 1 micron to 600 nanometers. The term "nanofiber" refers to fibers that have a minimum diameter in the range of 500 nanometers to 1 nanometer; or from 250 nanometers to 10 nanometers, or from 100 nanometers to 20 nanometers.

Fibers may be analyzed via any means known to those of skill in the art. For example, Scanning Electron Microscopy (SEM) may be used to measure dimensions of a given fiber. For physical and material characterizations, techniques such as differential scanning calorimetry (DSC), thermal analysis (TA) and chromatography may be used.

Formation of Carbon Fibers from the Precursor Fibers

In one embodiment, tin-containing carbon fibers may be produced by subjecting tin-containing polymer precursor fibers to heat treatment. In an embodiment, the fibers produced by the centrifugal spinning process are heated to a temperature of about 400° C. to about 900° C. to convert the base polymer in the collected fibers into carbon fibers. Prior to carbon fiber formation, the fibers may be stabilized by heating the fibers at a temperature of between about 50° C. to about 200° C. under vacuum to remove water from the fibers; and heating the fibers in air at a temperature of between about 200° C. to about 400° C.

The produced tin-containing carbon fibers may be used as an electrode (e.g., the anode) of an electrochemical cell (e.g., an anode of a lithium ion battery or a sodium ion battery). The tin-containing carbon fibers are generally free-standing and can be used without the need for binders or conductive additives.

EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Materials

Poly(acrylonitrile) with average Mw 150,000, used as the carbon precursor, was purchased from Sigma Aldrich USA, while solvent N,N-dimethyl formamide (DMF) was obtained from Fisher Scientific USA. The commercial lithium foil, and the lithium hexafluorophosphate ($LiPF_6$), ethylene carbonate (EC), dimethyl carbonate (DMC) were purchased from MTI corp. USA, while a Whatman glass microfiber from GE Healthcare was used as separator. Tin nanopowder (Sn, 99.9%, 60-80 nm) was purchased from US research Nanomaterials. Tin submicron particles (Sn 99.9%, 150 nm) were purchased from Sigma Aldrich USA and used as received. The Tin (II) 2-ethylhexanoate, Nickel (II) acetate tetrahydrate (98%) Tin (II) chloride dehydrate, Thiourea, Sodium rock (Na Mw 22.9 g/mol) and $NaClO_4$ were purchased from Sigma Aldrich USA and used as received.

Structural Analysis—General Methodology

The structure, morphology, and elemental composition of the Sn/C, $SnO_2$/NiO/C, $SnS_2$/C and $SnS_2$/$SnO_2$/C composite nanofiber mats were analyzed using scanning transmission electron microscopy (STEM/EDAX) from Sigma VP Carl Zeiss. While the crystal structure and the surface analysis were evaluated using X-rays powder diffraction and XPS from Bruker and Thermo Scientific respectively. The thermal and residual weight of carbon in the Sn/PAN, $SnO_2$/NiO/PAN, $SnS_2$/PAN and $SnS_2$/$SnO_2$/PAN fibrous mats were carried out using Thermo-Gravimetric analyzer (TGA) from TA Instruments (QA 600). The temperature was ramped up from 24° C. to 700° C. using a heating rat of 10° C./min in nitrogen gas.

Sn/C NF Electrodes

The Production of Sn/PAN Fiber Mats

Sn/PAN nanofiber mats were prepared by suspending 15 wt % of tin nanoparticles (either Sn nanoparticles or Sn submicron particles) in DMF. The DMF/Sn suspension was then sonicated in a water bath for 30 min to obtain a homogenous dispersion of Sn particles in the solvent. The base polymer, PAN (12 wt %) was then added to the DMF/Sn suspension and mechanically mixed using magnetic stirring for 24 hours at room temperature.

Nano-fibrous mats of Sn/PAN precursors were then prepared by centrifugal spinning. A thin spunbond fiber was used on a fan box as the substrate for the deposition of fibers. In the centrifugal spinning technique, centrifugal forces are used to extrude polymer solutions or melts through the spinneret. An amount of 2 mL of the precursor solution was injected into the needle-based spinneret equipped with 30 gauge half-inch regular bevel needles. The rotational speed of the spinneret was kept at 8,000 rpm. The substrate was rotated 90° after each run and the needles were changed after each run. The Sn/PAN fibrous mats were removed from the substrate drum and dried at 120° C. under vacuum for 24 hour prior to being carbonized. The nanofiber mats were then further stabilized in air at 280° C. for 5 h, and then calcined at 800° C. for 2 h in an argon atmosphere to obtain the Sn/carbon composite nanofibers (heating rate was 3° C. $min^{-1}$) that were directly used as freestanding anodes in LIB and SIB half cells. For comparison, carbon nanofibers (CNFs) made from PAN (12 wt. %) in DMF solution was also prepared.

Sn/C NFs Half-Cell Assembly

Electrochemical performance evaluations were performed using 2032 coin-type cells containing Sn/C composite nanofibers with various Sn particle size and carbon nanofibers (CNFs). The cells were assembled in a high-purity argon-filled glove box (Mbraun, USA) using a pressure crimper. These CNFs and Sn/C composite nanofibers formed a flexible freestanding nonwoven mats, which were punched directly to be used as binder-free anodes. The anode thickness was approximately 40-60 μm with a weight average in the range of 3-5 mg. Lithium metal was used as the counter electrode and Celgard tri-layer (PP/PE/PP) membrane as the separator. The electrolyte used was a 1 M $LiPF_6$ solution in ethylene carbonate (EC)/dimethyl carbonate (DMC) (1:1 v/v). The electrochemical performance was evaluated by carrying out galvanostatic charge-discharge experiments at a current density of 100 $mAg^{-1}$ and between 0.05 and 3.0 V. The specific charge/discharge capacities were calculated based on the mass of the of the flexible nanofiber anodes (active material). The cyclic voltammetry and electrochemical impedance experiments were evaluated using electrochemical impedance spectroscopy (Autolab 128 N) with a scan rate of 0.2 mV/s (between 0 and 3 V) and at a frequency of 0.1 Hz and 1 kHz, respectively.

Surface Morphology and Elemental Analysis of Sn/C Composite

Figure 8A:
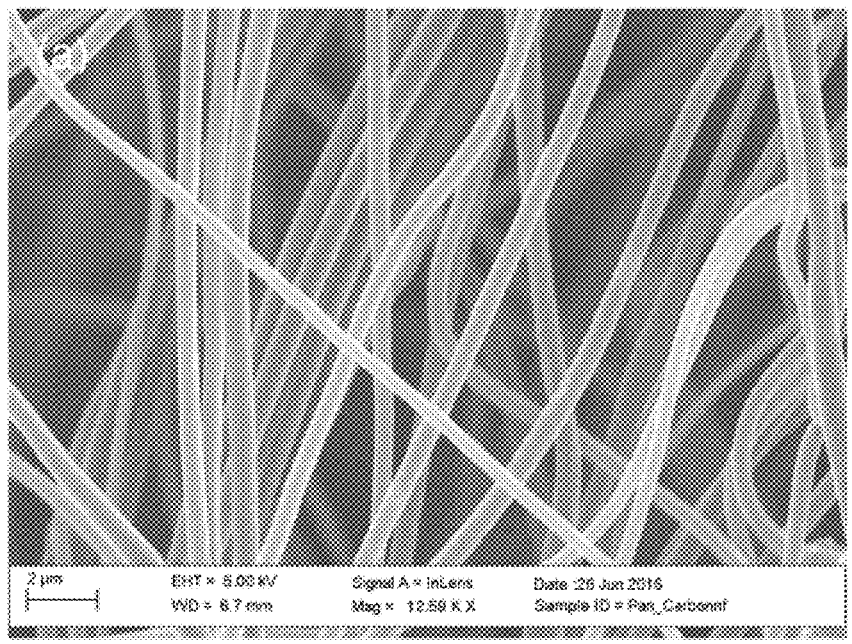
FIG. 8A depicts an SEM image of PAN precursor fibers.
Figure 8B:
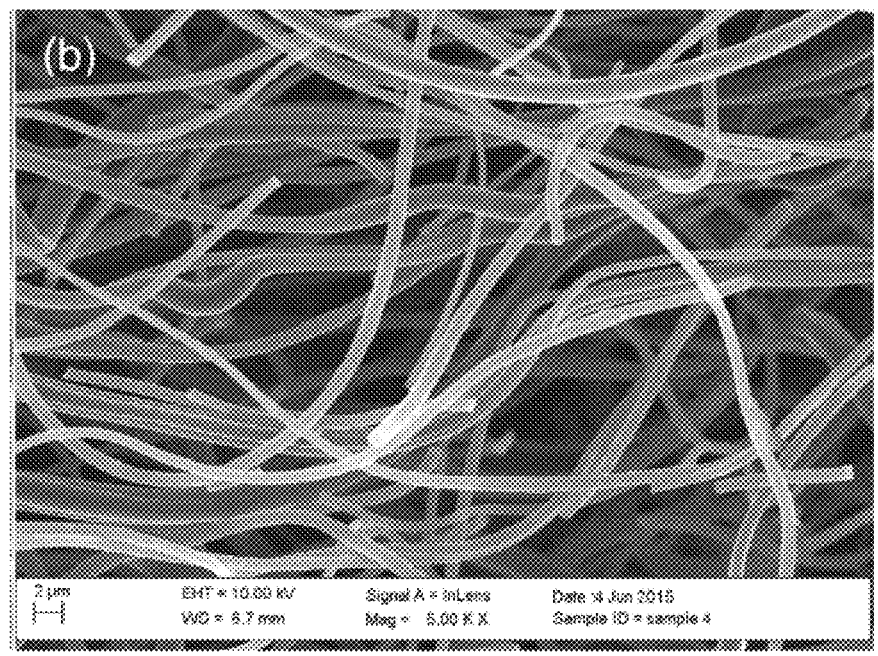
FIG. 8B depicts SEM images of PAN carbon nanofibers.
Figure 8C:
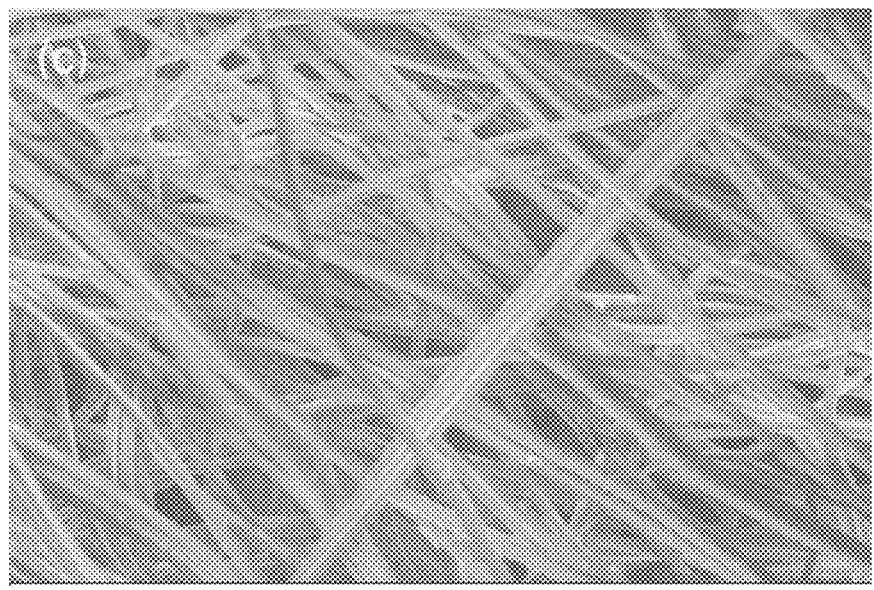
FIG. 8C depicts SEM images of Sn(nanoparticle)/PAN precursor fibers.
Figure 8D:
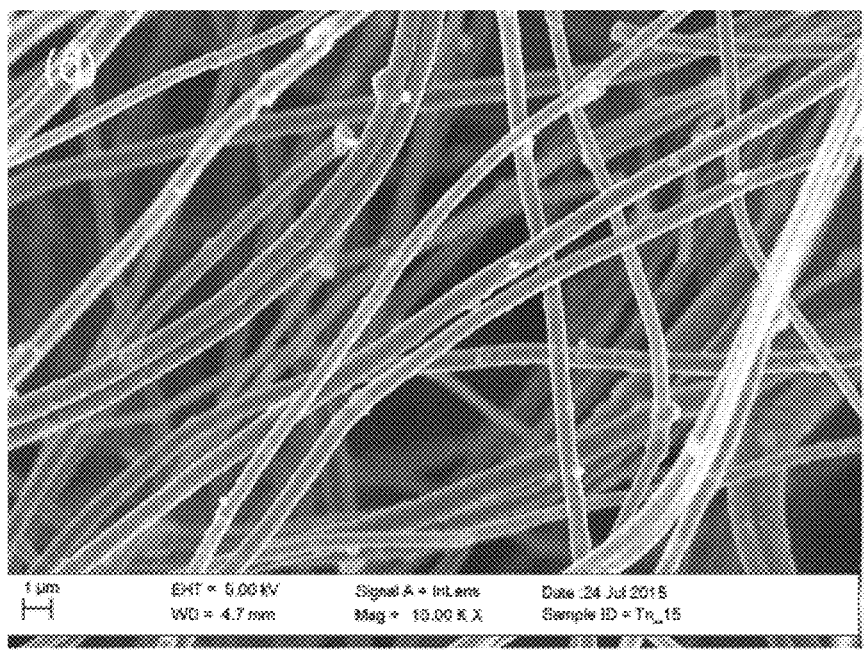
FIG. 8D depicts SEM images of Sn(nanoparticle)/PAN carbon nanofibers.
Figure 8E:
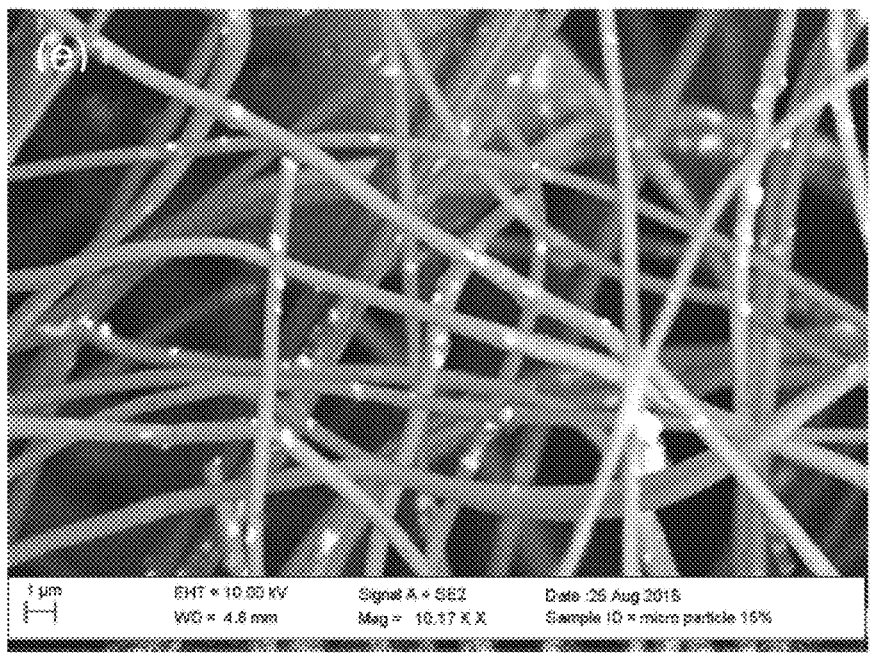
FIG. 8E depicts SEM images of Sn(microparticle)/PAN precursor fibers.
Figure 8F:
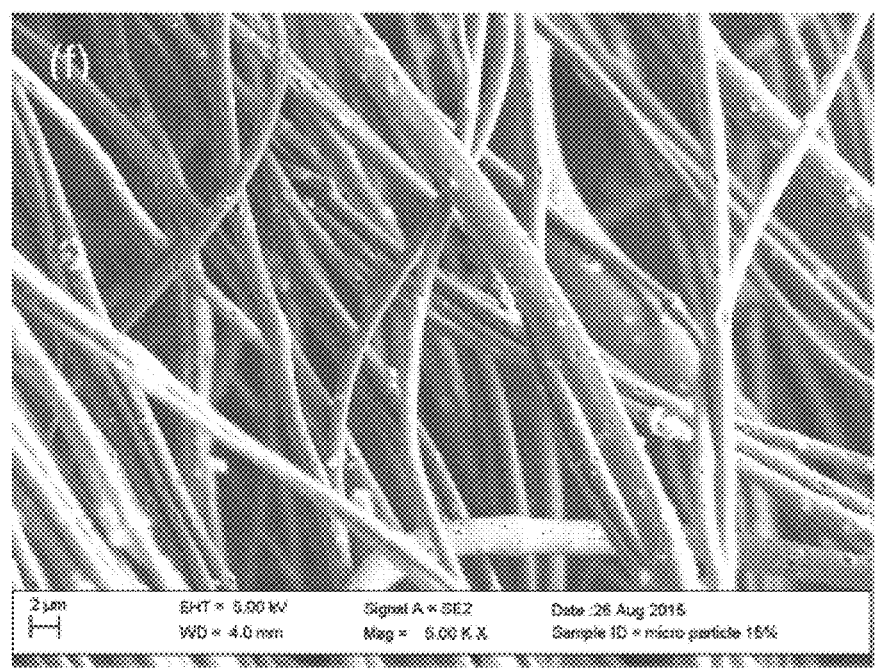
FIG. 8F depicts SEM images of Sn(microparticle)/PAN carbon fibers.

The fibrous structure of the Sn/C composite nanofibers for both the Sn nanoparticles and the Sn submicron particles are shown in FIGS. 8D and 8F respectively. SEM images of PAN precursor nanofibers (i.e. the as-spun PAN fibers) and carbon nanofibers CNFs are shown in FIG. 8A and FIG. 8B respectively. After carbonization at 800° C. in argon atmosphere for 2 h, the PAN fibers were transformed into carbon nanofibers (CNFs) while those of the Sn/PAN fibers transformed to Sn/C composite nanofibers. Generally, there was no variation in the fiber diameters between the baseline (PAN fibers) and the carbonized nanofibers, with the fibers diameters ranging between 200 and 600 nm. Sn particles are distributed along the Sn/C composite nanofibers and some of the particles form clusters on the fiber surface (FIG. 8E) with pores that are evenly distributed on the fibers as shown in FIG. 8D and FIG. 8F. The pore formation was more pronounced on the mirco-particle Sn/C composite fibers compared to those on the Sn (nanoparticles)/C composite fibers. These pores played a key role in buffering/accommodating the volume changes that accompanied the alloying and de-alloying (lithiation and de-lithiation) process of Sn with lithium while small pores in porous CNFs provide additional room for Li insertion during charge. These pores on the Sn/C composite electrode do not exist on the as-forcespun fibers (FIG. 8C and FIG. 8E), meaning that the pores on the fibers were formed after the carbonization process.

EDAX elemental analysis of the composite Sn/C nanofibers shows that the fibers predominantly consisted of Sn and carbon. The areal mapping of the Sn/C composite nanofibers shows that the composite electrode predominantly consists of carbon (86% atomic weight) with Sn (14% atomic weight) where the Sn particles are heterogeneously distributed.

Figure 9:
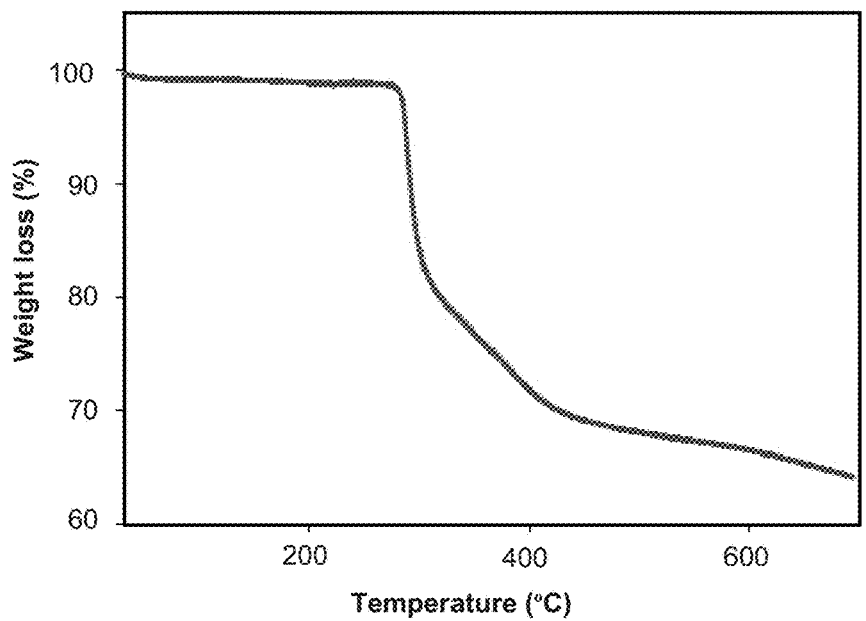
FIG. 9 depicts a TGA thermogram of the Sn/PAN precursor nanofibers.

The actual weight of carbon in the Sn/C composite fibers was evaluated using TGA measurement. As shown in FIG. 9, up to 92° C., a minor weight reduction of ~3% was observed which corresponds to the removal of physically absorbed water from the fibers. At temperatures between 290° C. and 410° C., there is a multistage decomposition that could be attributed to the polymer (Polyacrylonitrile) which recorded a weight loss of ~38%. The oxidation of carbon was observed above 450° C., and beyond 530° C., the weight loss remains steady. The TGA results indicate that the Sn/C fibers contain ~48 wt. % carbon.

Analysis of the Crystal Structure of the Sn/C Composite Electrodes

Figure 10:
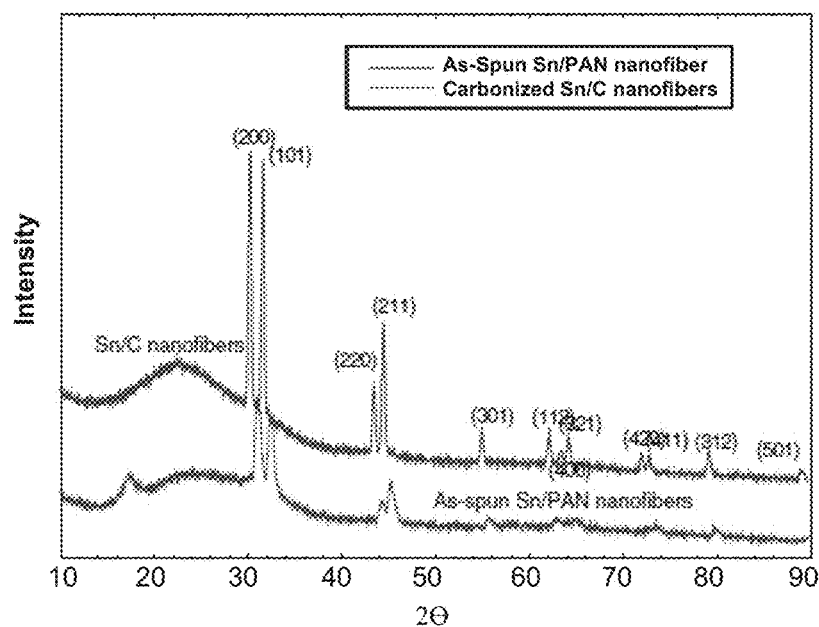
FIG. 10 depicts XRD pattern of Sn/PAN precursor nanofibers and that of Sn/C composite nanofibers.

X-ray diffraction (XRD) analysis (FIG. 10) of the as-synthesized Sn/C nanofibers clearly reveals the diffraction pattern of a tetragonal rutile structure (JCPDS 41-1445) which belongs to the space group $P4_2/mnm$ (136). In addition, a peak at 18° followed by a broad peak belongs to the un-stabilized PAN polymer. The small peak at 18° disappears after carbonization, while the broad amorphous peak still exists after the carbonization process. This phenomenon could be attributed to the presence of hard carbon or non-graphitized carbon in the carbon fiber. During the carbonization process of Sn/PAN precursor nanofibers at 800° C. in inert atmosphere, the PAN polymer was converted into carbon fiber, while the Sn could have been oxidized to SnO$_2$ during the stabilization process at 250° C. and back to the metallic phase at 800° C. during the carbonization process in the inert environment. However, it is expected that a small amount of the oxide will still exist in the final product of Sn/C composite electrode. The peak pattern obtained in the X-ray shows a small amount of SnO$_2$ and metallic Sn. The peaks of the metallic Sn were observed as doublet at 43° in the as-spun Sn/PAN. The carbonization process completely separates the shoulder of the peak of the metallic Sn in the as-spun Sn/PAN nanofiber into two distinct peaks indexed as (220) and (211). Additionally, there was a slight shift of the (200) and the (101) peaks to lower 2θ relative to the baseline, that could be an indication of an increase in the interplanar layer spacing of the Sn/C crystal structure after the carbonization process. The narrowing of the FWHM values also pointed to disordering and increasing in the crystallite size of the Sn/C structure relative to the As-spun Sn/PAN nanofibers. The morphology, crystal growth and crystal structure of tin crystal present in the Sn/C composite nanofibers were shown to be independent of the Sn particle size (i.e. nano or micro) in the Sn/PAN solution precursor.

Another difference, that was observed in the XRD patterns, was the variation of the relatively intensity ratio of peaks of the Sn/PAN precursor nanofibers and that of the Sn/C composite nanofibers which is an indication of enhanced crystallinity and large crystal size due largely to the carbonization process. The XRD results are in agreement with those observed in the literature on Sn/C composite nanofiber anodes.

Surface Analysis (XPS)

Figure 11A:
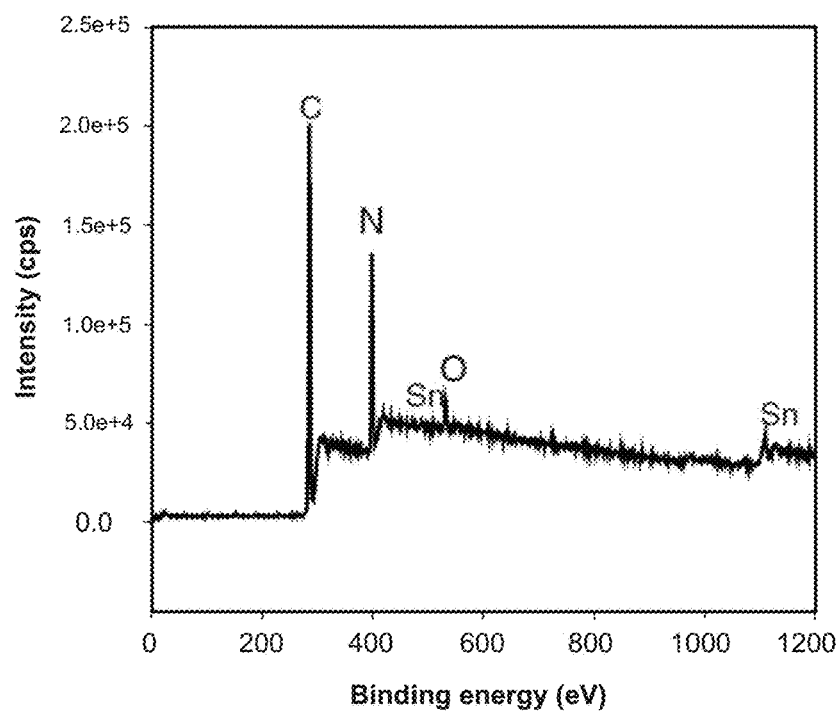
FIG. 11A depicts the survey spectra of the Sn/PAN precursor.
Figure 11B:
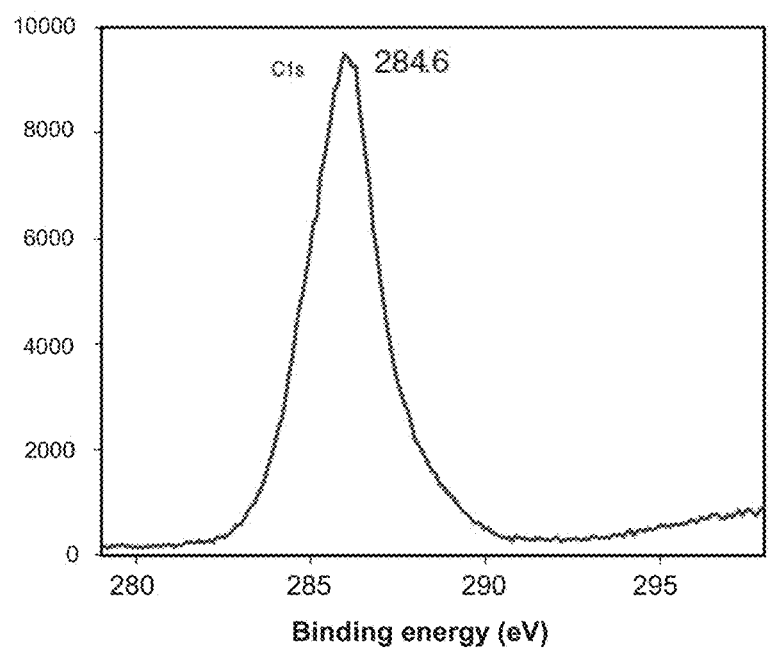
FIG. 11B depicts the XPS spectra of C 1s for the Sn/Pan precursor fibers.
Figure 11C:
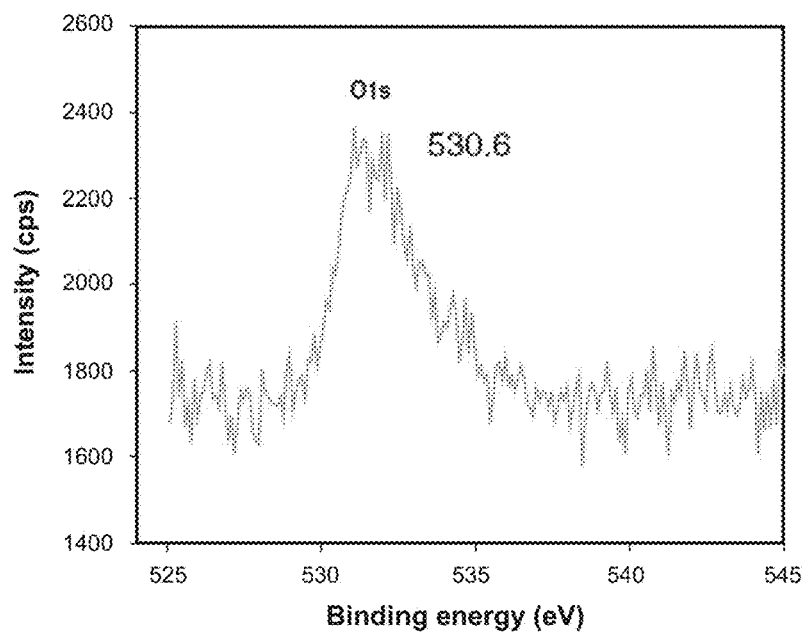
FIG. 11C depicts the XPS spectra of O1s for the Sn/Pan precursor fibers.
Figure 11D:
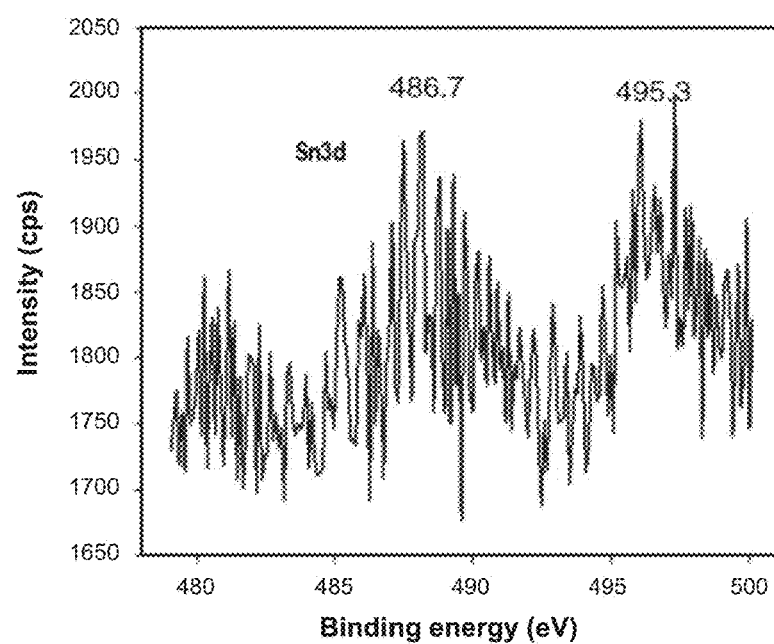
FIG. 11D depicts the XPS spectra of Sn3d for the Sn/Pan precursor fibers.
Figure 11E:
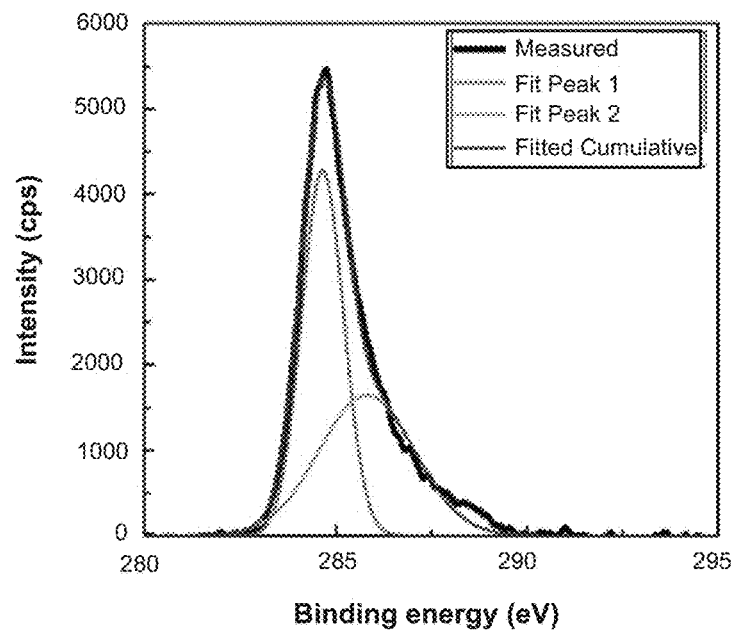
FIG. 11E depicts the de-convoluted peaks of the C1s for the Sn/Pan precursor fibers.

To evaluate the composition of the surface compounds on the Sn/PAN precursor nanofibers and that of the carbonized Sn/C nanofibers, a high resolution XPS analysis was carried out. To obtain enough information on the surface compounds, depth profiling instead of the regular point analysis was used. In FIG. 11A, the survey spectra of the Sn/PAN precursor nanofibers generally show peaks of Tin, carbon, and oxygen. FIGS. 11B, 11C, and 11D show XPS spectra of C 1s, O1s, and Sn3d for the Sn/Pan precursor fibers. The carbon peak is sharp, reflecting the predominate composition of the polymer (i.e. PAN) in the fibers. Those of Sn and oxygen are relatively small, especially the Sn peak. The relative weakness and sharpness of the Sn 3d peaks from the survey spectra reflected in the noisy spin orbital peaks of Sn 3d (i.e. 3d3/2 and 3d5/2) for the Sn/PAN precursor nanofibers. This could be attributed to the possibility of un-stabilized PAN polymer that crowded out the Sn nanoparticle peak that assigned to the spin-orbit components 3d5/2 at 495.3 eV. The oxygen (O 1s) peak had a little noisy signal compared to that observed in the carbonized Sn/C composite nanofibers. The carbon C is on the other hand shows one broad peak that was de-convoluted (FIG. 11E), into two peaks. Typically the binding energy of the C is with peak at 284.6 eV is often associated with the C—C bonds, which is attributed to the amorphous carbon phase or from the adventitious carbon. On the other hand, the peak at 285.6 eV was characteristic of the combination of C—O or the carboxyl (i.e. O—C_O) groups, that could have served as the nucleation points for the SnO$_2$.

Figure 12A:
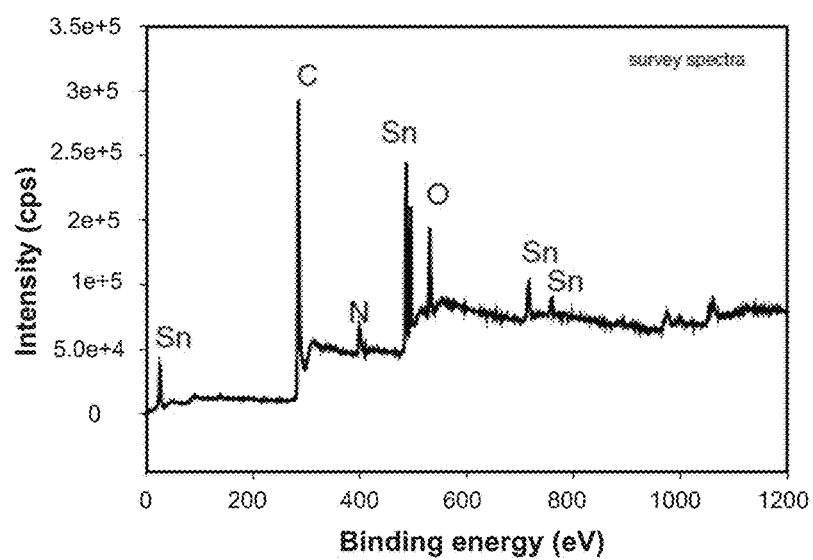
FIG. 12A depicts the survey spectra of the Sn/C nanofibers.
Figure 12B:
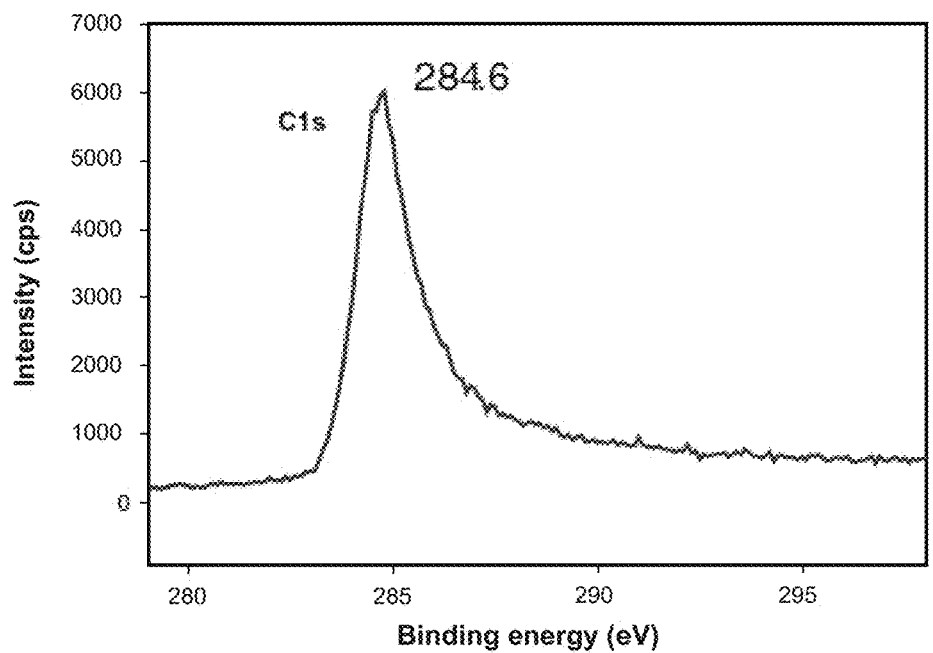
FIG. 12B depicts the XPS spectra of C 1s for the Sn/C nanofibers.
Figure 12C:
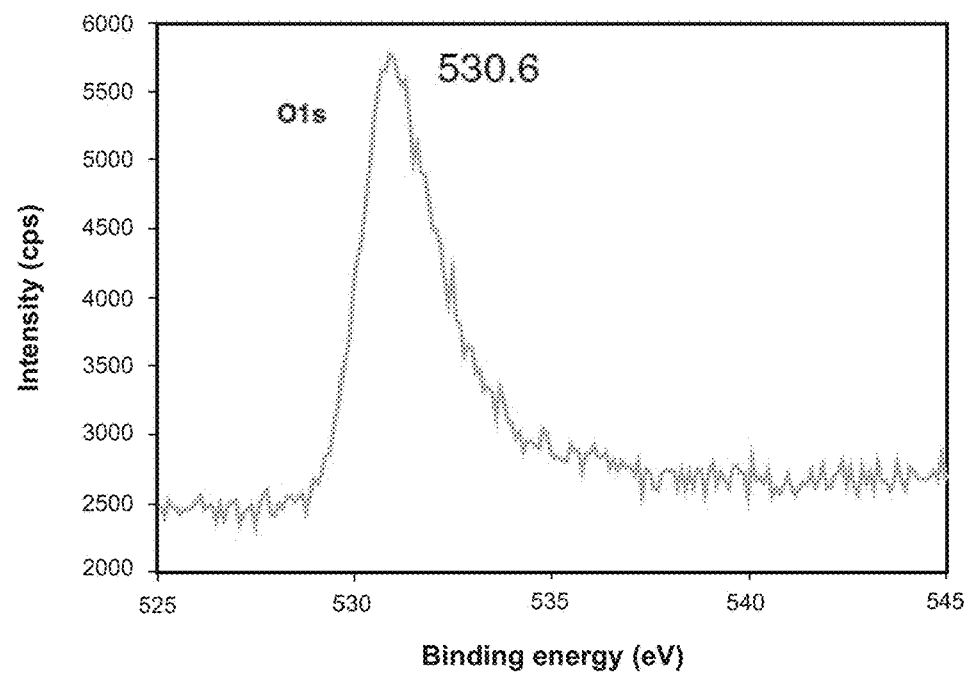
FIG. 12C depicts the XPS spectra of O1s for the Sn/C nanofibers.
Figure 12D:
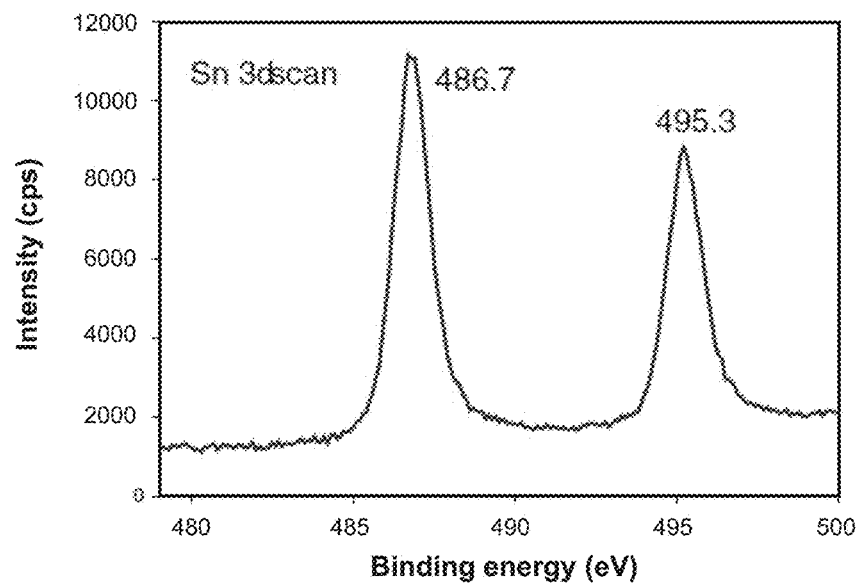
FIG. 12D depicts the XPS spectra of Sn3d for the Sn/C nanofibers.

In FIG. 12A, the survey spectra of the Sn/C composite nanofiber prepared from Sn/PAN precursor nanofibers show distinct and sharp peaks of C 1s, Sn 3d and O 1s, with the Sn 3d showing two peaks associated with the spin-orbit components (3d3/2 and 3d5/2) of the Sn 3d peaks at binding energies ~495.3 and ~486.7 eV. FIGS. 12B, 12C, and 12D show XPS spectra of C 1s, O1s, and Sn3d for the Sn/Pan composite nanofibers. These results are consistent with those observed in the literature on Sn/C composite fiber anodes. The splitting of the 3d doublet of Sn was 8.6 eV, indicating a probable valence state of Sn to be +4. This phenomenon is often attributed to the formation of SnO$_2$ compound in the Sn/C composite nanofiber structure. The amount of SnO$_2$ in the carbonized Sn/C from the XRD results was small relative to the Sn metal content. The XPS spectra for the O1s scan show one peak at binding energy 530.6 eV which is assigned to the oxygen content in the fibers that could have been absorbed into the fibers from the atmosphere in form of moisture. This small moisture content in the fiber was observed as the fiber lost a small amount of weight of ~3% at 96° C. according to the TGA results shown in FIG. 9. The oxygen content could also be from the small content of SnO$_2$ in the fibers. These results thus point to a heterogeneous structure of the Sn/C composite nanofibers comprised of a small amount of SnO$_2$ particles and Sn metallic embedded in the carbon nanofiber matrix.

Electrochemical Performance of the Sn/C Composite Nanofiber Electrodes for LIBs

Cyclic Voltammogram for the Sn/C Composite NF Anode

Figure 13:
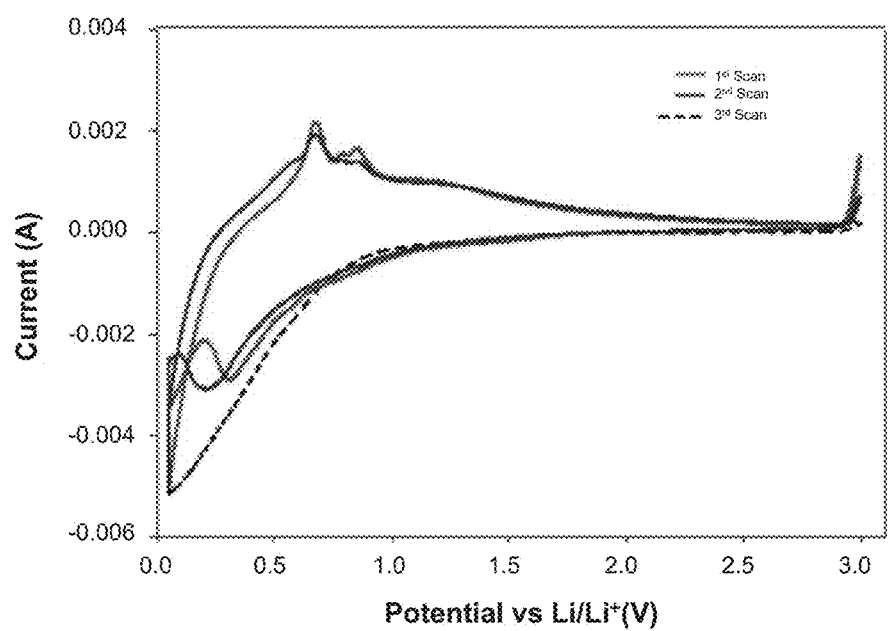
FIG. 13 depicts cyclic voltammogram (CV) curves of Sn (nanoparticles)/C composite nanofibers prepared from Sn/PAN precursor.

Lithium storage properties of the Forcespun Sn/C composite nanofibers were evaluated in half-cell configuration between 0.0-3.0 V vs. Li/Li$^+$ at slow scan rate of 0.2 mV s$^{-1}$. FIG. 13 shows the cycle voltammetry (CV) curves of Sn (nanoparticles)/C composite nanofiber anode. During the first cathodic scan, the Sn/C composite NF anode exhibits a broad and sharp peak potential at ~0.38 V vs. Li/Li$^+$, which is attributed to the structural destruction of Sn/C and associated initial electrolyte decomposition. Our CV results are in agreement with those reported on Sn/C nanocomposite anodes. The decomposition reaction of the electrolyte solution with Li leads to the formation of the solid electrolyte interface (SEI) on the Sn/C anode at the interface between the Sn/C composite nanofiber anode and the electrolyte. In this case, the SEI layer will mainly consist of lithium carbonate and lithium alkyl species. The structural destruction of the small amount of SnO$_2$ species could lead to the formation of amorphous Li$_2$O according to the following partially reversible equilibrium equation:

$$SnO_2 + xLi^+ + xe^- \rightarrow Sn + 2Li_2O \qquad (1)$$

However, since the Li$_2$O typically occurs at higher potentials >0.75 V vs. Li/Li$^+$ during the cathodic sweep, which was not observed in FIG. 13, reaction (1) could not have occurred. Therefore the amount of SnO$_2$ in the electrode was considered insignificant. The presence of a peak potential at ~0.23 V vs. Li/Li$^+$ is associated with the reversible alloying formation process between the Sn and lithium according to reaction (2):

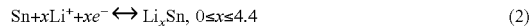

$$Sn + xLi^+ + xe^- \leftrightarrow Li_xSn, \; 0 \leq x \leq 4.4 \qquad (2)$$

The peak potential of ~0.82 V vs. Li/Li+ corresponds to the de-alloying reaction according to the reduction reaction above. During this de-alloying process, it is possible that electrochemically formed Sn nanoparticles could aggregate to form large clusters in order to reduce surface free energy. It is the formation of such large clusters that normally leads to the cracking of the electrode and the eventual increase in the cell internal resistance.

Figure 14A:
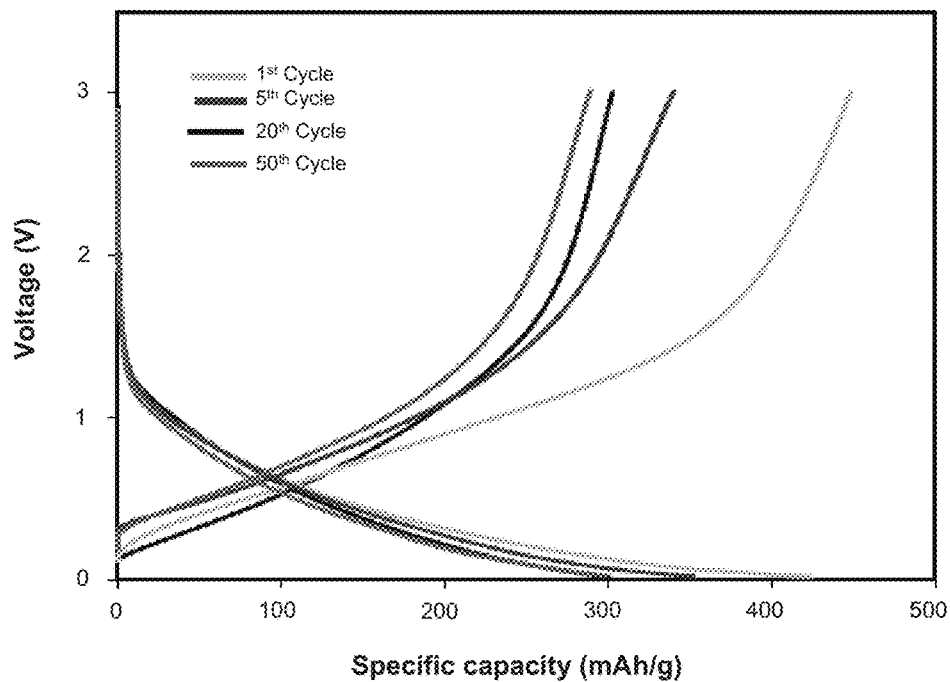
FIG. 14A depicts galvanostatic charge/discharge curves for CNFs made from PAN precursor nanofibers.
Figure 15:
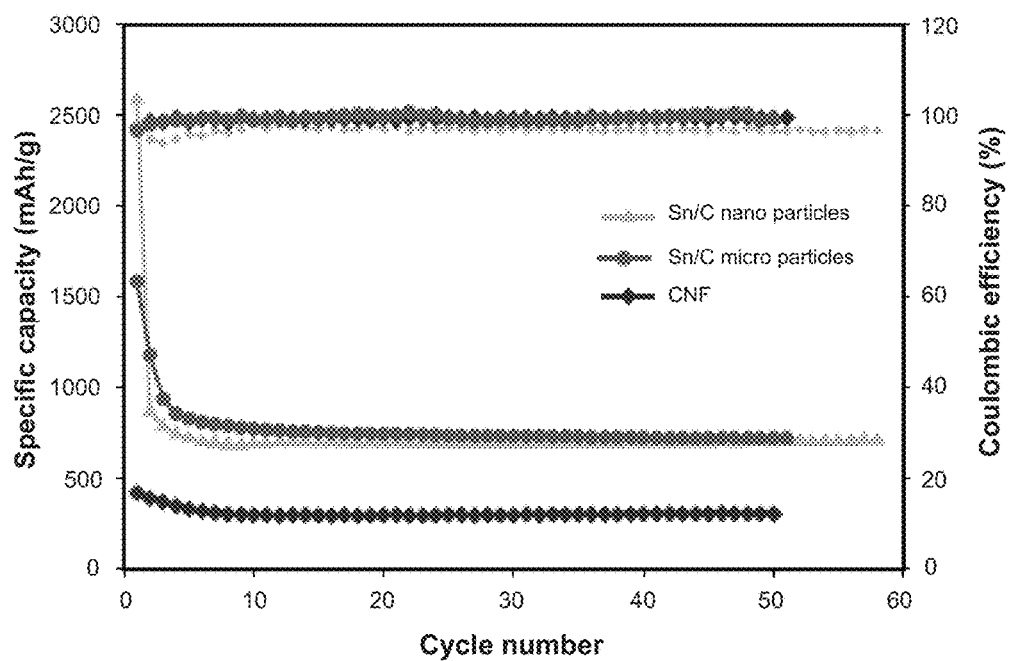
FIG. 15 depicts a comparison of the cycle performance of Sn (nanoparticle)/C and Sn (micro-particle)/C composite anodes.

The storage/cycling performance of the Sn/C composite anode was investigated at room temperature. The cycle performance (i.e. charge/discharge cycling) was carried out at a voltage between 0.05 V and 3.0 V and at a current density of 100 mAg$^{-1}$ for CNFs (i.e. prepared from PAN precursor) and Sn/C composite nanofiber anodes with different particle size of Sn (nano and submicron) were obtained for the first 50 cycles. The CNF anode shows an initial specific capacity of about 421 mAhg$^{-1}$ (FIG. 14A), which is greater than the theoretical capacity of graphite (372 mAhg$^{-1}$). This high capacity faded rapidly after the 1st cycle, which was attributed to the formation of the SEI layer. The rate of degradation of the specific capacity reduced significantly from the 5th to the 50th cycle and maintained a very flat capacity of about 297 mAhg$^{-1}$ over 50 cycles (FIG. 15). For the Sn/C composite nanofiber anodes (nano and micro), the Sn in the carbon matrix initiated the general electrochemical reactions with lithium during the alloying process:

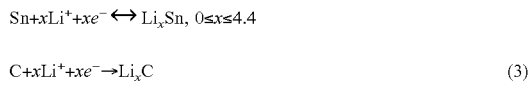

$$C+xLi^{+}+xe^{-} \rightarrow Li_xC \qquad (3)$$

Figure 14B:
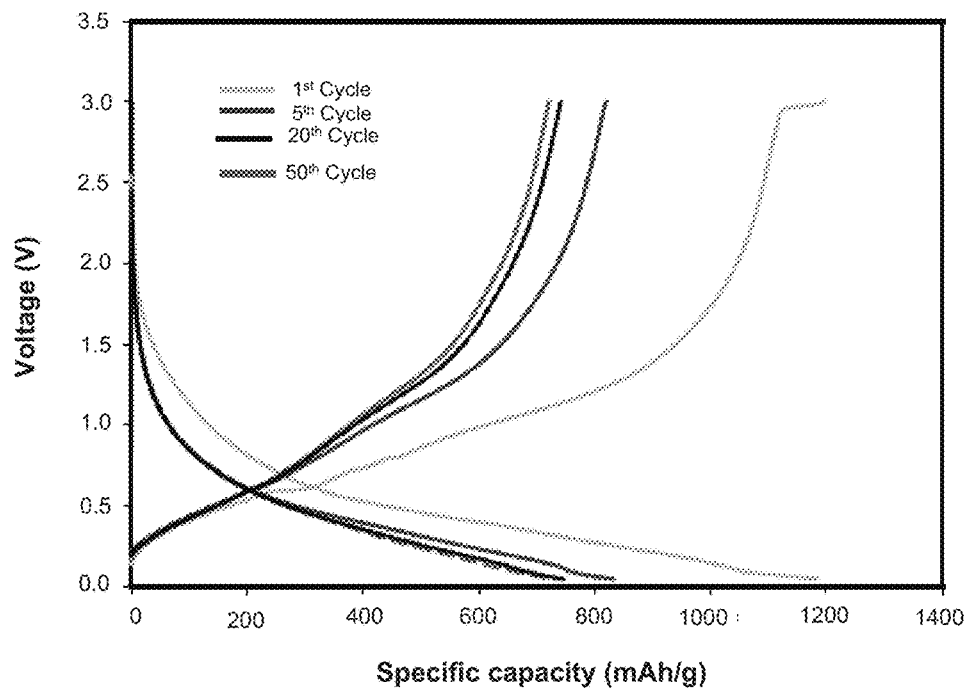
FIG. 14B depicts galvanostatic charge/discharge curves for the Sn (nanoparticles)/C composite nanofiber anode.
Figure 14C:
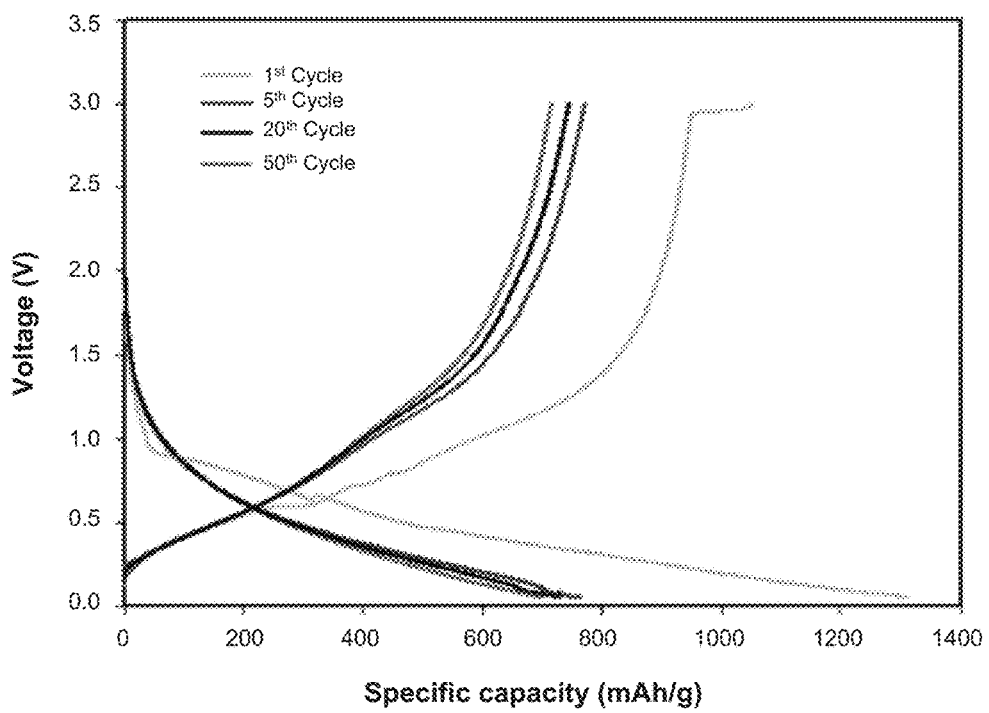
FIG. 14C depicts galvanostatic charge/discharge curves for the Sn (microparticles)/C composite nanofiber anode.

This reaction produced initial specific charge capacities (lithium insertion) of 2586 mA h g-1 and 1578 mAhg$^{-1}$, at a current density of 50 mAg$^{-1}$, for the nano particle and micro particle Sn/C composite electrode, corresponding to Coulombic efficiencies of 41, and 75%, respectively (FIGS. 14B and 14C). These first charge capacities are remarkably higher than that reported in the literature on Sn/C or SnO$_2$/C composite nanofiber anodes. There is a steady drop in the charge capacity (lithium insertion) for both nano and submicron Sn/C composite nanofibers, which are consistent with results reported in literature. The drastic drop in capacity for the Sn/C composite anode is usually associated with the inevitable irreversible loss of Li$^+$ for the formation of the SEI layer. Unlike in many other battery chemistries such as the Li$_{x+1}$FePO$_4$ and Li$_x$Mn$_{1-x}$NiCoO$_4$ cathodes where extra lithium is provided for in the cathode to compensate for the SEI layer formation. Thereafter the charge capacity of Sn/C composite nanofiber anodes at 100 mAg$^{-1}$ (nano and submicron) remains relatively steady over the 50 cycles (FIGS. 14B and 14C).

Figure 16:
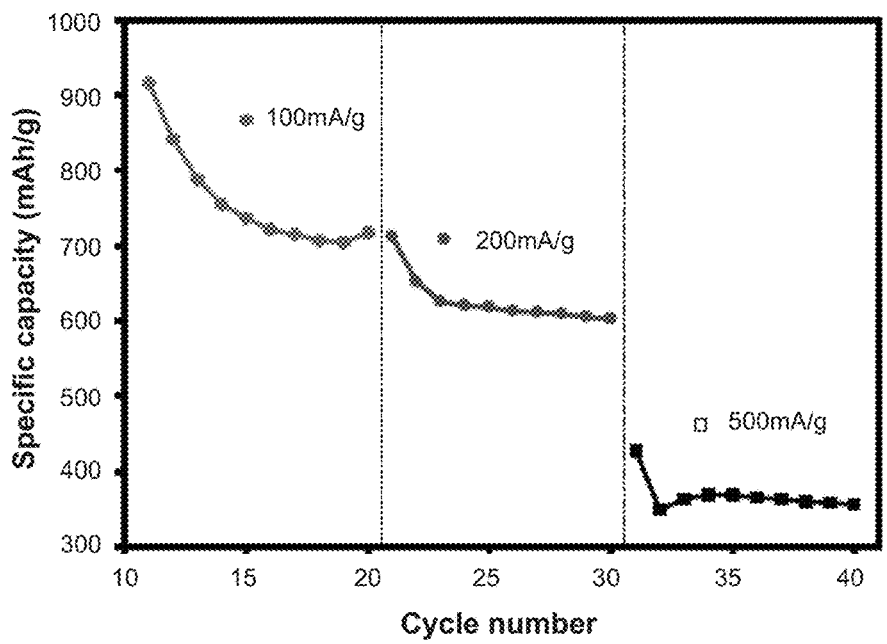
FIG. 16 depicts rate performance of the Sn (nano-particles)/C composite nanofiber anode.

FIG. 15 shows the cycling performance of CNF and Sn/C (nano and submicron) composite anodes. These results indicate that the charge capacity (Li-insertion) of Sn (nanoparticle)/C composite anode rapidly decreases to about 921 mAhg$^{-1}$ after the 2nd cycle. The drop in charge capacity continues up to the 10th cycle. After 50 cycles, this Sn/C composite anode still retains a charge capacity of 715 mAhg$^{-1}$. The cycle performance of the submicron Sn/C composite anode follows a similar trend as in the Sn(nanoparticle)/C composite anode. However, unlike the nano particle Sn/C composite electrode, the Sn(microparticle)/C composite anode delivers a specific charge capacity (lithium insertion) of 1152 mAhg$^{-1}$ after the 2nd cycle. This Sn/C composite anode still retains a specific charge capacity of 724 mAhg$^{-1}$ after 50 cycles with capacity retention of 82%. The Sn/C composite anodes display a Coulombic efficiency >95% after the second cycle (FIG. 15). Statistically, the subtle difference between the specific capacities of the two Sn/C composite nanofiber anodes is the same. The Sn nanoparticles with large surface area and high aspect ratio offer the Sn/C electrode more reactive sites for electrochemical reaction compared to the submicron particles, therefore, it is expected that the Sn (nanoparticles)/C composite anode should exhibit a better electrochemical performance than the Sn (micro-particles)/C composite anode. The subtle difference in the charge/discharge capacities of the submicron Sn/C composite anode is attributed to the large and evenly distributed pores on the fibers (FIG. 8F), which offers a much more buffering effect to accommodate the volume change during the alloying/de-alloying process. The stability of the Sn (nanoparticles)/C composite electrode was evaluated using different current densities, as shown in FIG. 16. The Sn (nanoparticle)/C composite anode recorded a capacity of 716 mAhg$^{-1}$ after the first cycle that faded a little up to the 3rd cycle and maintained a steadily capacity thereafter. For a higher current density of 500 mAg$^{-1}$, a much low capacity of about 427 mAhg$^{-1}$ was observed, which stabilized after the 3rd cycle at a modest capacity of 342 mAhg$^{-1}$. The relatively higher capacity regardless of the particle size is most importantly due to the quality of the nanofiber produced using the centrifugal spinning method, which produced fibers that are uniform and capable of buffering the volume change associated with Sn/C composite anode during the charge/discharge process. Most results reported in literature on binder-free electrodes prepared by electrospinning and centrifugal spinning show lower charge capacities that range from 400 to 650 mAhg$^{-1}$ after 50 cycles.

Table 1 shows some compilation/comparison of the cycle performance of Sn/C and SnO$_2$/C composite nanofiber anodes produced using an electrospinning process. Most of the results illustrated in Table 1 show a higher specific capacity than our results due to the fact that additives such as acetylene black were used to prepare the composite nanofiber anode which led to improve the electronic conductivity of electrode. The results from ground nanofibers (i.e. current collector based electrode) is even much lower than has been shown in previous literature for Sn (nanoparticle)/C porous nanofibers containing conductive carbon black as additive. In previous studies, a charge capacity (Li insertion) of 774 mAhg$^{-1}$ at a current density of 0.8 Ag$^{-1}$ was reported for the highly porous Sn/C composite nanofibers after 200 cycles. These previous studies also reported results on the electrochemical performance of electrospun Sn/C composite nanofibers prepared from Sn/PAN precursor nanofibers (without additives). This Sn/C composite anode delivered charge capacities (lithium deinsertion) of 500 and 300 mAhg$^{-1}$ (at 0.8 Ag$^{-1}$) after 50 and 200 cycles, respectively (Table 1). As can be seen, centrifugal spun Sn/C composite anodes exhibit a better electrochemical performance than that reported on electrospun Sn/C composite anode (without additives).

TABLE 1

| Electrode Chemistry | Flexible fibers? | Additive added | Charge capacity (mAhg$^{-1}$) | Cycle Number |
|---|---|---|---|---|
| Sn-Porous C | Yes | Mineral oil | 774 | 200 |
| Sn/C | Yes | None | 300 | 200 |
| Sn/C | No | Acetylene black | 626 | 50 |
| SnO$_2$—NiO—C | No | None | 620 | 80 |
| Sn/C | Yes | None | 450 | 25 |
| SnO$_2$/C (carbon nanotubes) | No | Acetylene black | 725 | 50 |
| SnO$_2$/C | No | Super P Li | 82 | 75 |
| SnO$_2$/C | Yes | None | 602 | 100 |
| Sn/C | No | Super-P | 465 | 100 |

Figure 17A:
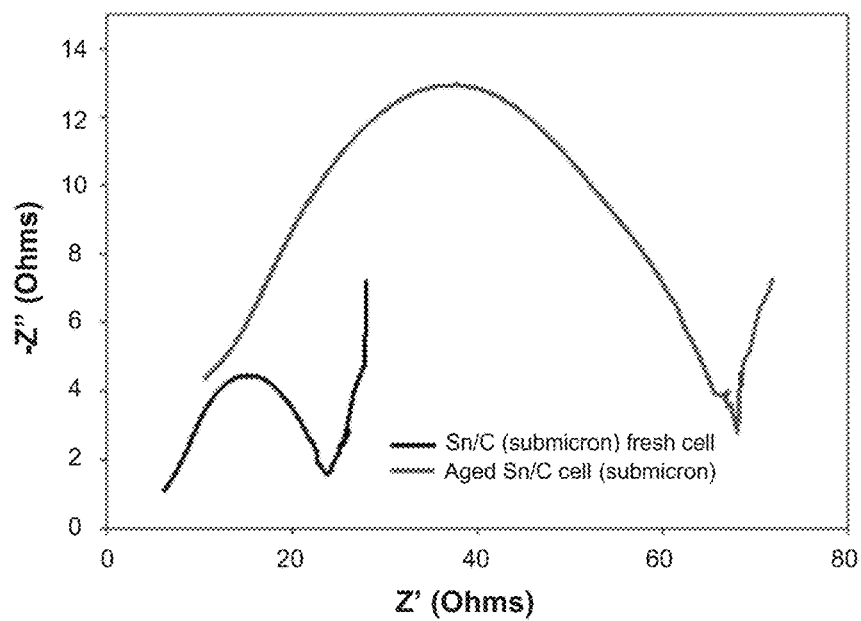
FIG. 17A depicts electrochemical impedance spectra obtained before and after cycling for submicron based Sn/C composite nanofiber anodes.
Figure 17B:
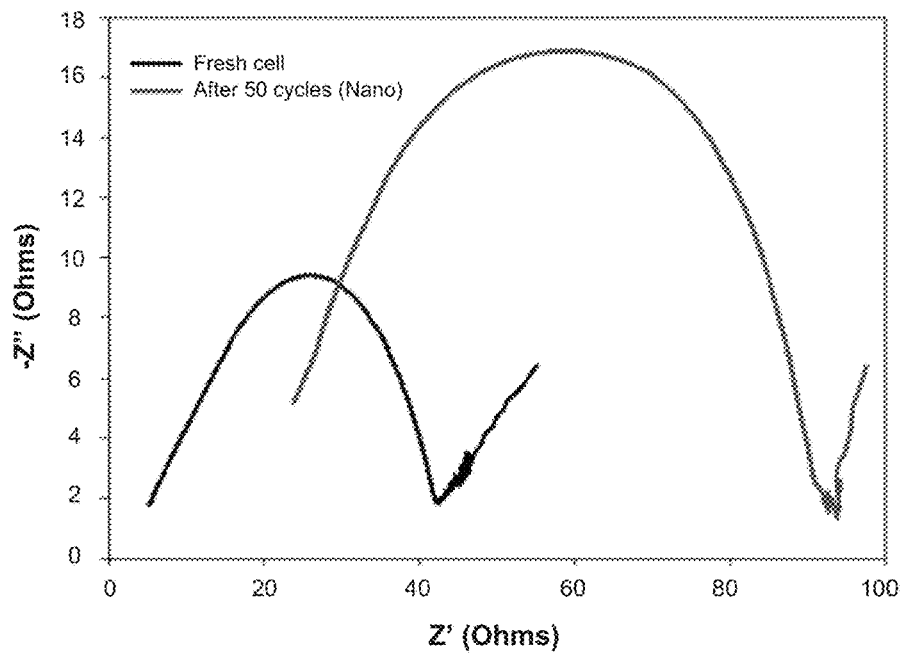
FIG. 17B depicts electrochemical impedance spectra obtained before and after cycling for nanoparticle based Sn/C composite nanofiber anodes

The electrochemical impedance (Nyquist plots) before and after cycling for both the submicron and the nanoparticle based Sn/C composite fiber electrodes as shown in FIG. 17 was carried out to elucidate the associated electrochemical performance. The depressed semicircles in the region of high to middle frequency range, which represent the initial interfacial resistance and charge-transfer resistance, clearly show a slight variation in the impedance between the two electrodes. The submicron particle Sn/C composite anode (FIG. 17A) shows a lower initial impedance compared to the Sn(nanoparticle)/C composite anode (FIG. 17B) and a relatively small increase in the charge transfer resistance (i.e. from the shift to the right on the Z-real axis) was observed. After 50 cycles, there is an increase in the diameter of the semi-circle for both electrodes, with the Sn(nanoparticle)/C composite electrode having a slightly higher semicircle diameter. The increase in resistance at the electrode/electrolyte interface for the Sn(nanoparticle)/C composite cells affected the lithium ion kinetics at the interface which is correlated with the steady loss in cell capacity during the initial cycles. The improvement in electrochemical performances of the Sn/C composite nanofiber anode is attributed to the uniform dispersion of Sn particles in the carbon nanofiber that provided a large number of active sites for Li ion storage and shorter lithium ion transfer distance. Additionally, the uniform and porous fiber mat also provides a large surface area not only for reactive sites but also allows for ion and electron transport without the need for a current collector. All these attributes contribute immensely to the improved cycling performance of the Sn/C composite nanofiber anodes prepared from forceospun Sn/PAN precursor nanofibers.

$SnO_2$/NiO/C NF Electrodes

The Production of $SnO_2$/NiO/PAN Fiber Mats $SnO_2$/NiO/PAN precursors were prepared according to a method similar to the method set forth above for Sn/PAN precursors. For the $SnO_2$/NiO/PAN precursor, the weight percentages of the tin (II) 2-ethylhexanoate and nickel (II) acetate tetrahydrate were 15 wt % and 10 wt. %, respectively in DMF, and for the polymer (PAN), the concentration in the solution precursor was maintained at 12 wt. %.

Nano-fibrous mats of $SnO_2$/NiO/PAN precursors were then prepared by centrifugal spinning. A thin spunbond fiber was used on a fan box as the substrate for the deposition of fibers. In the centrifugal spinning technique, centrifugal forces are used to extrude polymer solutions or melts through the spinneret. An amount of 2 mL of the precursor solution was injected into the needle-based spinneret equipped with 30 gauge half-inch regular bevel needles. The rotational speed of the spinneret was kept at 8,000 rpm. The substrate was rotated 90° after each run and the needles were changed after each run. The $SnO_2$/NiO/PAN fibrous mats were removed from the substrate drum and dried at 120° C. under vacuum for 24 hour prior to being carbonized. The nanofiber mats were then further stabilized in air at 280° C. for 5 h, and then calcined at 800° C. for 2 h in an argon atmosphere to obtain the $SnO_2$/NiO/C composite nanofibers (heating rate was 3° C. $min^{-1}$) that were directly used as freestanding anodes in LIB and SIB half cells.

$SnO_2$/NiO/C NFs Half-Cell Assembly

Electrochemical experiments were performed using coin-type (2032) half cells containing $SnO_2$/NiO/C composite nanofibers as the working electrode. The cell preparation was performed in a glove box (Mbraun, USA) filled with high purity Argon with oxygen and moisture content <0.5 ppm. The $SnO_2$/NiO/C electrodes formed flexible freestanding nanofibers, which were punched directly and used as binder-free electrodes without any additives. The average electrode thickness was around 2 mm, and an average weight was in the range of 2-4 mg. Lithium metal was used as the counter electrode and a Whatman glass microfiber membrane as the separator. The electrolyte used was a 1M $LiPF_6$ solution in ethylene carbonate (EC)/dimethyl carbonate (DMC) (1:1 v/v). The electrochemical performance was evaluated by carrying out galvanostatic charge-discharge tests at a current density of 100 mA/g and between 0.05 and 3.0V, with a 10 minute rest at the end of each discharge cycle. The rate capabilities for both electrodes were evaluated at different current densities; 50 mA/g, 100 $mAg^{-1}$, 200 $mAg^{-1}$, 400 $mAg^{-1}$, and 500 $mAg^{-1}$. The specific charge/discharge capacities were calculated based on the mass of the flexible nanofiber anodes. The cyclic voltammetry and impedance experiments were evaluated using an electrochemical impedance spectroscope (Autolab 128N) with a scan rate of 0.5 mV/s between 0 and 3V and frequency of 0.1 Hz and 1 kHz respectively for the CV scan and the impedance. The impedance for the fresh (uncycled) Sn/C cells and the aged cells after cycling was carried out using an electrochemical impedance spectroscope (Autolab 128 N) at frequencies of 0.1 Hz and 1 kHz. The measured impedances of the batteries were fit using an equivalent circuit model to determine parameters such as the SEI film resistance, the Ohmic resistance, the charge transfer resistance, the double layer capacitance, and the Warburg impedance of the battery. In the model, Ro presents the Ohmic resistance caused by electrolyte, deposit layer, separator, current collector, and electrode, which equals to the left intercept between impedance spectrum and the x-axis at high frequency (~1 kHz), $R_{sei}$ and C1 indicate SEI resistance and constant phase element (CPE) at the anode, which dominates the shape of the first semi-circle in high frequency domain from 1 kHz to several Hz. While $R_c$ and C2 indicate charge transfer resistance and double layer capacitance, respectively. They affect the shape of the second semicircle, which is less obvious in the lower frequency range (several Hz to several mHz). On the other hand, Wa is the Warburg admittance which represents ion diffusion in the solid electrode. The Warburg admittance dominates the impedance spectrum in the low frequency region (<several mHz). To extract these parameters, the EIS-ECM was fitted to the impedance spectrum measured by EIS using simplex algorithm.

Surface Morphology and Elemental Analysis of $SnO_2$/NiO/C Composite

Figure 18:
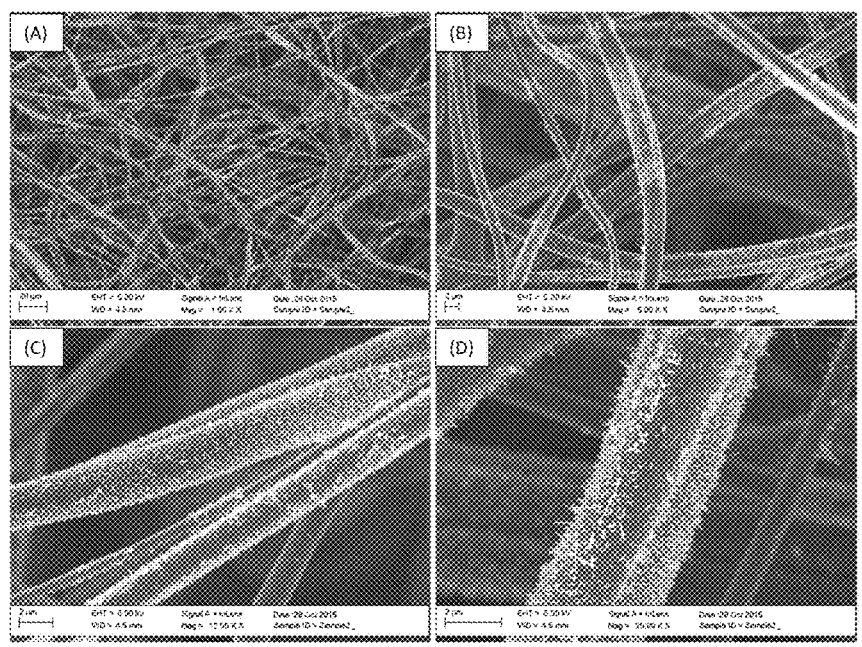
FIG. 18 depicts SEM images of $SnO_2$/NiO/carbon composite fibers at different magnification showing uniform fiber mat, and fiber strands with nanoparticles of the $SnO_2$ and NiO attached to the fibers strands with pores distributed evenly.

SEM micrographs of the $SnO_2$/NiO/C composite nanofibers are shown in FIG. 18, which show progressively higher magnifications of the fibers. After carbonization at 800° C. in an inert environment for 2 hr, the Sn/PAN and $SnO_2$/NiO/PAN precursor nanofibers were transformed to Sn/C and $SnO_2$/NiO/C composite nanofibers. The Sn nanoparticles were observed to be attached to the fiber strands for both the Sn/C and $SnO_2$/NiO/C composite nanofibers. The $SnO_2$ and NiO particles in the $SnO_2$/NiO/C composite nanofibers were "hairy-like" on the fiber strands (FIG. 18). Another feature of these fibers was the presence of many pores in the fiber strands that are evenly distributed. In particular, those on the Sn (nanoparticle)/C fibers were much larger compared to those on the $SnO_2$/NiO/C composite nanofibers. These pores contributed to the buffering effect that provided the accommodation for the volume change during the alloying and de-alloying process of Sn and $SnO_2$/NiO with lithium. The pores on the composite nanofiber anode were created during the calcination process via the passage and interaction of the inert gas molecules with the nanofibers.

The elemental mapping analysis (i.e. EDAX) of the composite $SnO_2$/NiO/C nanofibers shows that these composite nanofibers consist predominantly of Sn, Ni and carbon for the $SnO_2$/NiO/C anode. The EDAX area mapping for the composite nanofibers showed the heterogeneous distribution of the composite electrode constituents in the carbon matrix. The area mapping clearly shows that the composite electrode predominantly consists of carbon.

Figure 19:
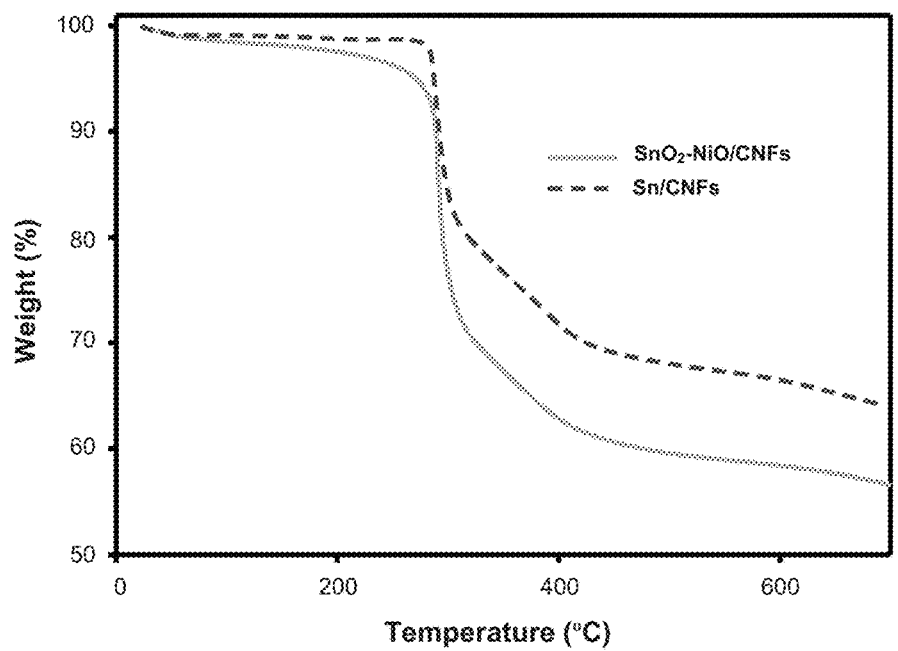
FIG. 19 depicts TGA analysis of the $SnO_2$/NiO/C and Sn/C composite fibers.

The actual content of carbon and the cations in the composite nanofibers were determined TGA analysis (FIG. 19). As shown in FIG. 19, up to 92° C. temperature, a minor weight reduction of ~3% corresponds to the removal of physically absorbed water from the fibers was observed for both composite electrodes. For the $SnO_2/NiO$ composite nanofiber, the multistage decomposition that could be attributed to the polymer (polyacrylonitrile) was observed at temperatures 320° C. and 410° C. The oxidation of carbon for $SnO_2/NiO/C$ was observed above 450° C., and beyond 530° C., the weight loss remained steady. The TGA results indicate that the composite nanofibers contained ~58 wt % of carbon for the $SnO_2/NiO/C$ fibers.

Analysis of the Crystal Structure of the $SnO_2/NiO/C$ Composite Electrodes

Figure 20:
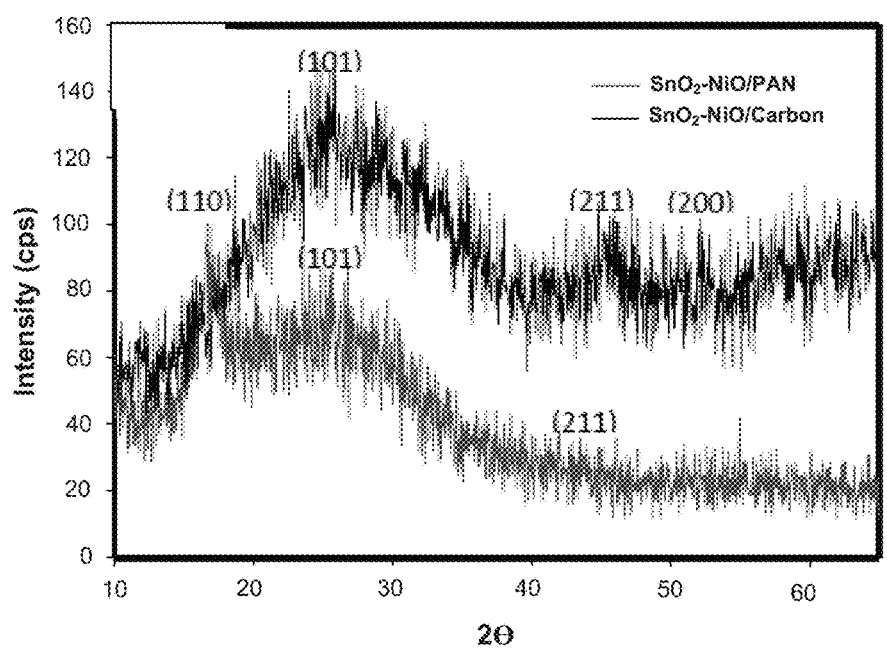
FIG. 20 depicts XRD pattern for the $SnO_2$/NiO/PAN precursor and $SnO_2$/NiO/carbon fibers.

X-ray diffraction (XRD) analysis of the as-synthesized $SnO_2/NiO/PAN$ nanofiber precursors along with their respective composite nanofiber electrodes was carried out to evaluate the crystal structure of the composite nanofiber electrodes. For the $SnO_2/NiO/C$ composite electrode and $SnO_2/NiO/PAN$ precursor fiber, the XRD pattern in FIG. 20 shows several broad peaks of low intensity for both the precursor fiber and the carbonized fibers. These broad peaks are attributed to the low crystallinity level on these fibers. The broad peaks at 26° and 43° indexed to (101) and (211) are identified as the planes of tetragonal rutile $SnO_2$ (JCPDS41-1445), while the cubic NiO are indexed at (200) plane (JCPDS71-1179). The NiO peak was not obvious in the $SnO_2/NiO/PAN$ fiber XRD pattern; additionally the carbon peak pattern was not also observed which could be attributed to the amorphous structure of carbon in these nanofibers. The lack of distinct peaks for the $SnO_2$ and that of the NiO in the carbonized fibers are indication of the amorphous nature of these compounds in the carbon fiber matrix.

Surface Analysis (XPS)

Figure 21A:
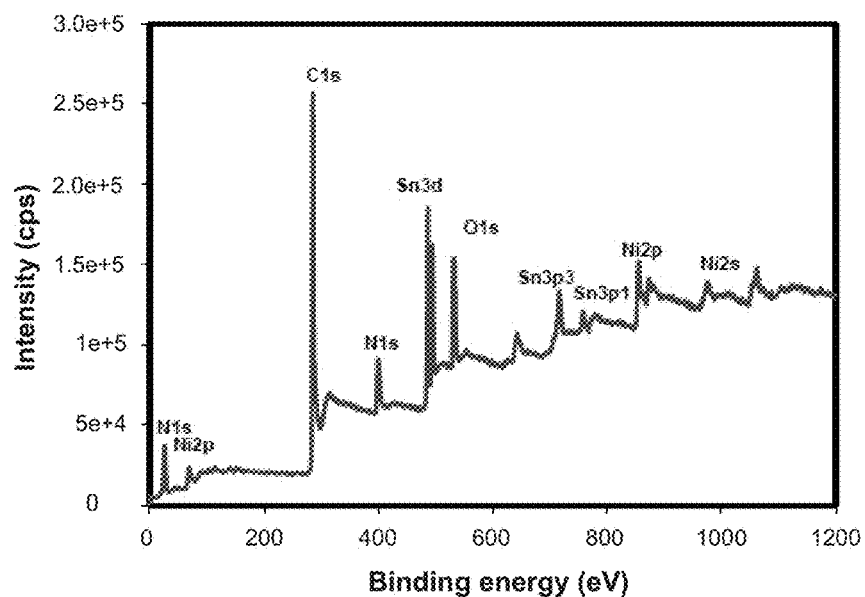
FIG. 21A depicts XPS spectra showing a survey spectra of the $SnO_2$/NiO/C and Sn/C composite fibers.
Figure 21B:
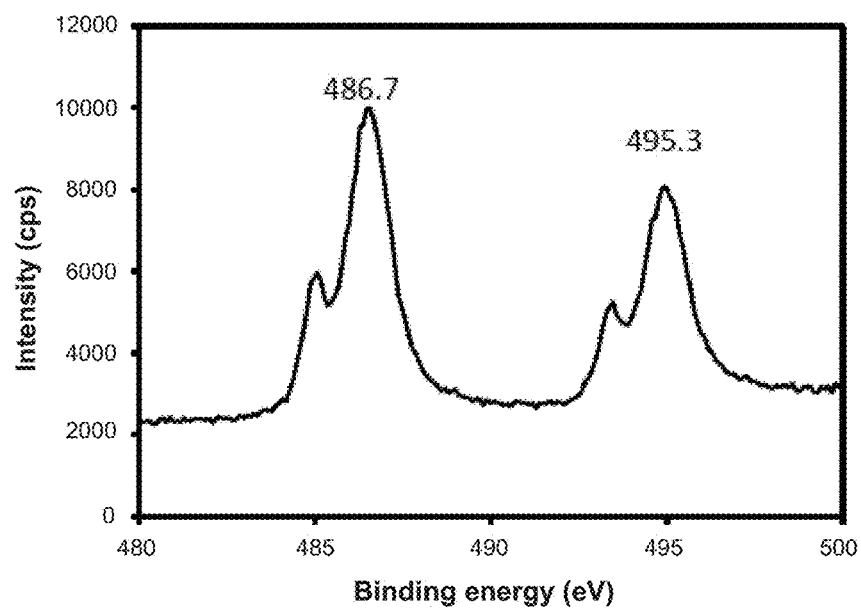
FIG. 21B depicts XPS spectra of Sn3d of the $SnO_2$/NiO/C and Sn/C composite fibers.
Figure 21C:
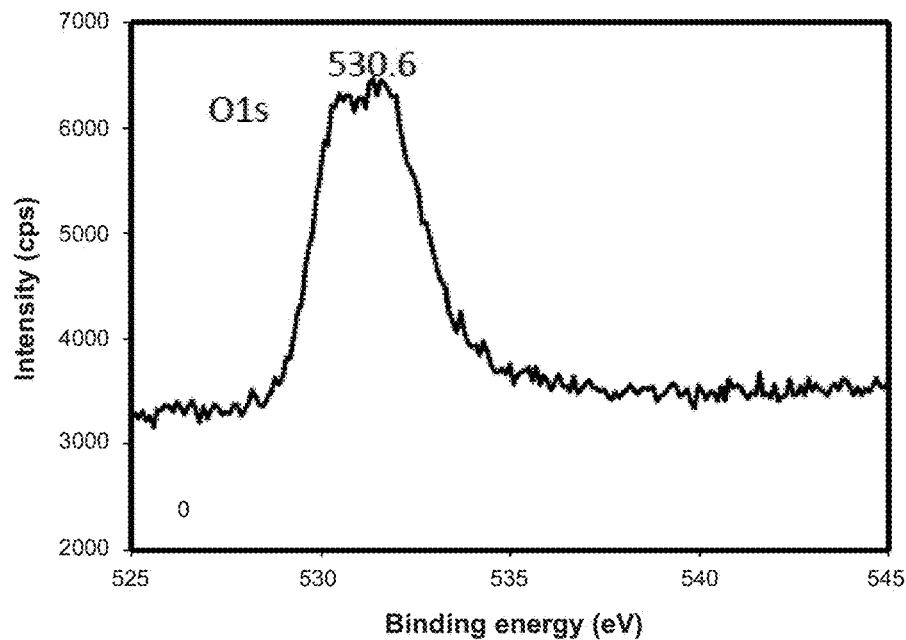
FIG. 21C depicts XPS spectra of O1s of the $SnO_2$/NiO/C and Sn/C composite fibers.
Figure 21D:
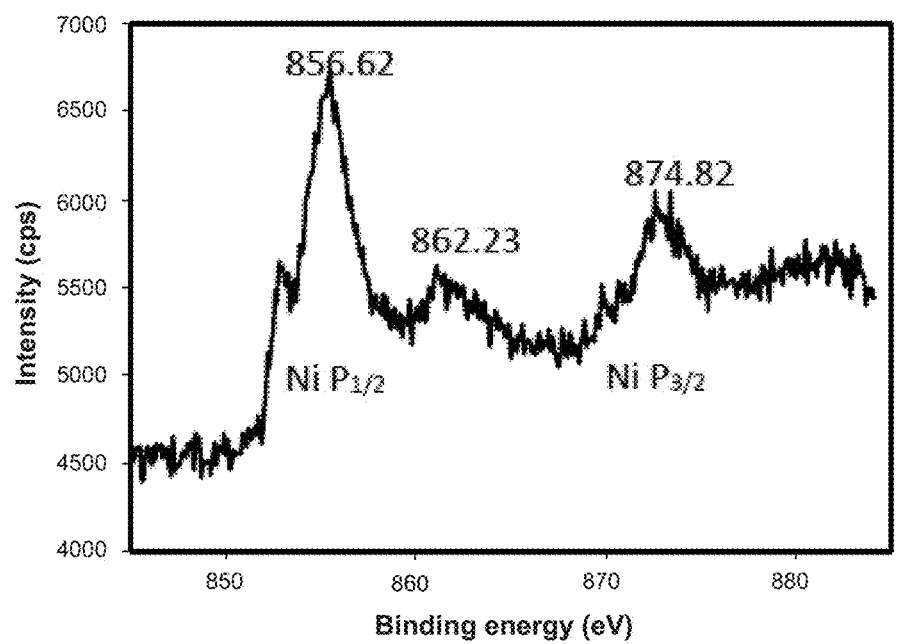
FIG. 21D depicts XPS spectra of Ni1s of the $SnO_2$/NiO/C and Sn/C composite fibers.

To evaluate the composition of the surface compounds on carbonized $SnO_2/NiO/C$ composite nanofibers, a high resolution XPS analysis was carried out. In FIG. 21A, the survey spectra of the $SnO_2/NiO/C$ composite nanofibers prepared from $SnO_2/NiO/PAN$ precursor nanofibers is shown. FIGS. 21B, 21C, and 21D show XPS spectra of Sn3d, O1s, and $Ni2p_{3/2}$ for the $SnO_2/NiO/C$ composite nanofibers. The C1s peak for both the Sn/C and $SnO_2/NiO$ nanofibers shows a broad peak which was de-convoluted into two peaks at 284.6 eV and 285.6 eV. Typically the binding energy with the peak at 284.6 eV is often associated with the C—C bonds and attributed with the amorphous carbon phase or from adventitious carbon, while the peak at 285.6 eV was characteristic of the combination of C—O or the carboxyl (i.e. O—C=O) groups, that could have served as the nucleation point for the $SnO_2$. In the $SnO_2/NiO$ nanofibers, the main $Ni2p_{3/2}$ peak at 856.62 eV, its satellite peaks at 862.96 eV, 874.86 eV, and 881.28 eV shown in FIG. 11B are attributed to NiO and there were no attributable Ni metal in the spectra, suggesting that the residual Ni in the fibers was insignificant.

Figure 22:
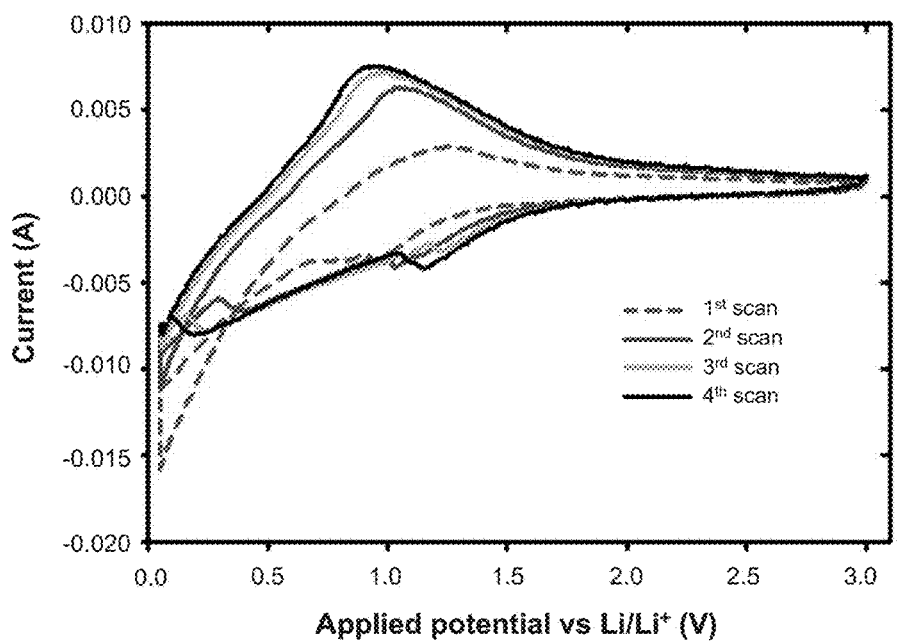
FIG. 22 depicts cyclic voltammogram (CV) of carbonized $SnO_2/NiO/C$ composite nanofibers.

Electrochemical Performance of the $SnO_2/NiO/C$ Composite Nanofiber Electrodes for LIBs Cyclic voltammetry (CV) test was carried out on the $SnO_2/NiO/C$ composite nanofiber electrodes to evaluate the lithium storage properties. A half-cell configuration of these electrodes was constructed and the CV test was performed between 0.0-3.0V vs. Li/Li+ at slow scan rate of 0.2 mV s$^{-1}$. The CV curves for the $SnO_2/NiO/C$ electrodes are shown in FIG. 22. During the first cathodic scan, the test $SnO_2/NiO/C$ cells exhibited a broad and sharp peak potential at ~0.38 V vs. Li/Li+, which is attributable to the structural destruction of $SnO_2$ and associated initial electrolyte decomposition. The decomposition reaction of the electrolyte solution with Li leads to the formation of a solid electrolyte interface (SEI) on the composite nanofiber anodes/electrolyte interface. In this case, the SEI layer will mainly consist of lithium carbonate and lithium alkyl species. The structural destruction of $SnO_2$ species in the $SnO_2/NiO/C$ composite electrode leads to the formation of amorphous $Li_2O$ according to the partially reversible equilibrium equations discussed above. The formation of $Li_2O$ on the electrode was confirmed from the CV curve of the $SnO_2/NiO/C$ nanofiber electrode, exhibited at potential 1.2V vs Li/Li+, which continues to increase after each scan.

Figure 23:
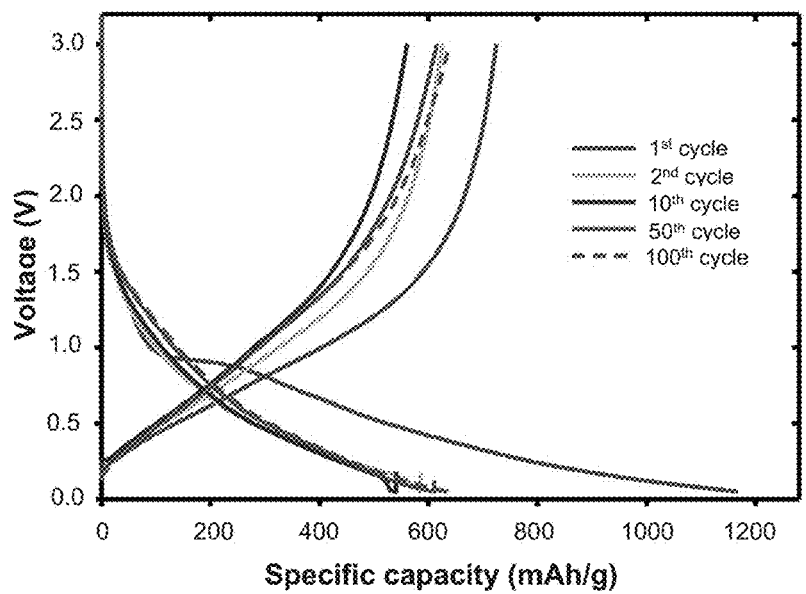
FIG. 23 depicts galvanostatic charge/discharge curves $SnO_2/NiO/C$ composite electrode.

The storage/cycling performance of the $SnO_2/NiO/C$ composite nanofiber anode was investigated at room temperature. The charge/discharge curves for the $SnO_2/NiO/C$ composite nanofiber anode, for the first 100 cycles were obtained at a voltage between 0.05 V and 3.0 V and at a current density of 100 mAg$^{-1}$. The presence of $SnO_2$ in $SnO_2/NiO/C$ initiates the general electrochemical reactions in Equations (1-3). This reaction gave a first initial specific discharge capacity of 1885 mAhg$^{-1}$ for the $SnO_2/NiO/C$. A low current density of 50 mAg$^{-1}$ was used for the first discharge step to allow greater amount of Li+ into the composite electrode structure. The subsequent first charge/discharge cycles for each of the electrodes were then performed at 100 mAg$^{-1}$. At this current density, the first discharge capacity (Li-insertion) of the $SnO_2/NiO/C$ composite electrode was 1167 mAhg$^{-1}$ as shown FIG. 23. The discharge capacities of the Sn/C or $SnO_2/C$ composite nanofiber anodes are remarkably higher than those reported in the literature on the same composite anodes. There was a steady drop in the discharge capacity for $SnO_2/NiO/C$ composite anode from the 1st to the 10th cycles, which is consistent with results reported in literature. The drastic drop in capacity is often associated with inevitable irreversible loss of lithium ions for the formation of the solid electrolyte interface layer. Interestingly, for the $SnO_2/NiO/C$ electrode (FIG. 23), the capacity fade existed from the 1st through to the 10th cycle and the specific capacity steadily increased. The steady rise of the specific discharge capacity continued to the 50th and 100th cycle, with the discharge capacity almost equal to that of the 2nd discharge capacity (i.e., ~85% capacity recovery) for the $SnO_2/NiO/$composite electrode. A second capacity fade was not observed in the $SnO_2/NiO/C$ composite electrode. The $SnO_2/NiO/C$ composite nanofiber electrode loses almost half of the 1$^{st}$ discharge capacity on the 2$^{nd}$ cycle. This is often attributed to $SnO_2$ content in the $SnO_2/NiO/C$ anode, the oxygen-containing functional groups on the $SnO_2/NiO$ fibers react with Li+ resulting in the irreversible loss of recyclable lithium ions.

Figure 24:
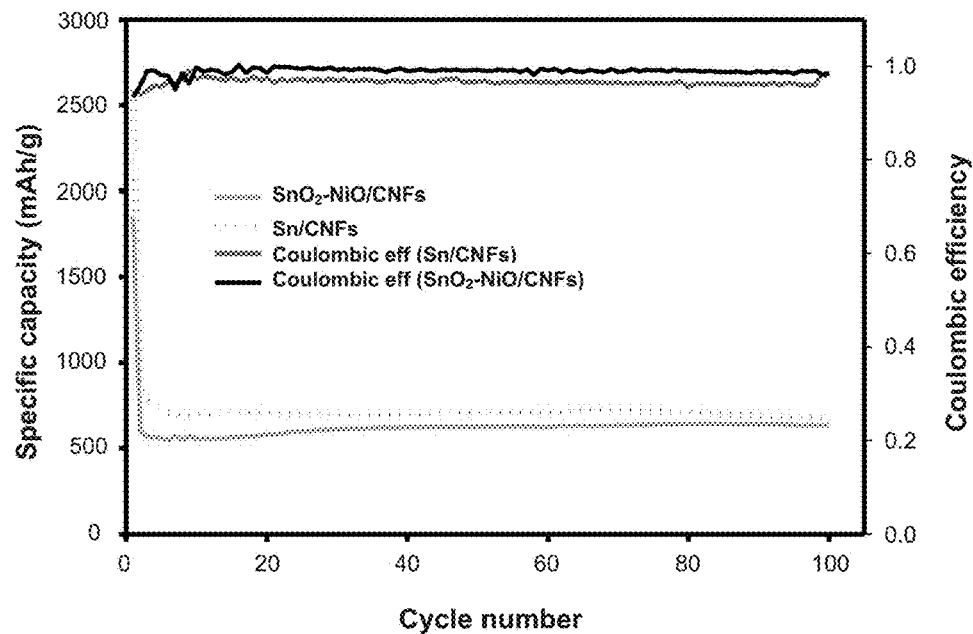
FIG. 24 depicts a comparison of the cycle performance of the $SnO_2/NiO/CNFs$ and Sn/CNFs composite electrodes.

The cycling performance for the Sn/C and $SnO_2/NiO/C$ composite electrodes is shown in FIG. 24. The results shown in FIG. 24 indicate that the Sn/C composite nanofibers, which had a much higher initial discharge capacity compared to the $SnO_2/NiO/C$ composite electrode cell, maintained a steady capacity of 675 mAhg$^{-1}$ compared to 633 mAhg$^{-1}$ for the $SnO_2/NiO/C$ composite electrode. The slight difference in capacity between the two electrodes was not that significant after the 100$^{th}$ cycle, considering that fact, the addition of NiO to the $SnO_2$ was aimed at improving the conductivity. This notwithstanding, the Sn/C composite nanofiber electrode appeared to have a little improved capacity retention over the $SnO_2/NiO/C$ binary composite electrode. Statistically, the subtle difference between the specific capacities of the two composite electrodes was the same. Furthermore, even after 100 deep charge/discharge cycles, both cells maintained a Coulombic efficiency >95% as shown in FIG. 24. The relatively higher capacity of these composite nanofiber electrodes is most importantly due to the quality of the nanofiber produced using the centrifugal spinning method, which produced fibers with unique microstructures that include pores and hairy-like microstructure, capable of buffering the volume change associated with Sn/C and $SnO_2$/NiO/C electrode during the alloying/de-alloying process.

Figure 25:
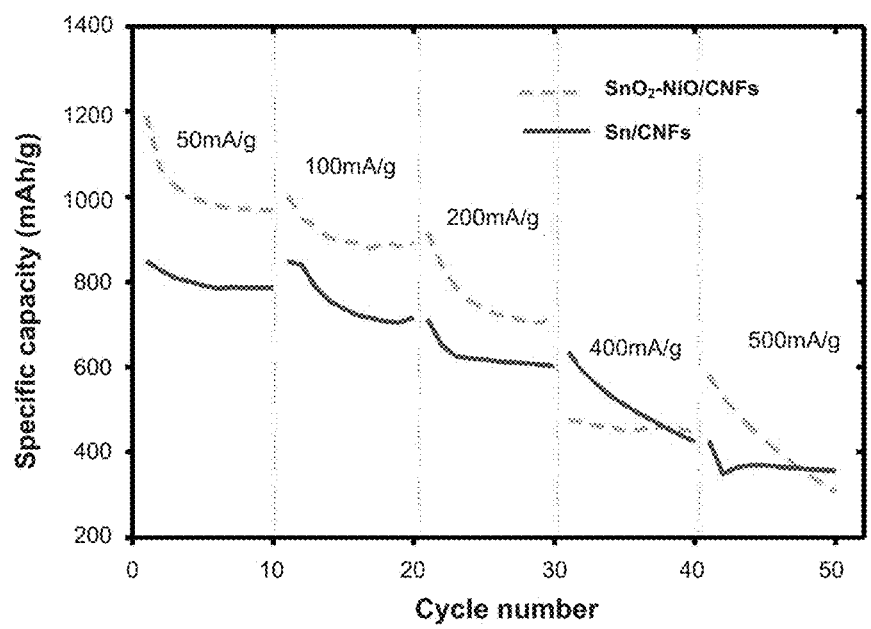
FIG. 25 depicts rate performance of the $SnO_2/NiO/C$ and Sn/C composite electrode at various current densities.

The porous structure of these composite nanofibers also contributed to improving their cycle performance. Most reported literature using binder free electrodes from electrospinning and centrifugal spinning show lower discharge capacities ranging from 400 to 650 mAhg$^{-1}$ after 50 cycles. The suitability of these alternative nanofiber composite electrodes was further evaluated by performing a rate capability test at different current densities: 50, 100, 200, 400, and 500 mAg$^{-1}$ and cycling for just 10 cycles as shown in FIG. 25. In all these rate capability tests, the $SnO_2$/NiO/C composite electrode exhibited a much higher discharge specific capacity compared to the Sn/C composite electrode cells. Another observed phenomenon was the steady stabilization of the capacity fade of the Sn/C composite electrode at 50 mAg$^{-1}$, 100 mAg$^{-1}$, 200 mAg$^{-1}$, and even at 500 mAg$^{-1}$ compared to a steep loss and slower stabilization of the $SnO_2$/NiO/C composite electrode. At the 400 mAg$^{-1}$ cycling, however, the $SnO_2$/NiO/C capacity was nearly stable while that of the Sn/C had a steep drop in the capacity that showed no steadiness over the 10 cycles, much like capacity fade behavior of the $SnO_2$/NiO/C electrode observed at the 500 mAg$^{-1}$ region. The good performance in terms of capacity stability of the Sn/C composite electrode is attributed to the large and evenly distributed pores on the fibers, which offered a much more buffering to accommodate the volume change during the alloying/de-alloying process. On the other hand, the recorded higher capacity of the binary $SnO_2$/NiO/C composite electrode, was attributed to the presence of NiO. The NiO provided the needed structural stability of the electrode that prevented it from pulverization, while at the same time enhances the electrical conductivity of the electrode.

Figure 26:
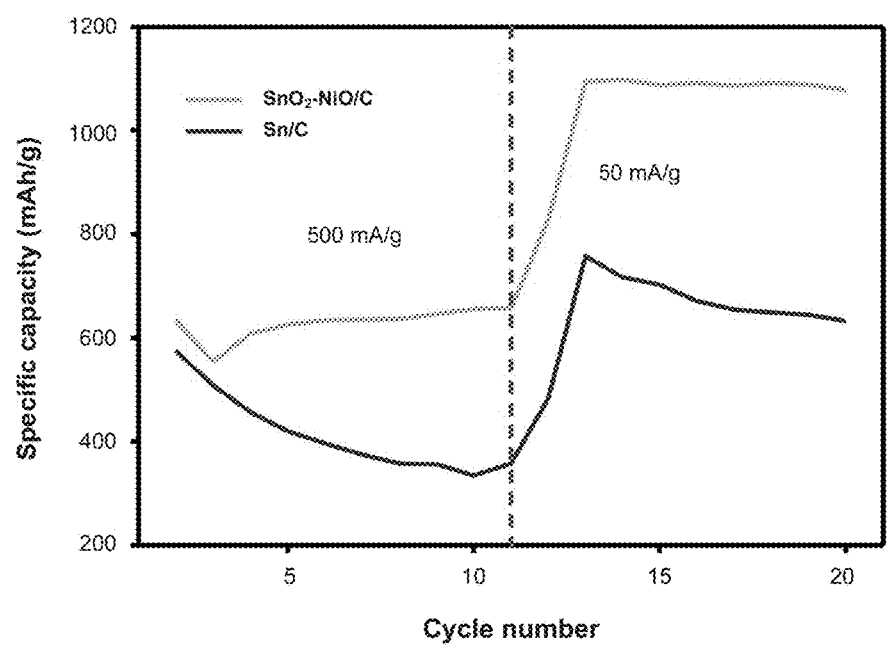
FIG. 26 depicts capacity recovery after cyclic current performance for the Sn/C and $SnO_2/NiO/C$ composite electrodes.

The capacity recovery after applying a cyclic current was evaluated. In this test, the cells were cycled at 500 mAg$^{-1}$ for 10 cycles and the cell rested an hour to achieve electrochemical stability and then charge/discharge tests were performed for 10 cycles at a low current density of 50 mAg$^{-1}$. The electrochemical performance of the Sn/C and $SnO_2$/NiO/C composite anodes electrode subjected to this current cyclic test is shown in FIG. 26. In this capacity recovery test, the Sn/C electrode had a gradual capacity fade during the 500 mAg$^{-1}$ cycle compared to an initial dip follow by a gradual steady stabilization of the capacity observed from the $SnO_2$/NiO/C composite electrode. When the cycling current was ramp down to 50 mAg$^{-1}$, as expected, the capacities of both electrodes increased dramatically. The $SnO_2$/NiO/C electrode capacity became steady and recorded a capacity comparable to that recorded in FIG. 16 for 50 mAg$^{-1}$ rate performance. A rather continual capacity fade was however, observed for the Sn/C electrode for the 50 mAg$^{-1}$ region. From these studies, it was observed that the $SnO_2$/NiO/C electrode has a better cycling and rate performance than that for the Sn/C electrode, although Sn/C electrode had a slight edge over it in terms of long cycle performance stability.

Impedance Analysis

Figure 27A:
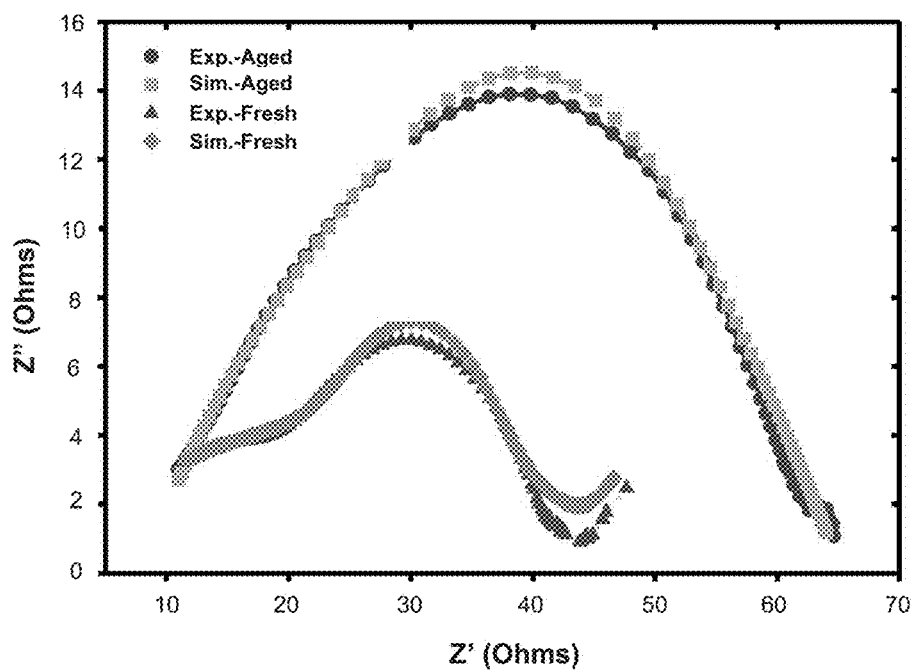
FIG. 27A depicts Nyquist plots for the experimental and simulated impedance plots of the fresh and aged Sn/C electrode batteries after 100 cycles.
Figure 27B:
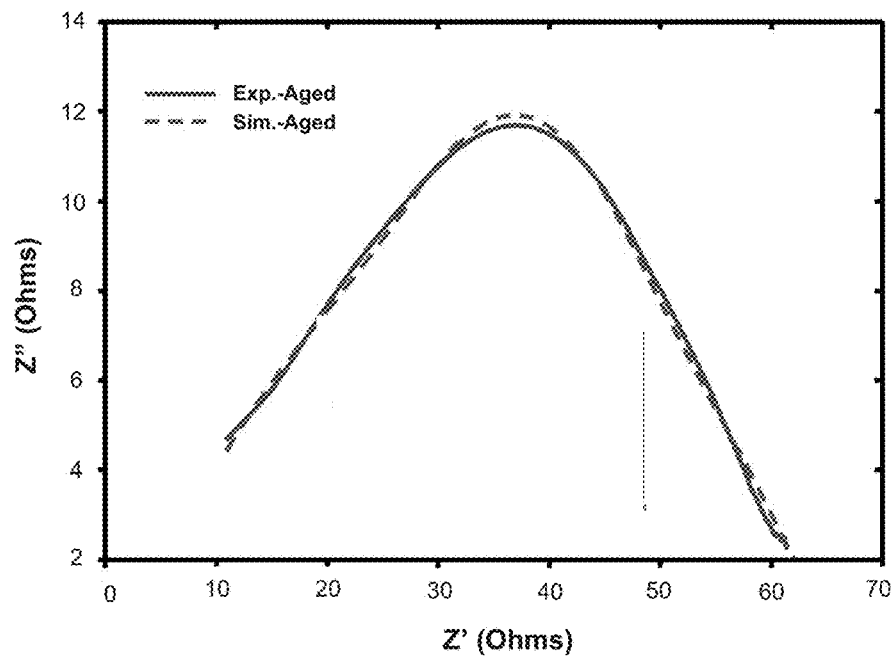
FIG. 27B depicts Nyquist plots for the experimental and simulated impedance plots of the fresh and aged $SnO_2/NiO/C$ electrode batteries after 100 cycles.

The impedance test was carried out on the freshly assembled half-cells of Sn/C (FIG. 27A) and $SnO_2$/NiO/C (FIG. 27B) composite nanofiber anodes and subsequently after the cells were cycled for 100 times. The various components of the impedance were extracted using an equivalent circuit model to the simulated impedance. The impedance test was carried out to elucidate the associated electrochemical performance. The depressed semicircles in the region of the high to middle frequency range, which represents the initial interfacial resistance and charge-transfer resistance, clearly showed a large variation between the fresh and that cycled cells at the end of the 100 cycles for both anodes. While the baseline (fresh) cell of the $SnO_2$/NiO/C composite anode had a relative low impedance compared to that for the fresh cell Sn/C anode (FIG. 27A), both cells had similar impedance of the aging for 100 cycles. The extracted resistances from the simulated impedance from the equivalent circuit (Table 2) showed a drastic increase in the cell ohmic resistance after cycling. There was also a corresponding increase in the SEI layer resistance as well as the charge transfer resistance in the cell after the 100 cycles.

TABLE 2

| | | Ohmic ($R_1$) ($\Omega$) | SEI ($R_0$) ($\Omega$) | Charge Transfer ($R_2$) ($\Omega$) |
|---|---|---|---|---|
| Sn/C | Fresh Cell | 0.53 | 7.72 | 38.42 |
| | Aged Cell | 7.91 | 10.3 | 47.11 |
| $SnO_2$/NiO/C | Fresh Cell | 2.16 | 2.51 | 6.08 |
| | Aged Cell | 8.68 | 8.35 | 54.9 |

The increase in charge transfer and the SEI resistance at the electrode/electrolyte interface affected the lithium ion kinetics at the interface. This correlated the steady loss of capacity of cell during the initial cycles. The electrochemical performance of the Sn/C and $SnO_2$/NiO/C composite anode does not differ significantly. For the Sn/C anode, the uniform dispersion of Sn particles in the carbon nanofiber matrix provided a large number of active sites for Li-ion storage and shorter lithium ion transfer distance, while the pores in the fibers provided a path way for ion and electron transport without the need for a current collector. All these attributes contributed immensely to the improved cycling and performance of the Sn/C nanofiber composite anode produced from the centrifugal spinning process and subsequent heat treatment.

$SnS_2$/C and $SnS_2$/$SnO_2$/C Composite Nanofiber Anodes

The Production of $SnS_2$/PAN Fibrous Mats

The synthesis method used for $SnS_2$ nanoparticles is as follows: In a typical synthesis procedure, 0.706 g of Tin (II) chloride dehydrate was dissolved in 30 mL of 91% Isopropyl alcohol for 15 minutes. Thereafter 0.603 g of Thiourea was added to the solution and continued stirring for 45 minutes. After that, the solution was transferred into a 60 mL Teflon-lined stainless steel autoclave, and then heated under vacuum at 180° C. for 12 hr. After cooling to room temperature, the yellowish solid product was collected and filtered and washed several times with deionized water and ethanol, and dried in the vacuum oven at 40° C. for 4 hours.

$SnS_2$/PAN precursors were prepared by adding 0.5 g of the $SnS_2$ synthesized powder particles to DMF solvent and sonicated for 30 min to obtain a uniform dispersion. The base polymer, PAN (12 wt %) was then added to both the DMF/$SnS_2$ suspension to form the $SnS_2$/PAN solution precursors, which were mechanically mixed using magnetic stirring for 24 hours at room temperature.

Nano-fibrous mats of $SnS_2$/PAN precursors were then prepared by centrifugal spinning. A thin spunbond fiber was used on a fan box as the substrate for the deposition of fibers. In the centrifugal spinning technique, centrifugal forces are used to extrude polymer solutions or melts through the spinneret. An amount of 2 mL of the precursor solution was injected into the needle-based spinneret equipped with 30 gauge half-inch regular bevel needles. The rotational speed of the spinneret was kept at 8,000 rpm. The substrate was rotated 90° after each run and the needles were changed after each run. The $SnS_2$/PAN fibrous mats were removed from the substrate drum and dried at 120° C. under vacuum for 24 hour prior to being carbonized. The nanofiber mats were then further stabilized in air at 280° C. for 5 h, and then carbonized at 800° C. for 2 h in an argon atmosphere to obtain the $SnS_2$/C composite nanofibers (heating rate was 3° C. $min^{-1}$) that were directly used as freestanding anodes in LIB and SIB half cells The Production of $SnS_2$/$SnO_2$/PAN Fiber Mats $SnS_2$/$SnO_2$/PAN precursors were prepared by adding 0.5 g of an equal amount of $SnS_2$ powder and $SnO_2$ powder to DMF and sonicated for 30 min. The base polymer, PAN (12 wt %) was then added to the DMF/$SnS_2$/$SnO_2$ suspensions to form the $SnS_2$/$SnO_2$/PAN solution precursors which were mechanically mixed using magnetic stirring for 24 hours at room temperature.

The nano-fibrous mats of $SnS_2$/$SnO_2$/PAN precursors were then prepared by centrifugal spinning. A thin spunbond fiber was used on a fan box as the substrate for the deposition of fibers. In the centrifugal spinning technique, centrifugal forces are used to extrude polymer solutions or melts through the spinneret. An amount of 2 mL of the precursor solution was injected into the needle-based spinneret equipped with 30 gauge half-inch regular bevel needles. The rotational speed of the spinneret was kept at 8,000 rpm. The substrate was rotated 90° after each run and the needles were changed after each run. The $SnS_2$/$SnO_2$/PAN fibrous mats were removed from the substrate drum and dried at 120° C. under vacuum for 24 hour prior to being carbonized. The nanofiber mats were then further stabilized in air at 280° C. for 5 h, and then carbonized at 800° C. for 2 h in an argon atmosphere to obtain the $SnS_2$/$SnO_2$/C composite nanofibers (heating rate was 3° C. $min^{-1}$) that were directly used as freestanding anodes in LIB and SIB half cells. For comparison, carbon nanofibers (CNFs) made from PAN (12 wt. %) in DMF solution was also prepared.

$SnS_2$/C and $SnS_2$/$SnO_2$/C NFs Half-Cell Assembly

For the Li-ion half cells, a commercial lithium foil, and the lithium hexafluorophosphate (LiPF6), ethylene carbonate (EC), dimethyl carbonate (DMC) were purchased from MTI corp. USA, while a Whatman glass microfiber from GE Healthcare was used as separator. For the Na-ion cells, a sodium foil was made from a sodium rock (Na Mw 22.9 g/mol) that was purchased from Sigma Aldrich and used as the counter electrode; the electrolyte consisted of a 1 M solution of $NaClO_4$ in ethylene carbon (EC)-dimethyl carbonate (DMC) (1:3 w/w). These chemicals were also purchased from Sigma Aldrich, USA.

The electrolyte for $SnS_2$/C and $SnS_2$/$SnO_2$/C lithium half cells was a 1M $LiPF_6$ solution in ethylene carbonate (EC)/dimethyl carbonate (DMC) (1:1 v/v) while the electrolyte for SIB half cells consisted of a 1 M solution of $NaClO_4$ in ethylene carbon (EC)-dimethyl carbonate (DMC) (1:3 w/w).

The electrochemical performance of the samples was performed using coin cells of CR2032 type and assembled in a glove-box filled with pure argon gas with the oxygen and moisture content <0.5 ppm. A sodium foil was made from a sodium rock (Na Mw 22.9 g/mol) and used as the counter electrode; The electrolyte consisted of a 1 M solution of $NaClO_4$ in ethylene carbon (EC)-dimethyl carbonate (DMC) (1:3 w/w); the thickness of the as-prepared $SnS_2$/C electrode and $SnS_2$/$SnO_2$/C electrode was about 4-6 mg. The electrochemical performance was evaluated by carrying out galvanostatic charge-discharge tests at a current density of 100 mA/g and between 0.05 and 3.0V, with a 10 minute rest at the end of each discharge cycle. The galvanostatic charge/discharge experiments were performed using a multichannel battery testing system from Arbin, USA.

Figure 28A:
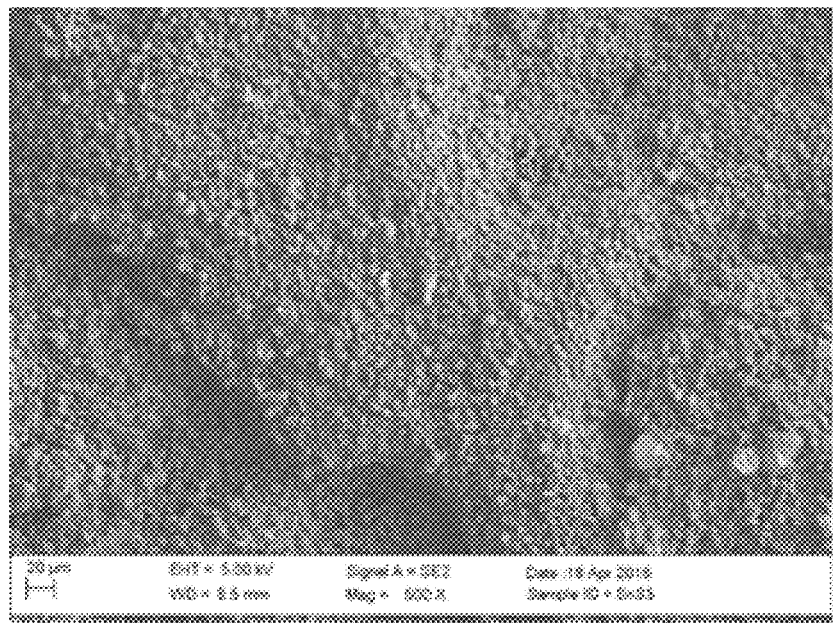
FIGS. 28A and 28B depict SEM images of the synthesized $SnS_2$ powder.
Figure 28B:
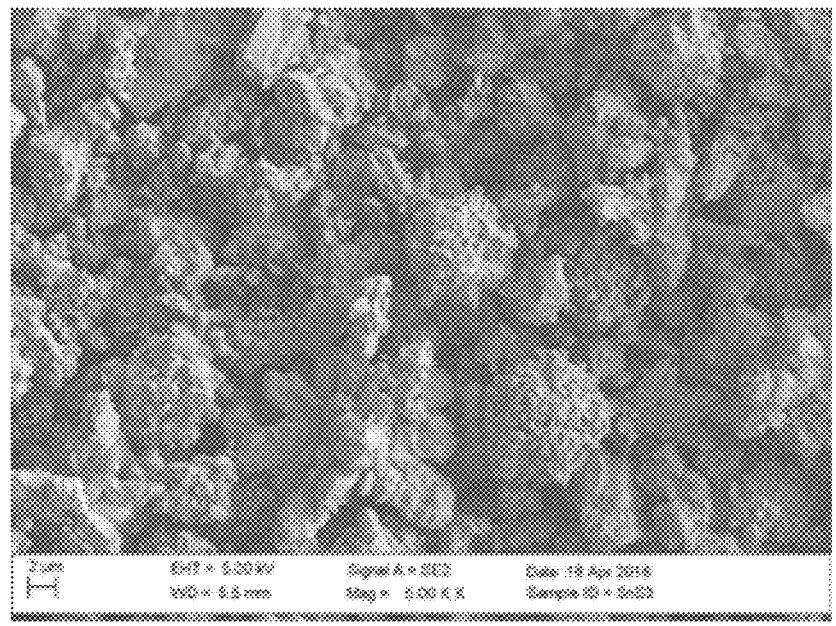
Figure 28C:
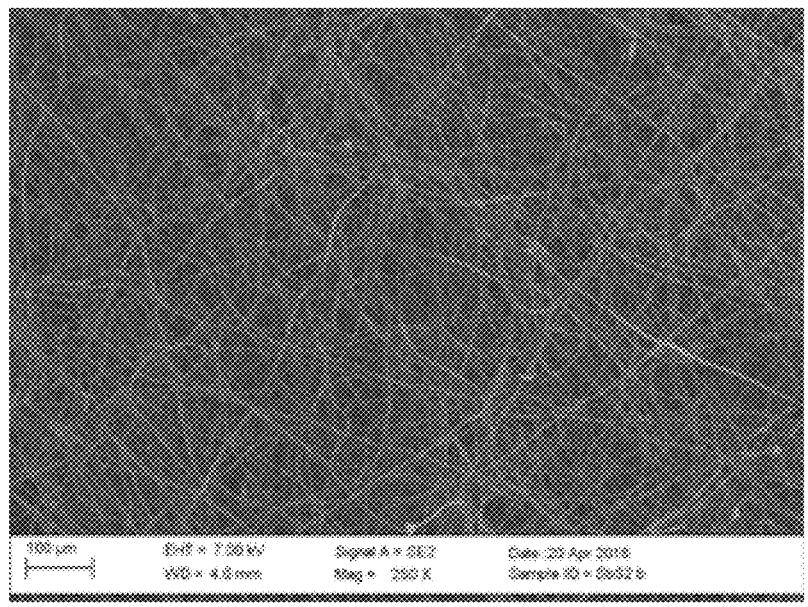
FIGS. 28C and 28D depict SEM images of the $SnS_2/C$ composite fibers.
Figure 28D:
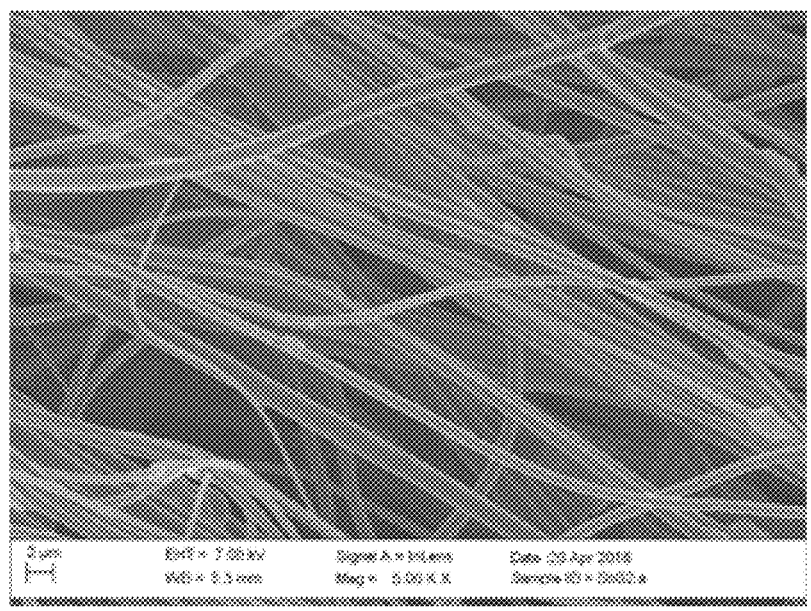
Figure 28E:
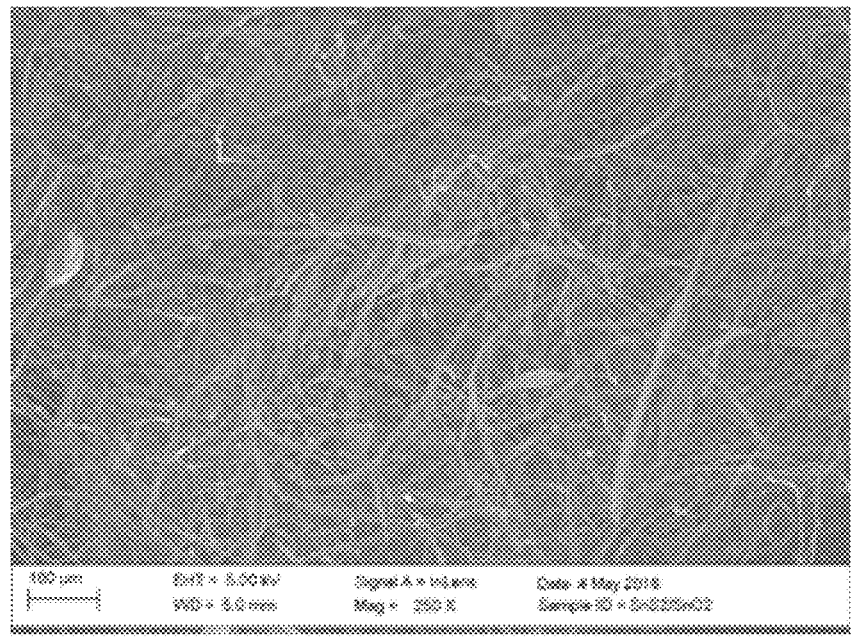
FIGS. 28E and 28F depict SEM images of the $SnS_2/SnO_2/C$ fibers after calcination in inert environment at 700° C.
Figure 28F:
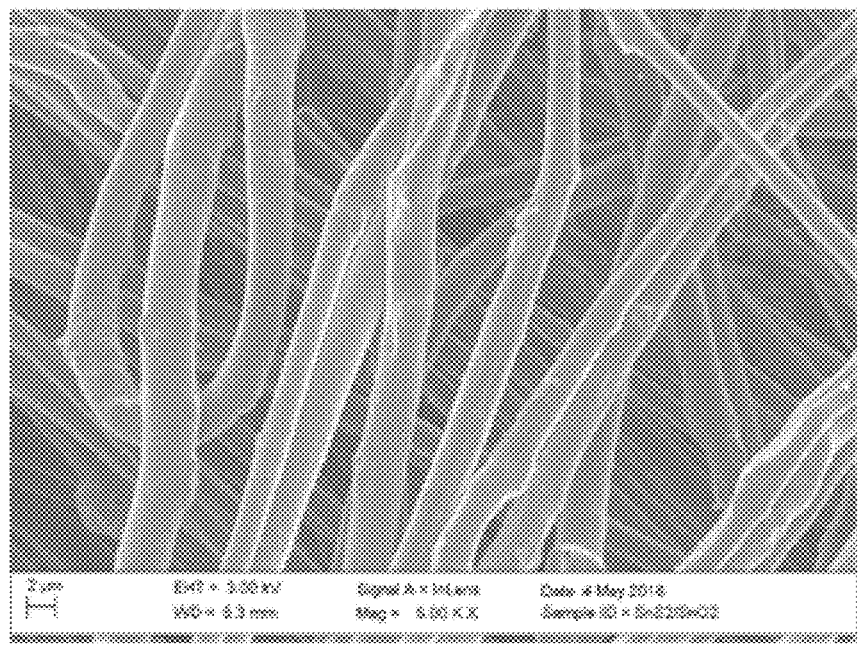
Figure 29:
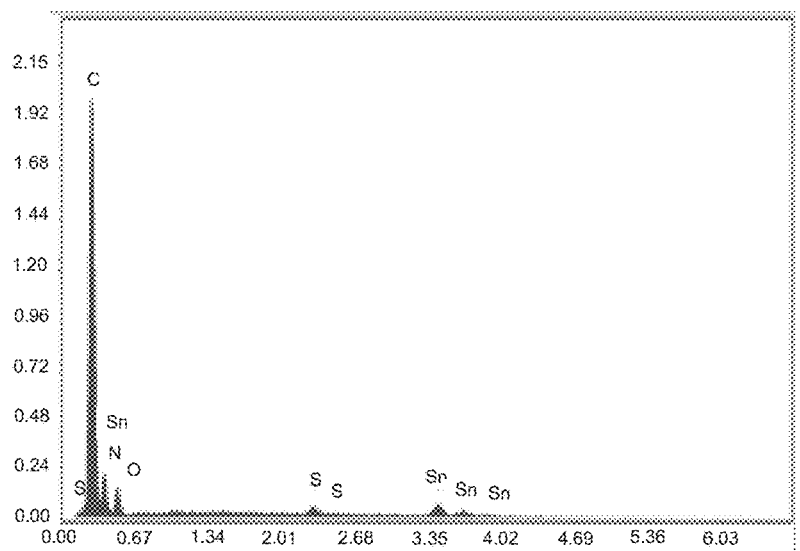
FIG. 29 depicts EDS elemental analysis of the $SnS_2/C$ composite fibers.

Surface Morphology and Elemental Analysis of $SnS_2$/C and $SnS_2$/$SnO_2$/C Composite The morphology and microstructure of the as-synthesized $SnS_2$ nanoparticles were investigated by SEM, and XRD techniques. FIGS. 28A and 28B show the micro particles crystals of the $SnS_2$ particles, which were in the range of 50 nm to 5 μm. For the making of the fiber composites of $SnS_2$/C and $SnS_2$/$SnO_2$/C, 0.5 g of the $SnS_2$ synthesized powder particles were added to DMF and sonicated for 30 min to obtain a uniform dispersion. While the $SnS_2$/$SnO_2$, and equal amount of $SnS_2$ powder and $SnO_2$ precursor were dissolved in DMF and sonicated for 30 min. The obtained fibers from these two composites are shown in FIGS. 28C-28F. FIGS. 28C and 28D show SEMs of the $SnS_2$/C fibers. FIGS. 28E and 28F show SEMS for the $SnS_2$/$SnO_2$/C fibers. Generally, there was no variation in the fiber diameters distribution between the various composite fibers and there were not micro-pores present in the fiber strands as was previously observed in the $SnO_2$—NiO/C composite fibers. The EDS elemental analysis of the composite fibers (FIG. 29) clearly showed that the fibers predominantly consisted of Sn, S and carbon. The area mapping of the composite nanofiber showed the distribution of the Sn nanoparticles in the carbon matrix. The area mapping typically showed that the composite electrode predominantly consisted of carbon with Sn and S particles heterogeneously distributed.

Figure 30A:
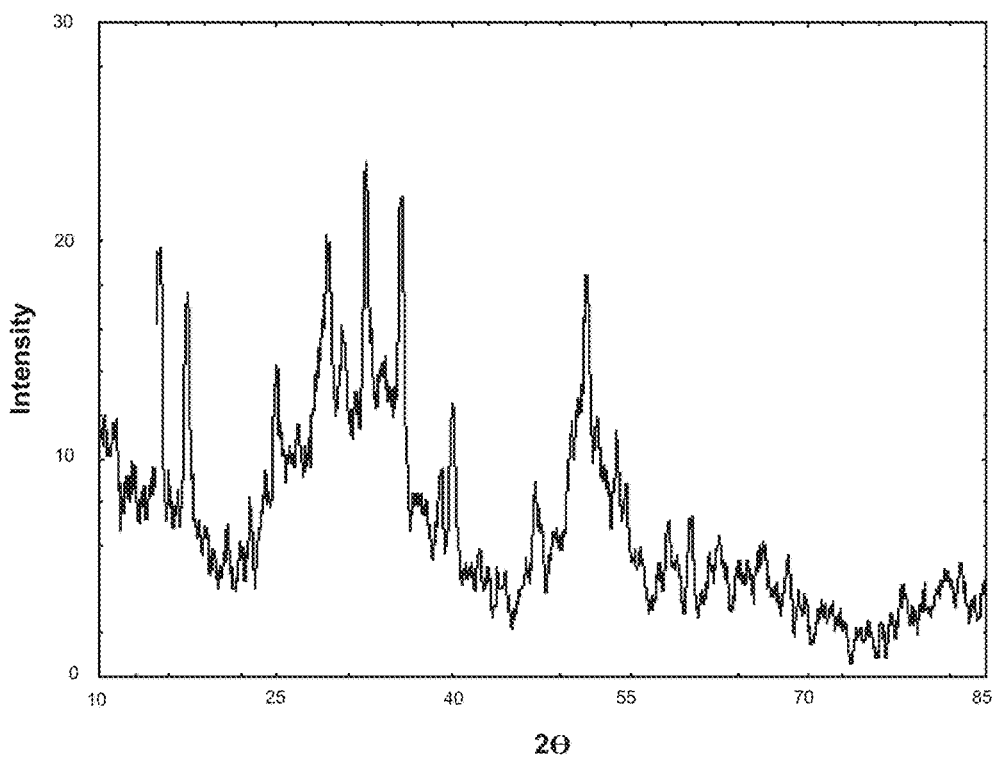
FIG. 30A depicts X-ray diffraction of the as-synthesized $SnS_2$ crystal particles'
Figure 30B:
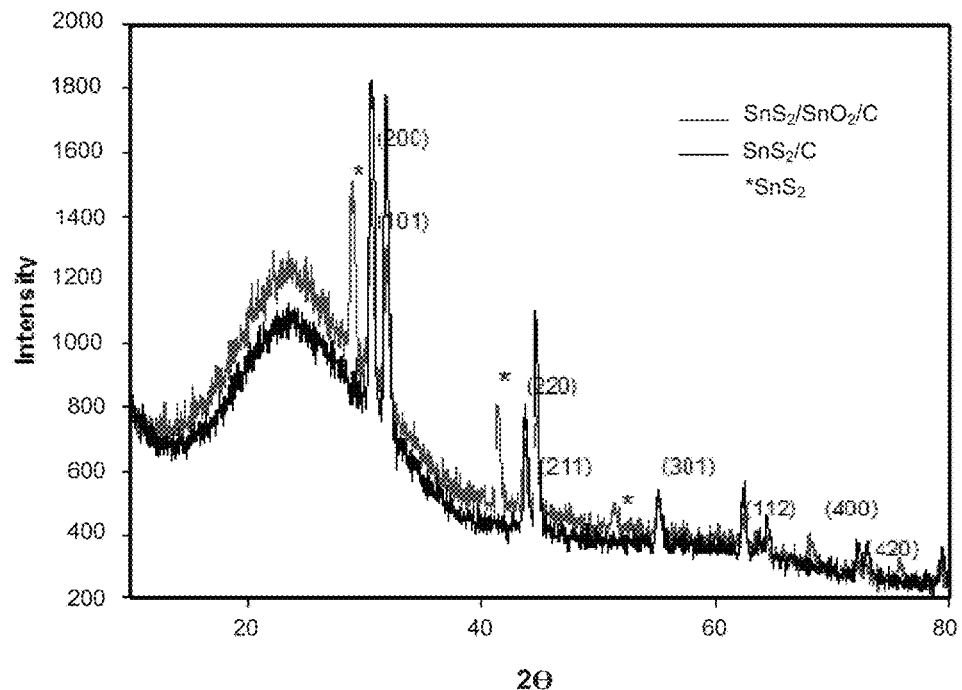
FIG. 30B depicts X-ray diffraction pattern showing peaks of $SnS_2/C$ and $SnS_2/SnO_2/C$ composite electrode.

Analysis of the Crystal Structure of the $SnS_2$/C and $SnS_2$/$SnO_2$/C Composite Electrodes The phase composition and crystalline structure of the as-prepared samples are examined by X-ray diffraction (XRD). All the peaks of the as-synthesized $SnS_2$ crystal particles as shown in FIG. 30A can be indexed to 2T-type layered structure. The absence of impurity peaks indicates the formation of pure crystalline $SnS_2$. A couple of broad diffraction peaks associated with (100), (101) and (110) peaks of $SnS_2$ were observed. This indicates that the sulfide reaction occurs already between sulfur and tin sources in the high temperature isopropyl alcohol environment to produce the $SnS_2$ yellowish powder product. Since no graphite peak is observed in the $SnS_2$/C and $SnS_2$/$SnO_2$/C composite XRD (FIG. 30B), the carbon formed from carbonization of PAN exists as amorphous carbon as reflected in the broad amorphous peak at the low 2θ assigned to the un-stabilized amorphous PAN polymer. The peak pattern obtained in the X-ray shows a small amount of $SnO_2$ and metallic Sn. The peaks of the metallic Sn were observed at 43° and 45° and indexed as (220) and (211) after the carbonization process for $SnS_2$/$SnO_2$/C.

Surface Analysis (XPS)

Figure 31A:
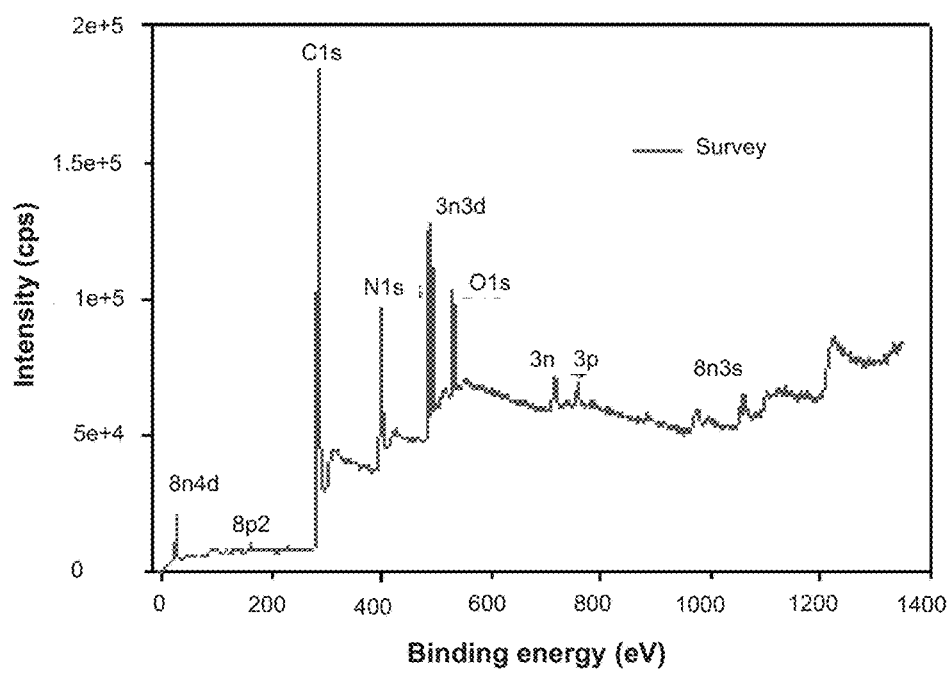
FIG. 31A is a survey pattern spectra of a $SnS_2/SnO_2/C$ composite electrode.
Figure 31B:
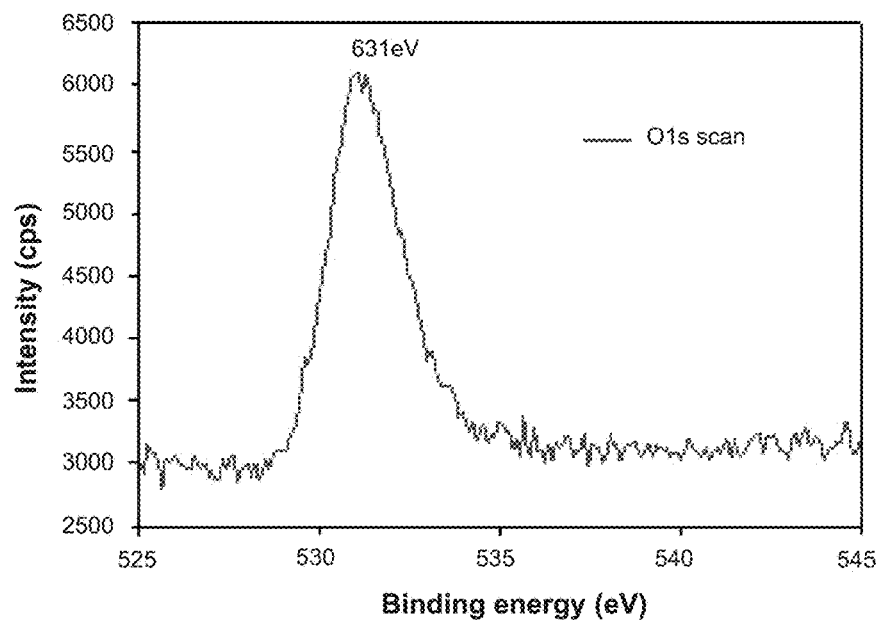
FIG. 31B is the O1s spectra of a $SnS_2/SnO_2/C$ composite electrode.
Figure 31C:
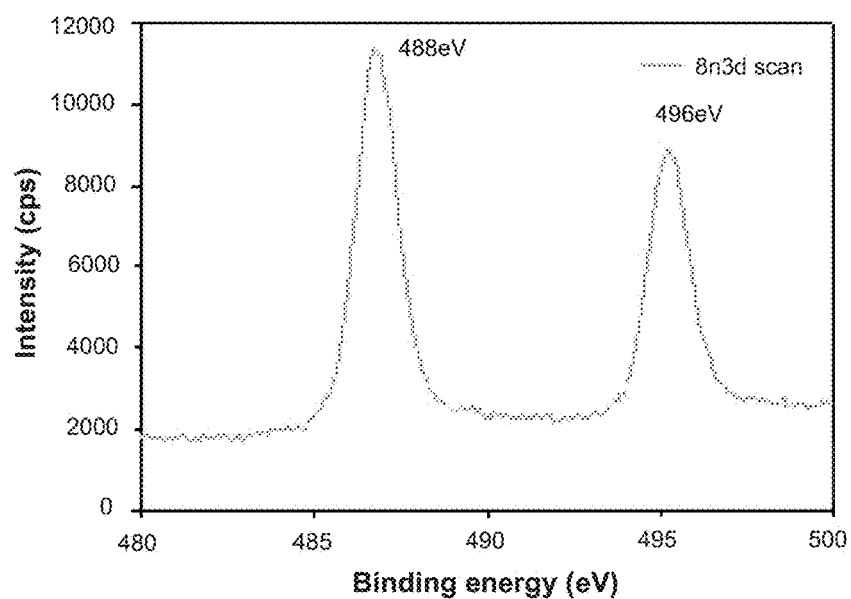
FIG. 31C is the Sn3d spectra of a $SnS_2/SnO_2/C$ composite electrode.
Figure 31D:
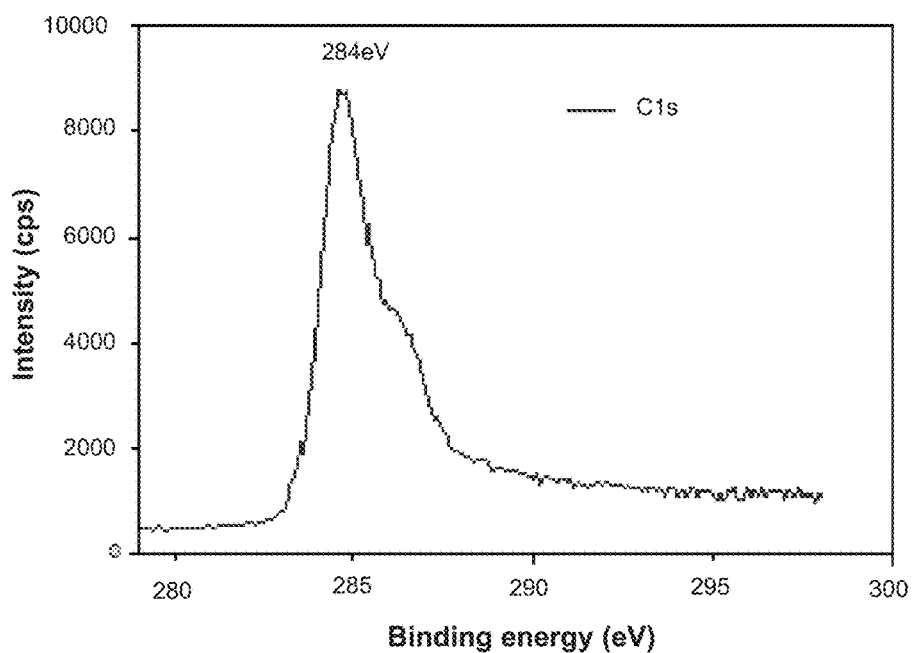
FIG. 31D is the C1s spectra of a $SnS_2/SnO_2/C$ composite electrode.
Figure 31E:
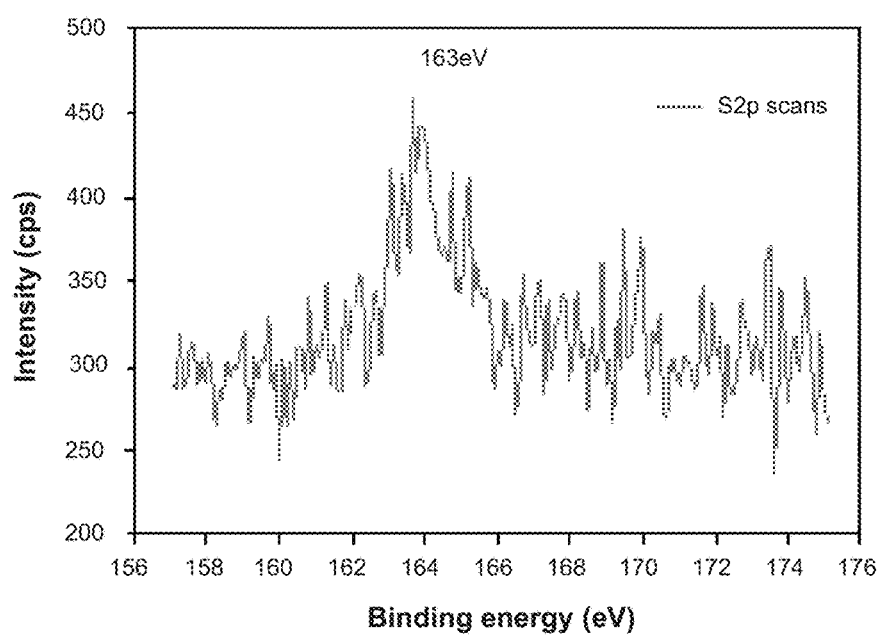
FIG. 31E is the S2p spectra of a $SnS_2/SnO_2/C$ composite electrode.

The XPS analysis on the surface composition of $SnS_2$ and $SnS_2$/$SnO_2$/C were significantly the same and showed clearly that these composite electrodes consist of elements such as C, Sn and S. FIG. 31A is a survey spectra, FIG. 31B is the O1s spectra, FIG. 31C is the Sn3d spectra, FIG. 31D is the C1s spectra, and FIG. 31E is the S2p spectra. As shown in FIGS. 31A-31E, there were strong peaks of Sn 3d and S 2p in the XPS spectra of composite electrodes. The high-resolution Sn 3d spectrum (FIG. 31C) showed two clear peaks at about 487.0 and 495.4 eV for Sn $3d_{5/2}$ and Sn $3d_{3/2}$, which indicates a chemical valences states +4 of Sn in the composite. Similarly, a high-resolution S 2p spectrum analysis (FIG. 31E) indicates the existence of $S^{6+}$ and $S^{2-}$ species in both the $SnS_2$/C and $SnS_2/SnO_2$/composite electrode. The presence of S2-peaks observed at 162.3 and 163 eV and assigned to binding energies of $S2p_{3/2}$ and $S2p_{1/2}$ which agrees results from other studies of $SnS_2$ nanoparticles. The $S^{6+}$ peak often observed at 167.9 eV and associated with traces of the —$SO_4$ group was not observed on the fiber composite. The peak centered at about 531.74 eV in the O1s spectrum (FIG. 31B) originated from the coordination of oxygen in Sn—O—Sn. The C 1s peak (FIG. 31D) for both the $SnS_2$/C and $SnS_2/SnO_2$/C nanofibers shows a broad peak at 284.6 eV with a shoulder peak at 285.6 eV. Typically, the binding energy with the peak at 284.6 eV is often associated with the C—C bonds and attributed with the amorphous carbon phase or from adventitious carbon, while the peak at 285.6 eV is often a characteristic of a combination of C—O or the carboxyl (i.e. O—C=O) groups, that could have served as the nucleation point for the $SnO_2$.

Figure 32A:
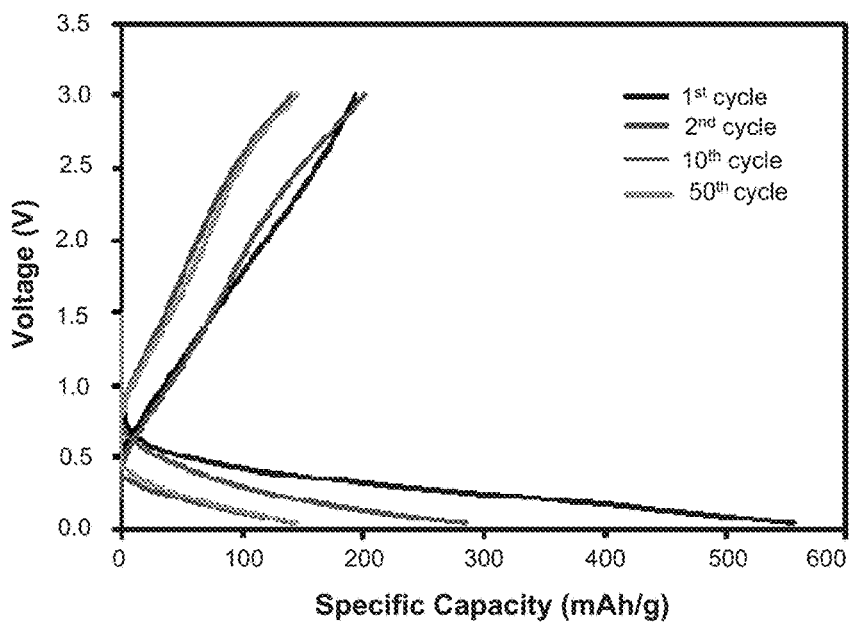
FIG. 32A depicts the voltage-capacity profiles of the $SnS_2/C$ composite electrode.
Figure 32B:
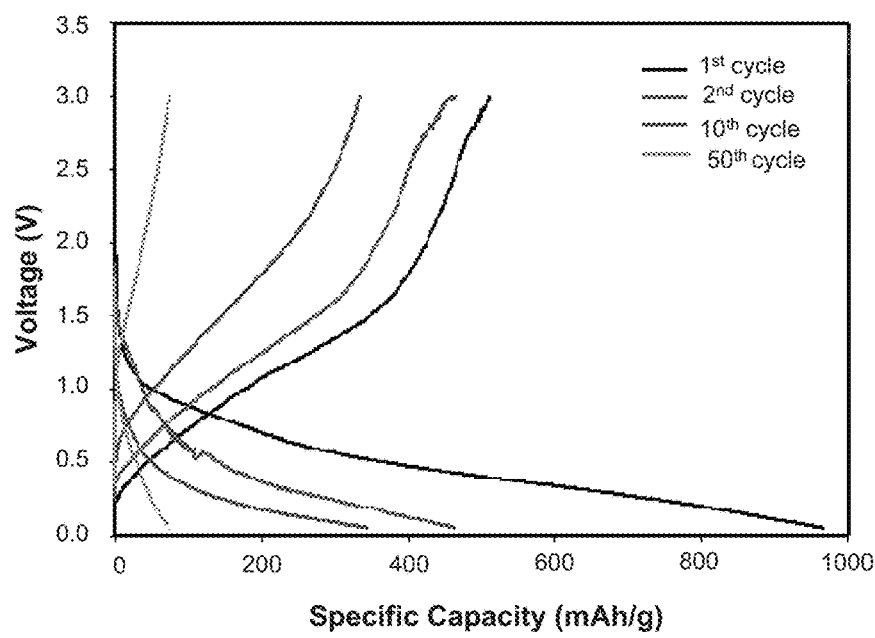
FIG. 32B depicts the voltage-capacity profiles of the $SnS_2/SnO_2/C$ composite electrode.

Electrochemical Performance of the $SnS_2$/C and $SnS_2$/$SnO_2$/C Composite Electrodes Sodium Ion Batteries The galvanostatic charge and discharge behaviors of $SnS_2$/C and that of $SnS_2$/$SnO_2$ electrode were measured (FIG. 32A and FIG. 32B, respectively) between 0.005 and 3.0 V at a current density of 100 mA $g^{-1}$. During initial sodiation, the plateau at 1.2V and 1.4 V respectively for the $SnS_2$/C and the $SnS_2$/$SnO_2$/C is attributed to the intercalation of sodium ions into electrode material layers without composition change. The slope plateau at 0.8-0.6 V corresponds to the conversion reaction between $Na^+$ and $Na_{x^-}$ $SnS_2$, in which metallic Sn and $Na_2S$ are formed, and the formation of SEI due to reduction of electrolytes. Thereafter a sloping curve is observed at a lower voltage that often an indication of the alloying reaction process taking place between $Na^+$ and Sn in a typical reaction:

Figure 33:
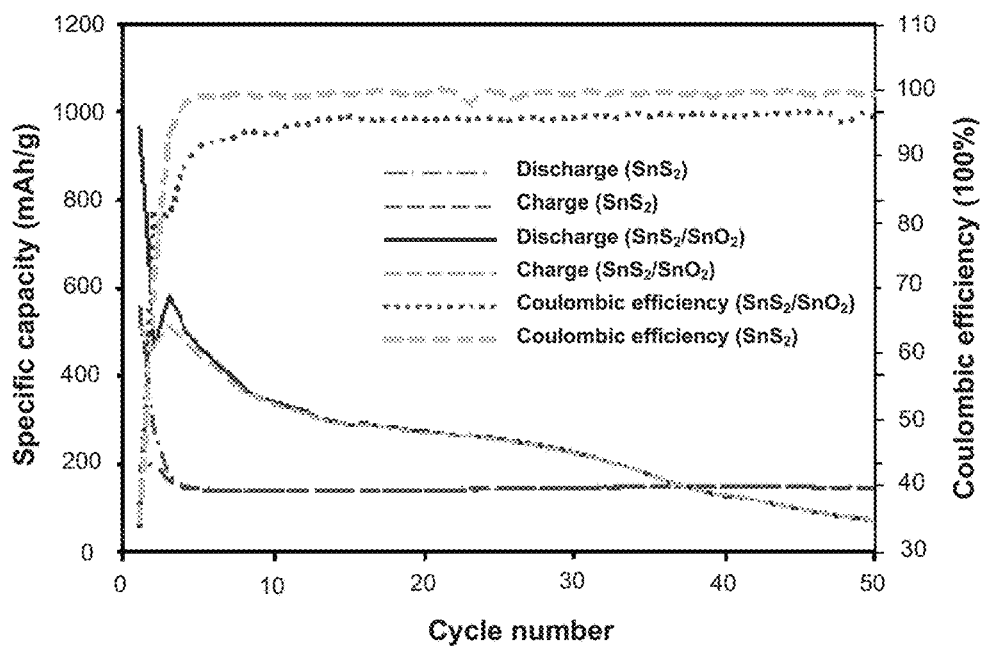
FIG. 33 depicts the electrochemical cycling performance of the $SnS_2/C$ and $SnS_2/SnO_2/C$ electrode.

The $SnS_2$/C and $SnS_2$/$SnO_2$/C electrodes delivered a specific capacity of 556 mAh$g^{-1}$ and 965 mAh$g^{-1}$ respectively during the first sodiation cycle. This initial high capacity is attributed to the irreversible formation of a stable SEI layer. In the subsequent cycles, the $SnS_2$/C electrode exhibited a much stable cycling performance compared to $SnS_2$/$SnO_2$/C i.e. 145 mAh$g^{-1}$ was maintained after 50 cycles (FIG. 33) compared to a fluctuating cycle performance for the $SnS_2$/$SnO_2$/C electrode of similar 50 cycles as shown in FIG. 33. The $SnO_2$ was added in the electrode composite to improve the electrical conductivity of the $SnS_2$ and its effect was dominate up to the $10^{th}$ cycle, thereafter, a deterioration of the capacity sets-in. The large Sn content could cause a significant pulverization of the electrode, resulting in particle isolation and creation of crevices that could allow solvent co-intercalation resulting localized side reaction. Meanwhile, the Coulombic efficiency quickly increases to ~98% for each of the electrodes after the first five cycles, demonstrating an efficient sodium ion stripping/deposition process.

b. Lithium Ion Batteries

In the synthesis of the $SnS_2$ nanocrystals using hydrothermal method (i.e. wet chemical technique), the stannic chloride dehydrate ($SnCl_4 \cdot 2H_2O$) dissociated in the isopropyl alcohol to form tin ions with thiocarbamide ($CH_4N_2S$) as the source of sulfur ions production. The $SnS_2$ nanocrystals are formed via precipitation reaction between $Sn^{4+}$ and $H_2S$ produced by the hydrolysis of thiocarbamide. The formation of $SnS_2$ nanocrystals may be described by the following reaction:

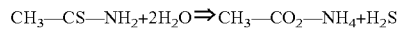

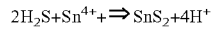

The electrochemical reaction of $SnS_2$ with lithium generally follow a two-step reaction mechanism:

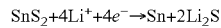

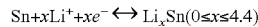

This electrochemical reaction gives a theoretical capacity of ~645 mAh$g^{-1}$, however due to the large volume changes (200%) and its associated electrode pulverization, and coupled with a loss of electrical contact between particles, the $SnS_2$ electrode generally suffer a large capacity fade and poor cyclability. This low electrochemical performance of the $SnS_2$ electrode is partly also due to the low electrical conductivity, which impact negatively on electron transfer kinetics.

In light of this, the electrical conductivity of the $SnS_2$ was improved by adding $SnO_2$ in a matrix of carbon fibers that will provide a cushioning effect to accommodate the large volume changes to achieve both high capacity and good cyclability of the $SnS_2$/$SnO_2$/C composite fiber anode.

Similar to the $SnS_2$, an early study found $SnO_2$ to absorb lithium during its $1^{st}$ discharge cycle in a two-step process:

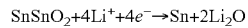

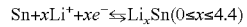

In this reaction, the irreversible $1^{st}$ step produces $Li_2O$ matrix around the Sn metal. The formation of the $Li_2O$ is considered an important step that essentially reduces the volume fluctuations in subsequent charge/discharge process. This also pave the way for the alloying process (i.e. $2^{nd}$ step), which by itself induces some the volume changes. Designing an electrode with tin disulfide ($SnS_2$), a layered compound with hexagonal cadmium iodide ($CdI_2$) structure along with another compound, $SnO_2$ with a high theoretical capacity with a much reduced volume fluctuation, all in embedded in carbon nanofiber to form a $SnS_2$/$SnO_2$/C composite anode. The unique morphology and structure of the composite anode provided a large surface area for ionic transport, while the $SnO_2$ and the carbon fibers provided the needed structural stability of the electrode that prevented it from pulverization, and at the same time enhanced the electrical conductivity of the anode. These two factors played a key role in the improved cycle performance of the binary electrode as shown in FIG. 34 and FIG. 35.

Figure 34:
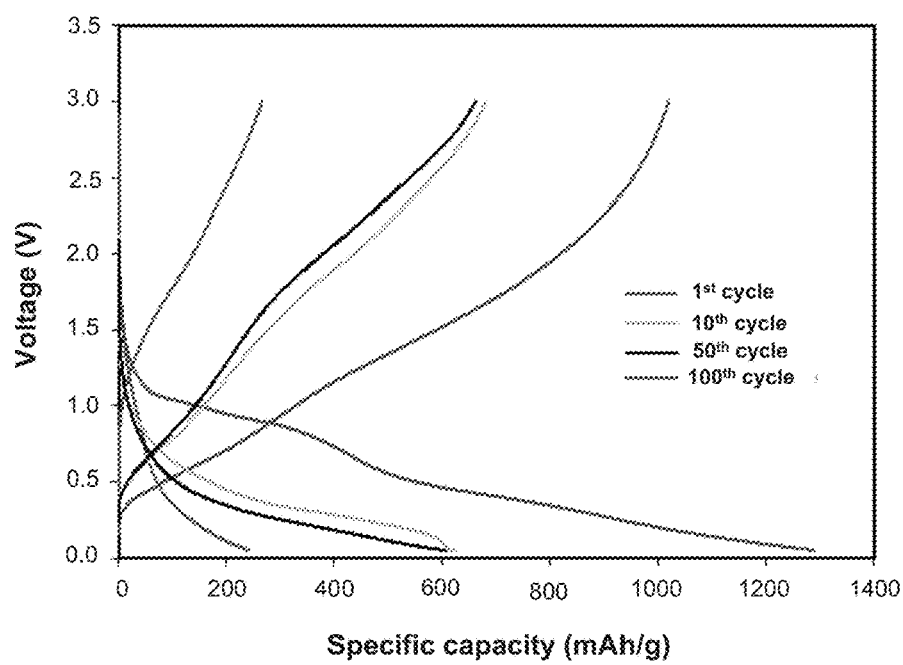
FIG. 34 depicts galvanostatic charge/discharge curves $SnS_2/SnO_2/C$ composite electrode.
Figure 35A:
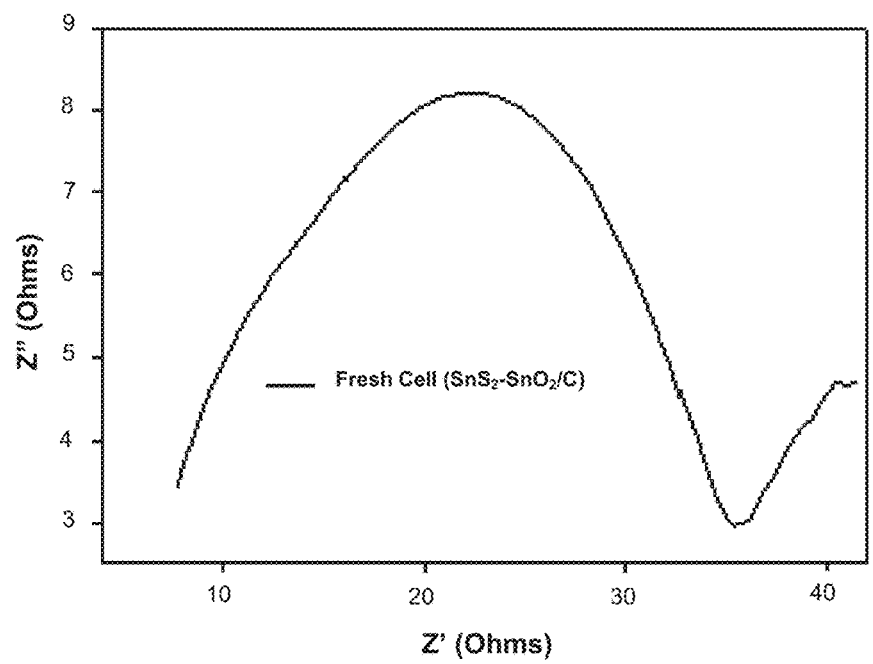
FIG. 35A depicts Nyquist plots for the impedance of the fresh $SnS_2/SnO_2/C$ composite electrode cell.
Figure 35B:
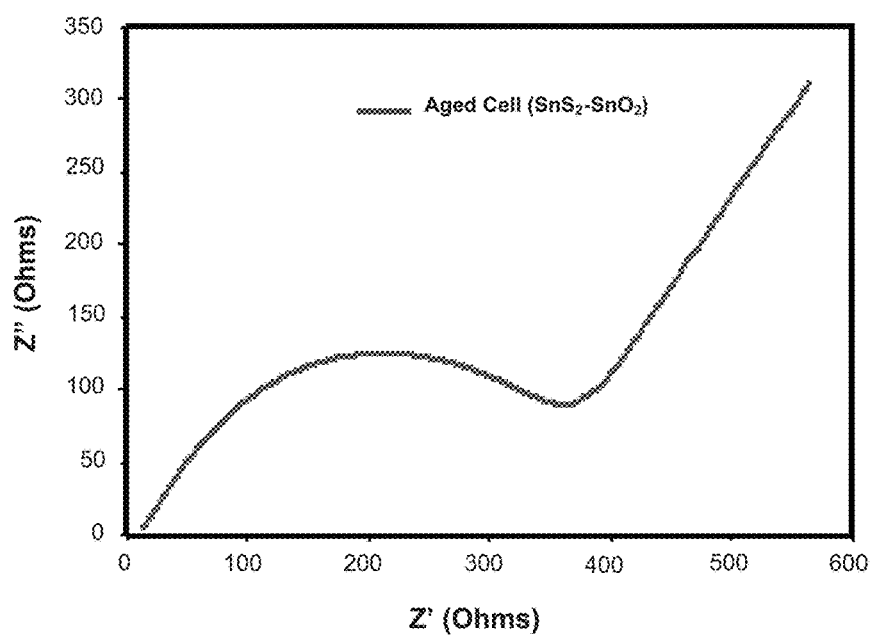
FIG. 35B depicts Nyquist plots for the impedance of Aged after 100 cycles of the $SnS_2/SnO_2/C$ composite electrode cell.

FIG. 34 shows the specific capacities of the $SnS_2$/$SnO_2$/C composite fiber anode over 100 electrochemical cycles at 100 mA$g^{-1}$ in a potential window of 0.01 to 3.0V versus Li/$Li^+$. The impedance test (FIG. 35) for the fresh cell of the composite fiber electrode was carried out to evaluate the impedance and interface chemistry at the electrolyte/electrode interface. The fresh cell showed a low impedance both ohmic and SEI layer resistance (i.e. the diameter of semicircle and the $Z^I$ intercept respectively). The $SnS_2$/$SnO_2$/C composite fiber anode had a large initial discharge capacity of 1288 mAh$g^{-1}$ thereafter there was rapid a decline of the discharge capacity in the $2^{nd}$ cycle with a 79% capacity retention (i.e. 814 mAh$g^{-1}$ at the $2^{nd}$ cycle). This drastic drop in capacity for metal/sulfide oxides at the $2^{nd}$ cycle is usually attributed to the electrolyte decomposition reaction that forms the SEI layer on the electrode surface. This phenomenon is manifested in the voltage vs specific capacity graph (FIG. 34) at an increasing voltage plateau between 0.8 V to 1.2 V. During the subsequent cycle, a second voltage plateau was observed in the potential range of 0.5-0.1 V vs. Li$^+$/Li which often attributed to the alloying process of the metal and in this case the Sn and S with lithium to form Li$_2$S and Li$_2$Sn respectively. A cyclic voltammetry test will be carried out to complement the observed occurrence of SEI and alloying process in the charge-discharge curve.

Figure 36:
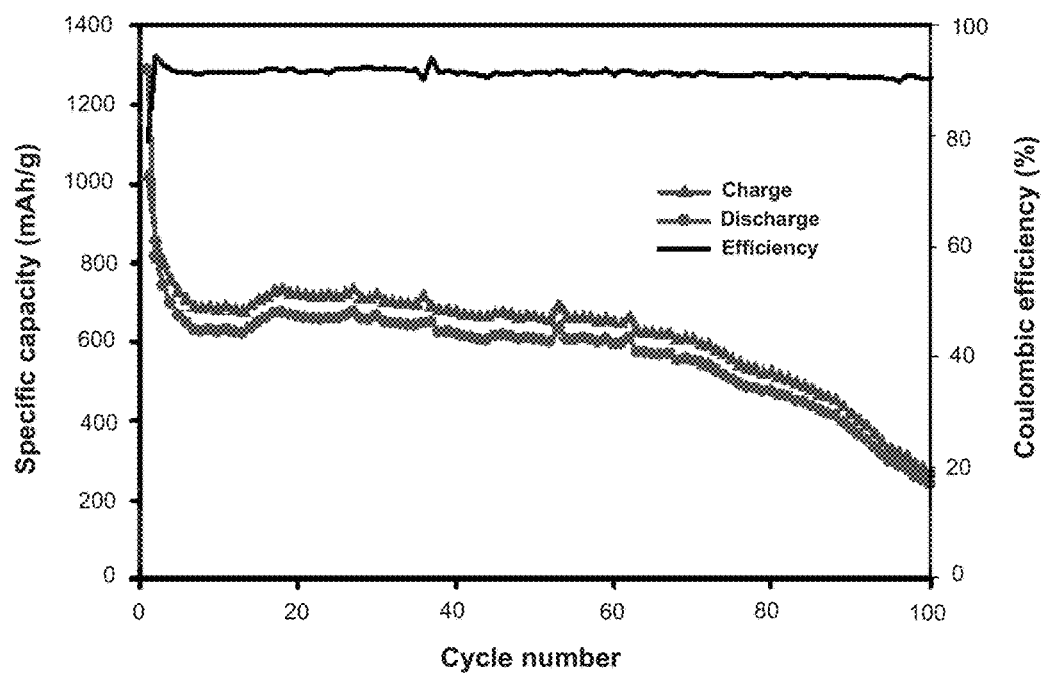
FIG. 36 depicts cycle performance of the $SnS_2/SnO_2/C$ composite fiber anode.
Figure 37:
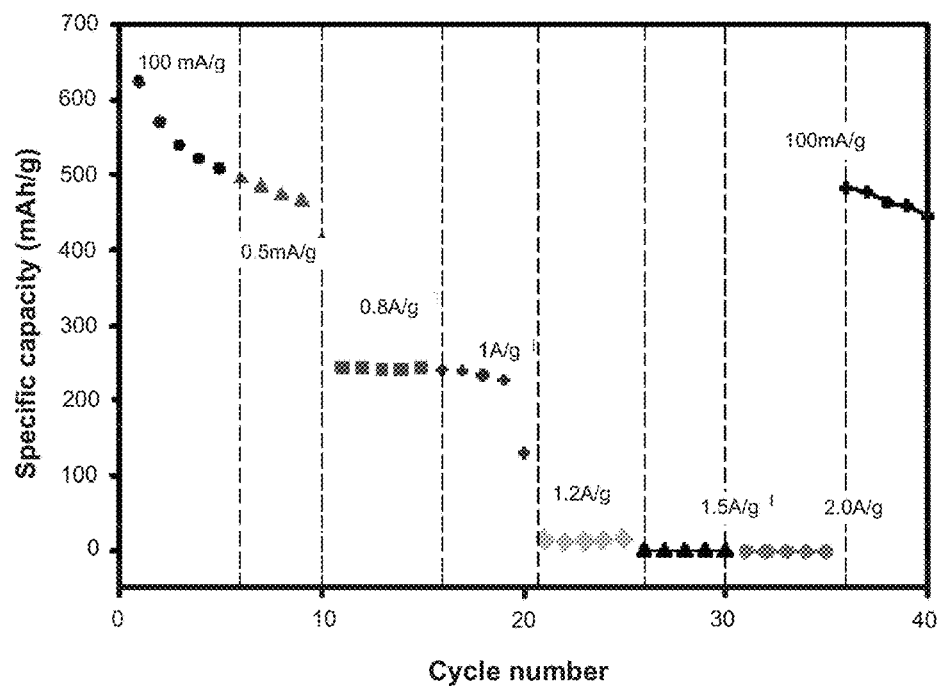
FIG. 37 depicts the rate performance of the $SnS_2/SnO_2/C$ composite electrode at various current densities from 100 $mAg^{-1}$ to $2Ag^{-1}$ between 0.05-3.0V.

The storage capacity and the cycle performance of the composite anode were also carried out. The electrochemical performance of the electrode after 100 charge/discharge cycles is shown in FIG. 36. After the initial capacity fade of the anode up to the 5$^{th}$ cycle, the electrode capacity steadily rise beyond the 20$^{th}$ cycle and still maintained a high reversible capacity of 664 mAhg$^{-1}$ up to the 60$^{th}$ cycle. This steady rise in the electrode capacity is attributed to two factors: the presence of the SnO$_2$ and Li$_2$O in the matrix that helped reduced the volume fluctuations and the microstructure of the carbon fiber that provided the cushioning effect to minimize also the volume changes and a framework that support the composite electrode from pulverization. After the 60$^{th}$ cycle the capacity faded steadily to low of 242 mAhg$^{-1}$ at the 100$^{th}$ cycle. The decline was attributed to the continuous growth of the passivation layer (FIG. 36) that clogged the pores and decreased the surface of the composite electrode These two factors played a key role in the composite electrode maintaining capacity retention of ~92% at the end of the 100$^{th}$ cycle. The impedance of the composite electrode conducted after the 100 cycles (FIG. 35) showed a large increase in the impedance, especially the ohmic resistance (diameter of the semi-circle), that is often related to the resistance to charge transfer, which in this case is attributed to the growth of the passivation layer of the composite electrode (FIG. 36).

Figure 38A:
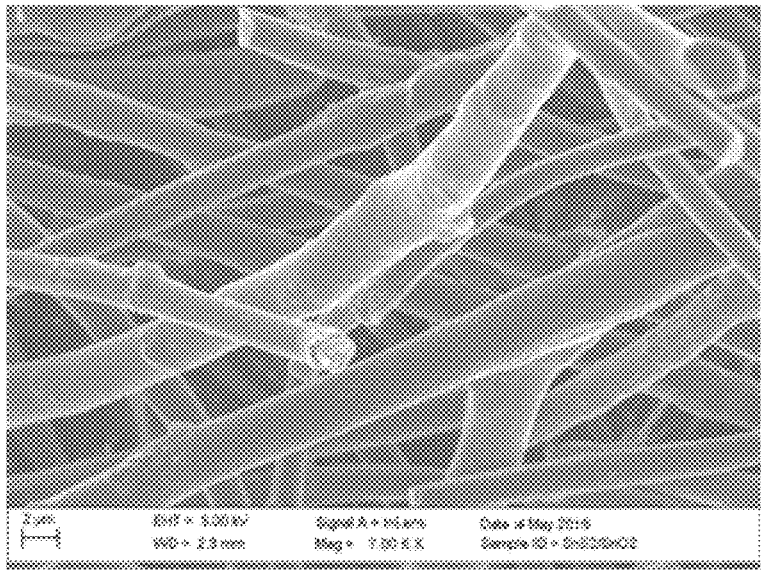
FIG. 38A depicts SEM images of a pristine $SnS_2$—$SnO_2$ carbon fiber composite electrode.
Figure 38B:
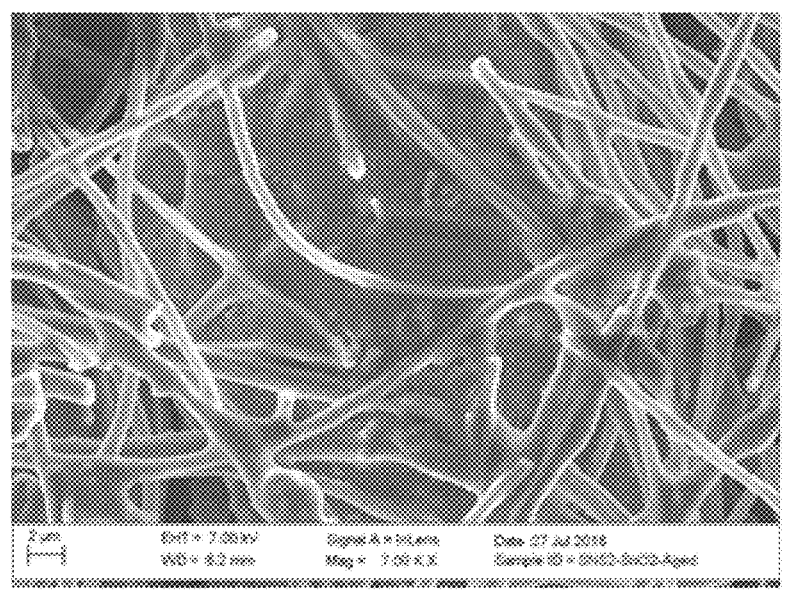
FIG. 38B depicts SEM images of a $SnS_2$—$SnO_2$ carbon fiber composite electrode after undergoing 100 cycles showing a heavy passivated electrode.

Rate performance tests were conducted on the SnS$_2$/SnO$_2$ composite electrode to evaluate the extent to which the crystal structure of the electrode can withstand a high volume of Li+ influx (i.e. insertion and de-insertion) and the associated strain on its microstructure (FIG. 38). The composite electrode was subjected to various current densities; from a high of 2Ag$^{-1}$ and a low of 100 mAg$^{-1}$ were used to cycle the cells at room temperature. The composite electrode maintained a high specific capacity of about 254 mAg$^{-1}$ at 0.8 Ag$^{-1}$, when the current density was increased further to 1.2 Ag$^{-1}$, 1.5 Ag$^{-1}$ and 2 Ag$^{-1}$ the cell capacity went to zero (i.e. 0.15 mAhg$^{-1}$). It however recovered most of the loss capacity when the cell was again cycled back at a low current density of 100 mAg$^{-1}$ to record a specific capacity of 428 mAhg$^{-1}$ cycle, which is significantly less than 512 mAhg$^{-1}$ recorded at the beginning of the test.

The poor performance of the composite electrode at high charge-discharge current densities could be attributed to two factors; excessive strain on the crystal structure and possible occurrence lithium plating. Charging the composite electrode cell with very high current densities delivers a large amount of Li+ to the surface of the electrode that exceeds the rate at which these lithium ions can intercalate into the anode material crystal structure. Under this condition, Li+ may deposit as metallic Li on the surface of the anode. This metallic lithium will react with the decomposition products from the electrolyte and form a surface film layer. The deposition surface layer build-up increases the charge transfer resistance, raises the overall battery impedance, and consumes recyclable lithium ions which lead to loss in the capacity of the battery. This phenomenon is evident in the high impedance rise as shown in FIG. 35. As Lithium plating is reversible at potential of ~100 mV where it oxidizes, it is believed to become partly reversible and account for the recovery in capacity as the current density is reduced to 100 mAhg$^{-1}$ after applying higher currents.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method of producing tin-containing carbon fibers, comprising:
    dispersing tin (II) sulfide particles in a solvent;
    dissolving a base polymer in the solvent to form a mixture of the base polymer and the tin (II) sulfide particles, wherein the base polymer is convertible into carbon fibers when heated;
    placing the mixture into a body of a fiber producing device, the body comprising one or more openings;
    rotating the fiber producing device at a speed of at least about 500 rpm, wherein rotation of the fiber producing device causes the polymer in the body to be passed through one or more openings to produce microfibers and/or nanofibers comprising the polymer;
    collecting at least a portion of the produced microfibers and/or nanofibers; and
    heating the collected fibers at a temperature sufficient to convert at least a portion of the base polymer in the collected fibers into carbon fibers comprising tin.

2. The method of claim 1, wherein the microfibers and/or nanofibers are created without subjecting the fibers, during their creation, to an externally applied electric field.

3. The method of claim 1, wherein the base polymer is polyacrylonitrile.

4. The method of claim 1, wherein the concentration of polymer in the solvent is between about 5% by weight to about 20% by weight.

5. The method of claim 1, wherein the solvent is dimethyl formamide.

6. The method of claim 1, further comprising dispersing nickel-containing particles in the solvent.

7. The method of claim 6, wherein the nickel-containing particles are nickel (II) particles.

8. The method of claim 1, wherein the fibers are heated to a temperature of about 400 C to about 900 C to convert the base polymer in the collected fibers into carbon fibers.

9. The method of claim 1, further comprising stabilizing the fibers by:
heating the fibers at a temperature of between about 50 C to about 200 C under vacuum to remove water from the fibers; and
heating the fibers in air at a temperature of between about 200 C to about 400 C.

10. A method of producing tin-containing carbon fibers, comprising:
dispersing tin (II) oxide particles and tin (II) sulfide particles in a solvent;
dissolving a base polymer in the solvent to form a mixture of the base polymer and the tin (II) oxide particles and tin (II) sulfide particles, wherein the base polymer is convertible into carbon fibers when heated;
placing the mixture into a body of a fiber producing device, the body comprising one or more openings;
rotating the fiber producing device at a speed of at least about 500 rpm, wherein rotation of the fiber producing device causes the polymer in the body to be passed through one or more openings to produce microfibers and/or nanofibers comprising the polymer;
collecting at least a portion of the produced microfibers and/or nanofibers; and
heating the collected fibers at a temperature sufficient to convert at least a portion of the base polymer in the collected fibers into carbon fibers comprising tin.

11. The method of claim 10, wherein the microfibers and/or nanofibers are created without subjecting the fibers, during their creation, to an externally applied electric field.

12. The method of claim 10, wherein the base polymer is polyacrylonitrile.

13. The method of claim 10, wherein the concentration of polymer in the solvent is between about 5% by weight to about 20% by weight.

14. The method of claim 10, wherein the solvent is dimethyl formamide.

15. The method of claim 10, further comprising dispersing nickel-containing particles in the solvent.

16. The method of claim 15, wherein the nickel-containing particles are nickel (II) particles.

17. The method of claim 10, wherein the fibers are heated to a temperature of about 400 C to about 900 C to convert the base polymer in the collected fibers into carbon fibers.

18. The method of claim 10, further comprising stabilizing the fibers by:
heating the fibers at a temperature of between about 50 C to about 200 C under vacuum to remove water from the fibers; and
heating the fibers in air at a temperature of between about 200 C to about 400 C.

* * * * *